United States Patent
Kato et al.

(10) Patent No.: US 10,419,618 B2
(45) Date of Patent: Sep. 17, 2019

(54) INFORMATION PROCESSING APPARATUS HAVING WHITEBOARD AND VIDEO CONFERENCING FUNCTIONS

(71) Applicants: Yoshinaga Kato, Kanagawa (JP); Kiyoshi Kasatani, Kanagawa (JP); Keisuke Tsukada, Kanagawa (JP)

(72) Inventors: Yoshinaga Kato, Kanagawa (JP); Kiyoshi Kasatani, Kanagawa (JP); Keisuke Tsukada, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 34 days.

(21) Appl. No.: 15/800,227

(22) Filed: Nov. 1, 2017

(65) Prior Publication Data
US 2018/0069962 A1 Mar. 8, 2018

Related U.S. Application Data

(63) Continuation of application No. PCT/JP2016/062362, filed on Apr. 19, 2016.

(30) Foreign Application Priority Data

May 7, 2015 (JP) ................................ 2015-094654

(51) Int. Cl.
H04M 3/56 (2006.01)
H04N 7/15 (2006.01)
(Continued)

(52) U.S. Cl.
CPC ........ H04M 3/567 (2013.01); H04L 12/1822 (2013.01); H04L 65/1089 (2013.01);
(Continued)

(58) Field of Classification Search
CPC .. H04L 12/18; H04L 12/1813–12/1827; H04L 29/06414; H04L 65/403; H04M 3/567
See application file for complete search history.

(56) References Cited

U.S. PATENT DOCUMENTS

2002/0039109 A1 4/2002 Mamiya et al.
2011/0061005 A1* 3/2011 Zha ..................... H04L 12/1818
715/753
(Continued)

FOREIGN PATENT DOCUMENTS

EP 2 348 671 A1 7/2011
JP 2002-116729 4/2002
(Continued)

OTHER PUBLICATIONS

International Search Report dated Jul. 19, 2016 in PCT/JP2016/062362 filed on Apr. 19, 2016 (with English Translation).
(Continued)

*Primary Examiner* — Pao Sinkantarakorn
(74) *Attorney, Agent, or Firm* — Oblon, McClelland, Maier & Neustadt, L.L.P.

(57) ABSTRACT

An information processing apparatus connected via a communication network, the information processing apparatus including a setter configured to set a communication path by adding a communication port between the information processing apparatus and another information processing apparatus to transmit first content data of a first content; and a transmitter configured to transmit, to the other information processing apparatus, second content data of a second content created with respect to the first content according to a communication system using an electronic blackboard that is a second information processing system, from the communication port added to set the communication path between the information processing apparatus and the other information processing apparatus to transmit the first content data of the first content according to an electronic conference system that is a first information processing system.

7 Claims, 32 Drawing Sheets

(51) Int. Cl.
*H04L 29/06* (2006.01)
*H04L 12/18* (2006.01)
*G06F 3/0488* (2013.01)
*G06F 3/147* (2006.01)

(52) U.S. Cl.
CPC ............ *H04L 65/403* (2013.01); *H04M 3/56* (2013.01); *H04N 7/15* (2013.01); *G06F 3/04883* (2013.01); *G06F 3/147* (2013.01)

(56) References Cited

U.S. PATENT DOCUMENTS

| | | |
|---|---|---|
| 2011/0193932 A1 | 8/2011 | Long et al. |
| 2013/0135346 A1 | 5/2013 | Sakuramata et al. |
| 2014/0298205 A1* | 10/2014 | Oike .................... H04L 65/403 715/753 |
| 2015/0365244 A1 | 12/2015 | Schmitz |
| 2017/0163738 A1 | 6/2017 | Tamura |

FOREIGN PATENT DOCUMENTS

| | | |
|---|---|---|
| JP | 2012-081112 | 4/2012 |
| JP | 2013-131204 | 7/2013 |
| JP | 2014-195183 | 10/2014 |
| WO | WO 2014/127787 A1 | 8/2014 |
| WO | WO2016/031549 A1 | 3/2016 |

OTHER PUBLICATIONS

Written Opinion dated Jul. 19, 2016 in PCT/JP2016/062362 filed on Apr. 19, 2016.
Extended European Search Report dated Feb. 15, 2018 in Patent Application No. 16789501.0 citing references AA-AB and AO-AP therein, 7 pages.

\* cited by examiner

FIG.7

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG.8

| STROKE DATA ID | START TIME | END TIME | COLOR | WIDTH | COORDINATE ARRANGEMENT DATA ID |
|---|---|---|---|---|---|
| s001 | 20130610102502 | 20130610102505 | ff0000 | 2 | c001 |
| s002 | 20130610102612 | 20130610102615 | 000ff0 | 3 | c002 |
| s003 | 20130610102704 | 20130610102712 | 0 | 1 | c003 |
| ... | ... | ... | ... | ... | ... | st001

| COORDINATE ARRANGEMENT DATA ID |
|---|
| c001 |
| c002 |
| c003 |
| ... | st002

| COORDINATE ARRANGEMENT DATA ID |
|---|
| c001 |
| c002 |
| c003 |
| ... | st003

| COORDINATE ARRANGEMENT DATA ID |
|---|
| c001 |
| c002 |
| c003 |
| ... |

FIG.9

| X COORDINATE VALUE | Y COORDINATE VALUE | TIME DIFFERENCE | PEN PRESSURE c001 |
|---|---|---|---|
| 10 | 10 | 100 | 255 |
| 12 | 10 | 200 | 255 |
| 14 | 12 | 300 | 255 |
| ... | ... | ... | ... |

| PEN PRESSURE c002 |
|---|
| 255 |
| 255 |
| 255 |
| ... |

| PEN PRESSURE c003 |
|---|
| 255 |
| 255 |
| 255 |
| ... |

FIG.10

| MEDIA DATA ID | DATA TYPE | RECORDING TIME | X COORDINATE VALUE | Y COORDINATE VALUE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

FIG.11

| PRODUCT ID | LICENSE ID | EXPIRATION DATE |
|---|---|---|
| 1001 | 12345678abcdefgh | 2012/12/31 |
| 1001 | 4321dcba8765hgfe | – |
| ⋮ | ⋮ | ⋮ |

FIG.12

| NAME | MAIL ADDRESS |
|---|---|
| TARO | taro@alpha.co.jp |
| HANAKO | hanako@beta.co.jp |
| – | jiro@gamma.co.jp |
| ⋮ | ⋮ |

FIG.13

| |
|---|
| iwb-20130610104423.pdf |
| iwb-20130625152245.pdf |
| iwb-20130628113418.pdf |
| ⋮ |

FIG.14

| NAME | IP ADDRESS |
|---|---|
| CONFERENCE ROOM 1 | 192.0.0.1 |
| CONFERENCE ROOM 2 | 192.0.0.2 |
| – | 192.0.0.3 |
| ⋮ | ⋮ |

FIG.15

| NAME | IP ADDRESS |
|---|---|
| CONFERENCE ROOM 1 | 192.0.0.1 |
| CONFERENCE ROOM 2 | 192.0.0.2 |
| – | 192.0.0.8 |
| ⋮ | ⋮ |

FIG.16

| SEQ | OPERATION NAME | TRANSMISSION SOURCE IP ADDRESS :Port No. | TRANSMISSION DESTINATION IP ADDRESS :Port No. | OPERATION TYPE | OPERATION TARGET (PAGE DATA ID/STROKE DATA ID) | DATA |
|---|---|---|---|---|---|---|
| 1 | ADD | 192.0.0.1:50001 | 192.0.0.1:50000 | STROKE | p005 | ·····(STROKE DATA) |
| 2 | ADD | 192.0.0.1:50000 | 192.0.0.2:50001 | STROKE | p005 | ·····(STROKE DATA) |
| 3 | UPDATE | 192.0.0.2:50001 | 192.0.0.1:50000 | STROKE | s006 | (50, 40) |
| 4 | UPDATE | 192.0.0.1:50000 | 192.0.0.1:50001 | STROKE | s006 | (50, 40) |
| 5 | DELETE | 192.0.0.1:50001 | 192.0.0.1:50000 | STROKE | s007 | — |
| 6 | DELETE | 192.0.0.1:50000 | 192.0.0.2:50001 | STROKE | s007 | — |
| 7 | ADD | 192.0.0.1:50001 | 192.0.0.1:50000 | PAGE | — | — |
| 8 | ADD | 192.0.0.1:50000 | 192.0.0.2:50001 | PAGE | — | — |
| 9 | ADD | 192.0.0.2:50001 | 192.0.0.1:50000 | IMAGE | p006 | rico.jpg |
| 10 | ADD | 192.0.0.1:50000 | 192.0.0.1:50001 | IMAGE | p006 | rico.jpg |
| ... | ... | ... | ... | ... | ... | ... |

FIG.19

| COMMUNICATION ID | PASSWORD |
|---|---|
| 01aa | aaaa |
| 01ab | abab |
| 01ba | baba |
| 01bb | bbbb |
| ... | ... |

FIG.20

| COMMUNICA-TION ID | OPERATING STATE | RECEPTION DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.37

| TRANSMISSION ID | COLOR | THICK-NESS | COORDINATE 1 | COORDINATE 2 | COORDINATE 3 | ... |
|---|---|---|---|---|---|---|
| A1 | BLACK | 3pt | X1, Y1 | X2, Y2 | ... | ... |
| B1 | RED | 1pt | 10, 10 | ... | ... | ... |

INFORMATION PROCESSING APPARATUS HAVING WHITEBOARD AND VIDEO CONFERENCING FUNCTIONS

CROSS-REFERENCE TO RELATED APPLICATION

The present application is a continuation application of International Application No. PCT/JP2016/062362 filed on Apr. 19, 2016, which claims priority to Japanese Patent Application No. 2015-094654 filed on May 7, 2015. The contents of these applications are incorporated herein by reference in their entirety.

BACKGROUND OF THE INVENTION

1. Field of the Invention

The present invention relates to an information processing system.

2. Description of the Related Art

In meetings, etc., held in companies, educational institutions, and administrative agencies, etc., electronic blackboards on which stroke images such as characters, numbers, and figures, etc., can be drawn on a background image displayed on a large display, are used. As an example of an electronic blackboard, there is known an electronic information board system in which a computer device controlling a display device superimposes an insertion image on a background image and displays the images on a display device (for example, refer to Patent Literature 1).

Patent Literature 1: Japanese Unexamined Patent Application Publication No. 2013-131204

Consideration is made to encourage a user, who has been using a television (TV) conference system, to use an electronic blackboard. In this case, it is preferable to enable the user, who has been using the TV conference system, to use the electronic blackboard, by adding a function of the electronic blackboard. Accordingly, convenience is enhanced, such as the User Interface (UI) of the TV conference system being directly usable in the electronic blackboard, and therefore it is possible to promote the introduction of the electronic blackboard. Here, in order to make the TV conference system and the electronic blackboard coexist, it is conceivable to separately operate software for operating the TV conference system and software for operating the electronic blackboard.

SUMMARY OF THE INVENTION

An aspect of the present invention provides an information processing apparatus, an information processing method, and a recording medium in which one or more of the disadvantages of the related art are reduced.

According to one aspect of the present invention, there is provided an information processing apparatus connected via a communication network, the information processing apparatus including a setter configured to set a communication path by adding a communication port between the information processing apparatus and another information processing apparatus to transmit first content data of a first content; and a transmitter configured to transmit, to the other information processing apparatus, second content data of a second content created with respect to the first content according to a communication system using an electronic blackboard that is a second information processing system, from the communication port added to set the communication path between the information processing apparatus and the other information processing apparatus to transmit the first content data of the first content according to an electronic conference system that is a first information processing system.

BRIEF DESCRIPTION OF THE DRAWINGS

FIG. 7 is a conceptual diagram illustrating page data according to an embodiment of the present invention;

FIG. 8 is a conceptual diagram illustrating stroke data according to an embodiment of the present invention;

FIG. 9 is a conceptual diagram illustrating coordinate arrangement data according to an embodiment of the present invention;

FIG. 10 is a conceptual diagram illustrating media data according to an embodiment of the present invention;

FIG. 11 is a conceptual diagram illustrating a remote license management table according to an embodiment of the present invention;

FIG. 12 is a conceptual diagram illustrating an address book management table according to an embodiment of the present invention;

FIG. 13 is a conceptual diagram illustrating backup data according to an embodiment of the present invention;

FIG. 14 is a conceptual diagram illustrating a connection destination management table according to an embodiment of the present invention;

FIG. 15 is a conceptual diagram illustrating a participation site management table according to an embodiment of the present invention;

FIG. 16 is a conceptual diagram illustrating operation data according to an embodiment of the present invention;

FIG. 19 is a diagram illustrating an example of an authentication management table according to an embodiment of the present invention;

FIG. 20 is a diagram illustrating an example of a terminal management table according to an embodiment of the present invention;

FIG. 37 is a diagram illustrating an example of meta stroke information according to an embodiment of the present invention.

DETAILED DESCRIPTION OF THE PREFERRED EMBODIMENTS

Figure 1:
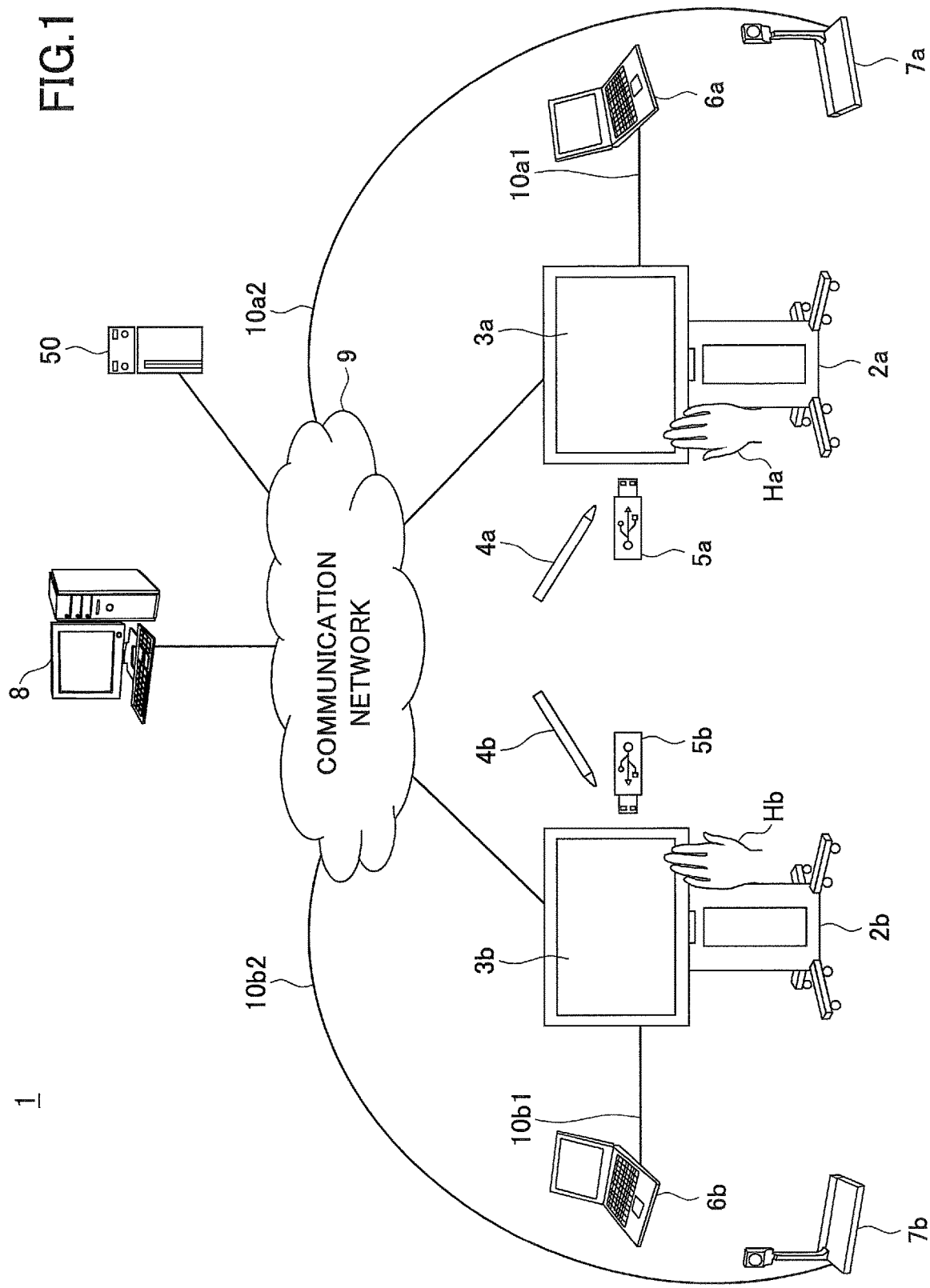
FIG. 1 is an overall configuration diagram of an image processing system according to an embodiment of the present invention.

In the related art, in order to separately operate the software for operating the TV conference system and the software for operating the electronic blackboard, it is necessary to secure a communication path between the sites (locations) where the TV conference is held, and a communication path for performing communication between the sites by using an electronic blackboard. For this reason, there is a risk of network resources being compressed at the site where the electronic blackboard is installed.

The above is applicable to a case where a function of a second information processing system, such as an electronic blackboard, is introduced in a first information processing system, such as a TV conference system.

A problem to be solved by an embodiment of the present invention is to effectively utilize network resources when introducing a function of a second information processing system in a first information processing system.

Next, embodiments for carrying out the present invention will be described based on the following examples, with reference to the drawings. The examples described below are merely examples, and embodiments to which the present invention is applied are not limited to the following examples.

Note that in all the drawings for describing the embodiments, elements having the same functions are denoted by the same reference numerals, and repetitive descriptions are omitted.

An embodiment of the present invention will be described below with reference to the drawings.

First Embodiment

<Outline of Image Processing System>

FIG. 1 is an overall configuration diagram of an image processing system 1 according to the present embodiment. Note that in FIG. 1, as a matter of simplifying descriptions, two electronic blackboards (whiteboards) 2a and 2b and associated electronic pens 4a and 4b, etc., are illustrated; however, three or more electronic blackboards and three or more electronic pens, etc., may be used.

Generally, transmission systems such as image processing systems include a data providing system for communicating content data in one direction, from a communication terminal such as one electronic blackboard to a communication terminal such as another electronic blackboard, via a transmission management system; and a communication system that mutually transmits information and emotions, etc., among a plurality of communication terminals via a transmission management system. This communication system is a system for mutually transmitting information and emotions, etc., among a plurality of communication terminals (corresponding to "communication terminals") via a communication management system (corresponding to "transmission management system"). Examples of the communication system are a TV conference system or a video conference system, a TV phone system, a voice conference system, a voice telephone system, and a Personal Computer (PC) screen sharing system, etc.

As illustrated in FIG. 1, the image processing system 1 includes the plurality of electronic blackboards 2a and 2b, the plurality of electronic pens 4a and 4b, Universal Serial Bus (USB) memories 5a and 5b, notebook PCs 6a and 6b, TV (video) conference terminals 7a and 7b, a transmission management system 50, and a PC 8. Furthermore, the electronic blackboards 2a and 2b, the TV (video) conference terminals 7a and 7b, the transmission management system 50, and the PC 8 are communicably connected via a communication network 9. Furthermore, the plurality of electronic blackboards 2a and 2b are provided with displays 3a and 3b, respectively.

The electronic blackboard 2 transmits and receives image data and voice data, etc., with the other electronic blackboards or the TV (video) conference terminals 7, and the PC 8. For example, it is possible to hold a TV conference by transmitting and receiving high-quality image data and voice data, etc., between the electronic blackboard 2a having a communication ID "01aa" and the electronic blackboard 2b having a communication ID "01bb". In the present embodiment, a case where the image of the image data is a still image will be described; however, the image may not only be a still image but also a moving image. Furthermore, both a moving image and a still image may be included in the image of the image data. The transmission management system 50 manages the plurality of electronic blackboards 2 in a unified manner.

Furthermore, the electronic blackboard 2a may display an image drawn by an event generated by the electronic pen 4a (the pen tip of the electronic pen 4a or the pen bottom of the electronic pen 4a touching the display 3a), on the display 3a. Note that the electronic blackboard 2a may change an image displayed on the display 3a, not only based on an event generated by the electronic pen 4a, but also based on an event generated by a hand Ha of the user, etc. (a gesture such as enlargement, reduction, and page turning, etc.).

Furthermore, the USB memory 5a can be connected to the electronic blackboard 2a. The electronic blackboard 2a can read electronic files such as a Portable Document Format (PDF) file from the USB memory 5a, and record electronic files in the USB memory 5a. Furthermore, to the electronic blackboard 2a, the notebook PC 6a is connected via a cable 10a1 capable of communication according to standards such as DisplayPort, Digital Visual Interface (DVI), High-Definition Multimedia Interface (HDMI) (registered trademark), and Video Graphics Array (VGA). The electronic blackboard 2a generates an event according to the display 3a being touched, and transmits event information indicating the generated event, to the notebook PC 6a, similar to an event from an input device such as a mouse or a keyboard, etc. To the communication network 9, the TV (video) conference terminal 7a is connected via a cable 10a2 capable of communicating according to the above standards. The notebook PC 6a and the TV (video) conference terminal 7a may communicate with the electronic blackboard 2a by wireless communication compliant with various wireless communication protocols such as Bluetooth (registered trademark).

On the other side, at another site where the electronic blackboard 2b is installed, similar to the above-described electronic blackboard 2a, the electronic blackboard 2b having the display 3b, the electronic pen 4b, the USB memory 5b, the notebook PC 6b, the TV (video) conference terminal 7b, the cable 10b1, and the cable 10b2 are used. Furthermore, it is also possible to change the image displayed on the display 3b based on the event generated by the user's hand Hb, etc.

Accordingly, an image drawn on the display 3a of the electronic blackboard 2a at one site is also displayed on the display 3b of the electronic blackboard 2b at another site. Conversely, an image drawn on the other display 3b of the electronic blackboard 2b at the other site is also displayed on the display 3a of the electronic blackboard 2a at one site. As described above, since the image processing system 1 can perform a remote sharing process of sharing the same image at remote locations, the image processing system 1 is highly convenient when used for a conference held at remote locations, etc.

Note that in the following description, when any electronic blackboard is indicated among a plurality of electronic blackboards, the electronic blackboard is referred to as "the electronic blackboard 2". When any display is indicated among a plurality of displays, the display is referred to as "the display 3". When any electronic pen is indicated among a plurality of electronic pens, the electronic pen is referred to as "the electronic pen 4". When any USB memory is indicated among a plurality of USB memories, the USB memory is referred to as "the USB memory 5". When any notebook PC is indicated among a plurality of notebook PCs, the notebook PC is referred to as "the notebook PC 6". When any TV (video) conference terminal is indicated among a plurality of TV (video) conference terminals, the TV (video) conference terminal is referred to as "the TV (video) conference terminal 7". Furthermore, when any hand is indicated among the hands of a plurality of users, the hand is referred to as "the hand H". When any cable is indicated among a plurality of cables, the cable is referred to as "the cable 10".

In the present embodiment, an image processing system, a transmission management system, and an electronic blackboard will be described, assuming an image processing system as an example of a communication system, a transmission management system as an example of a communication management system, and an electronic blackboard as an example of a communication terminal. That is, the electronic blackboard and the transmission management system are applied not only to an image processing system and a TV conference system or a video conference system, but also to communication systems or transmission systems.

Furthermore, in the present embodiment, an electronic blackboard will be described as an example of the information processing apparatus; however, the information processing apparatus is not limited as such. Other examples of the information processing apparatus are a desktop PC, a tablet PC, an electronic signboard (digital signage), a telestrator used in sports and weather forecasts, etc., or an image processing apparatus such as a remote image (video) diagnostic device, etc. Furthermore, although the notebook PC 6 will be described as an example of the information processing terminal; the information processing terminal is not limited as such. Other examples of the information processing terminal are a desktop PC, a tablet PC, a Personal Digital Assistant (PDA), a digital video camera, a digital camera, and a terminal capable of supplying image frames such as a game console. Furthermore, the communication network includes the Internet, a LAN (Local Area Network), and a mobile phone communication network, etc. Furthermore, in the present embodiment, although a USB memory is described as an example of a recording medium; the recording medium is not limited as such. Other examples of the recording medium are various kinds of recording media such as a secure digital (SD) card.

<Hardware Configuration of Electronic Blackboard>

Figure 2:
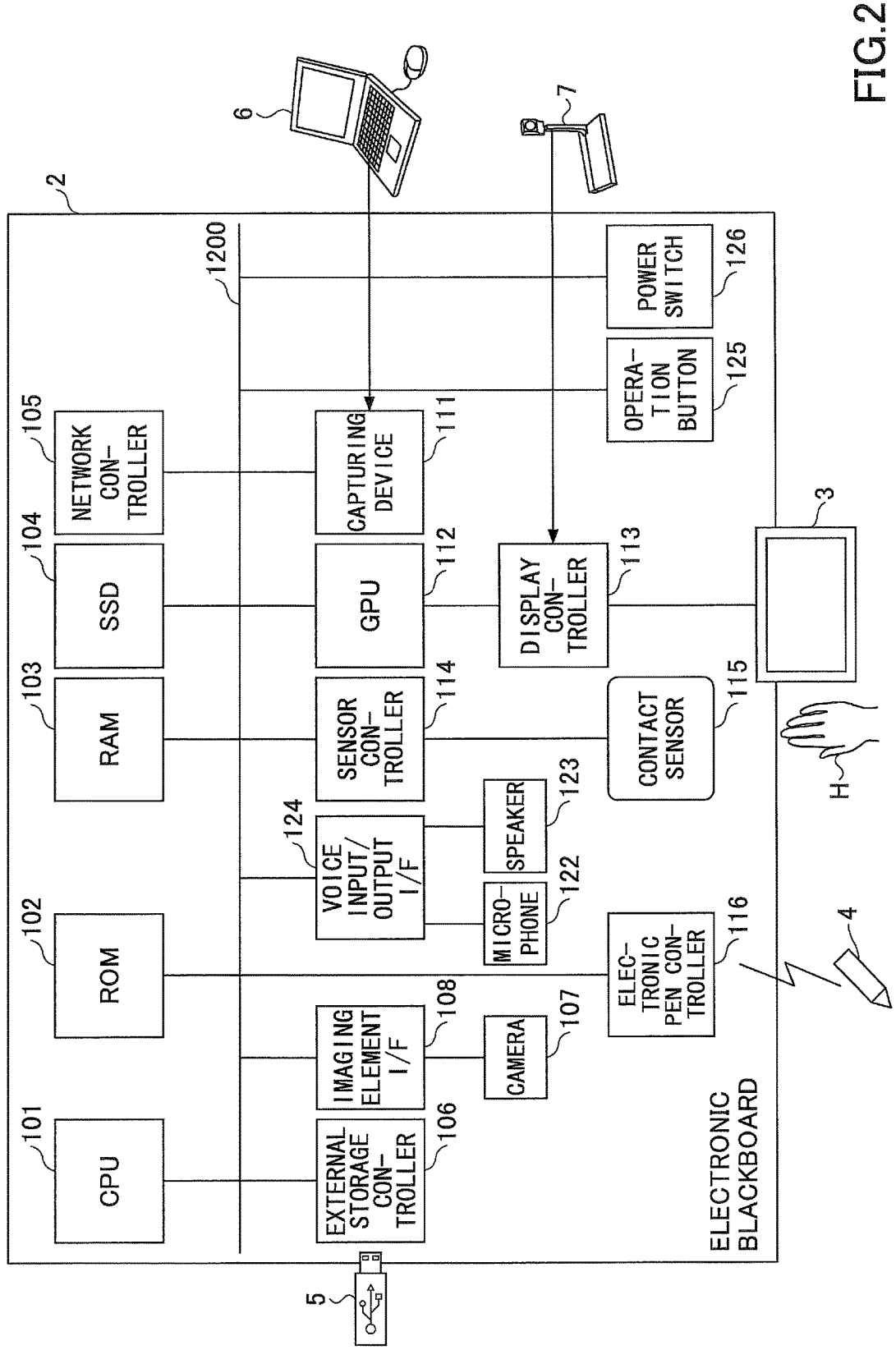
FIG. 2 is a hardware configuration diagram of an electronic blackboard according to an embodiment of the present invention.

With reference to FIG. 2, the hardware configuration of the electronic blackboard of the present embodiment will be described. FIG. 2 is a hardware configuration diagram of the electronic blackboard.

As illustrated in FIG. 2, the electronic blackboard 2 includes a Central Processing Unit (CPU) 101 for controlling the operations of the entire electronic blackboard 2, a Read-only Memory (ROM) 102 storing programs used for driving the CPU 101 such as an Initial Program Loader (IPL), a Random Access Memory (RAM) 103 used as a work area of the CPU 101, a Solid State Drive (SSD) 104 for storing various kinds of data such as a program for an electronic blackboard, a network controller 105 for controlling communication with the communication network 9, and an external storage controller 106 for controlling communication with the USB memory 5. Furthermore, the electronic blackboard 2 includes a camera 107 for capturing an image of a subject according to the control by the CPU 101 to obtain image data, an imaging element interface (I/F) 108 for controlling the driving of the camera 107, and a capturing device 111 for displaying video information as a still image or a moving image on the display of the notebook PC 6, a Graphics Processing Unit (GPU) 112 that is specifically used for graphics, and a display controller 113 for implementing control and managing the screen display for outputting output images from the GPU to the display 3 and the TV (video) conference terminal 7. The electronic blackboard 2 further includes a sensor controller 114 for controlling the process of a contact sensor 115, and the contact sensor 115 for detecting that the electronic pen 4 or the user's hand H has touched the display 3. In the present embodiment, the contact sensor 115 performs input of coordinates and detection of coordinates by an infrared ray blocking method. In the method of inputting the coordinates and detecting the coordinates, two light receiving/emitting devices, which are installed at both upper end portions of the display 3, emit a plurality of infrared rays parallel with the display 3, and the receiving element receives light that is reflected by reflecting members arranged around the display 3 and that returns along the same optical path as the optical path of the light that has been emitted. The contact sensor 115 outputs, to the sensor controller 114, the identification (ID) of the infrared rays, which are emitted by the two light emitting/receiving devices and blocked by an object, and the sensor controller 114 identifies the coordinate position that is the contact position of the object. Note that all the following IDs are examples of identification information.

Furthermore, the contact sensor 115 is not limited to the infrared ray blocking method, but may be various kinds of detection means such as a capacitive type touch panel that identifies the contact position by detecting a change in electrostatic capacity, a resistive film type touch panel that identifies the contact position by a change in the voltage of two opposing resistive films, and an electromagnetic induction type touch panel for detecting the electromagnetic induction caused by the contact of the contact object with the display unit to identify the contact position. Furthermore, the contact sensor 115 may use a camera to determine the contact and identify the coordinate position.

Furthermore, the electronic blackboard 2 is provided with an electronic pen controller 116. By communicating with the electronic pen 4, the electronic pen controller 116 determines whether the pen tip of the electronic pen 4 has touched the display 3 or the pen bottom of the electronic pen 4 has touched the display 3. Note that the electronic pen controller 116 may not only determine whether the pen tip or the pen bottom of the electronic pen 4 has touched the display 3, but may also determine whether the part of the electronic pen 4 held by the user or other parts of the electronic pen have touched the display 3.

Furthermore, the electronic blackboard 2 includes a microphone 122 for inputting voice, a speaker 123 for outputting voice, a voice input/output I/F 124 for processing input/output of voice signals between the microphone 122 and the speaker 123 according to the control by the CPU 101, an operation button 125 for accepting an operation by a user, and a power switch 126 for switching on/off the power supply of the electronic blackboard 2.

Furthermore, the electronic blackboard 2 includes a bus line 1200 such as an address bus and a data bus, etc., for electrically connecting the CPU 101, the ROM 102, the RAM 103, the SSD 104, the network controller 105, the external storage controller 106, the capturing device 111, the GPU 112, the sensor controller 114, the electronic pen controller 116, the imaging element I/F 108, the voice input/output I/F 124, the operation button 125, and the power switch 126, as illustrated in FIG. 2.

Note that the program for the electronic blackboard may be recorded in a computer readable recording medium such as a Compact Disk Read-Only Memory (CD-ROM) or a server on the network, for distribution and downloading.

<Hardware Configuration of Transmission Management System 50>

Figure 3:
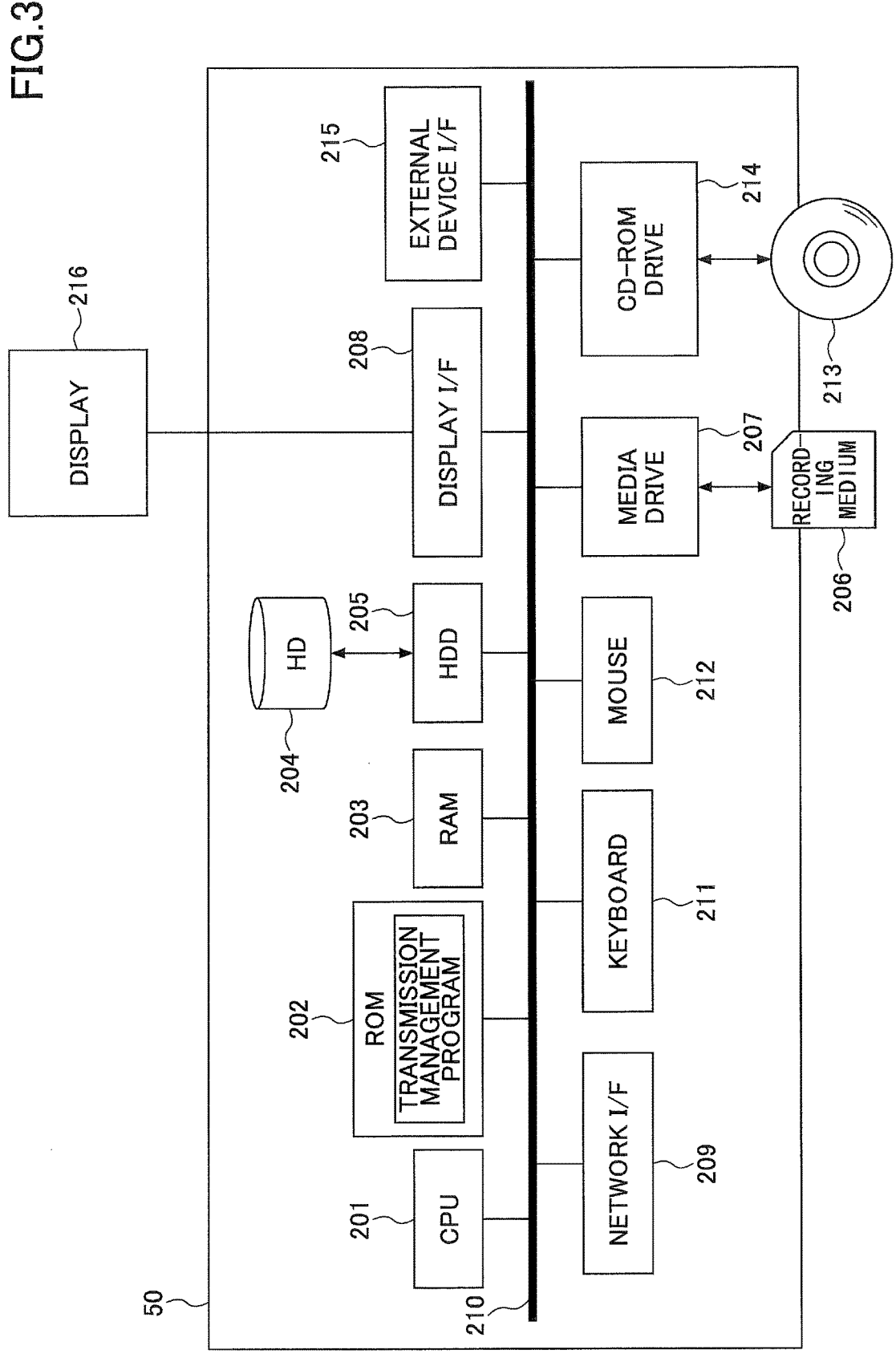
FIG. 3 is a hardware configuration diagram of a transmission management system according to an embodiment of the present invention.

The hardware configuration of the transmission management system according to the present embodiment will be described with reference to FIG. 3. FIG. 3 is a hardware configuration diagram of the transmission management system 50.

The transmission management system 50 includes a CPU 201 that controls the overall operations of the transmission management system 50, a ROM 202 that stores a transmission management program, a RAM 203 that is used as a work area of the CPU 201, a Hard Disk (HD) 204 that stores various kinds of data, a Hard Disk Drive (HDD) 205 that controls reading and writing of various kinds of data to and from the HD 204 according to the control by the CPU 201, and a media drive 207 that controls reading and writing (storage) of data to and from a recording medium 206 such as a flash memory. Furthermore, the transmission management system 50 includes a display I/F 208 for displaying various kinds of information such as a cursor, a menu, a window, characters, and images, etc., on a display 216, a network I/F 209 for performing data transmission using the communication network 9, a keyboard 211 having a plurality of keys for inputting characters, numeric values, and various instructions, etc., and a mouse 212 for selecting and executing various instructions, selecting a processing target, and moving a pointing device such as a mouse cursor, etc. Furthermore, the transmission management system 50 includes a CD-ROM drive 214 for controlling reading and writing of data to and from a CD-ROM 213 as an example of a removable recording medium, an external device I/F 215 for transmitting and receiving information with an external device, and a bus line 210 such as an address bus and a data bus for electrically connecting the above elements to each other.

Furthermore, the transmission management program may be distributed upon being recorded in a computer-readable recording medium such as the recording medium 206 or the CD-ROM 213 in a file in an installable format or an executable format. The transmission management program may be stored in the HD 204.

<Functional Configuration of Electronic Blackboard>

Figure 4:
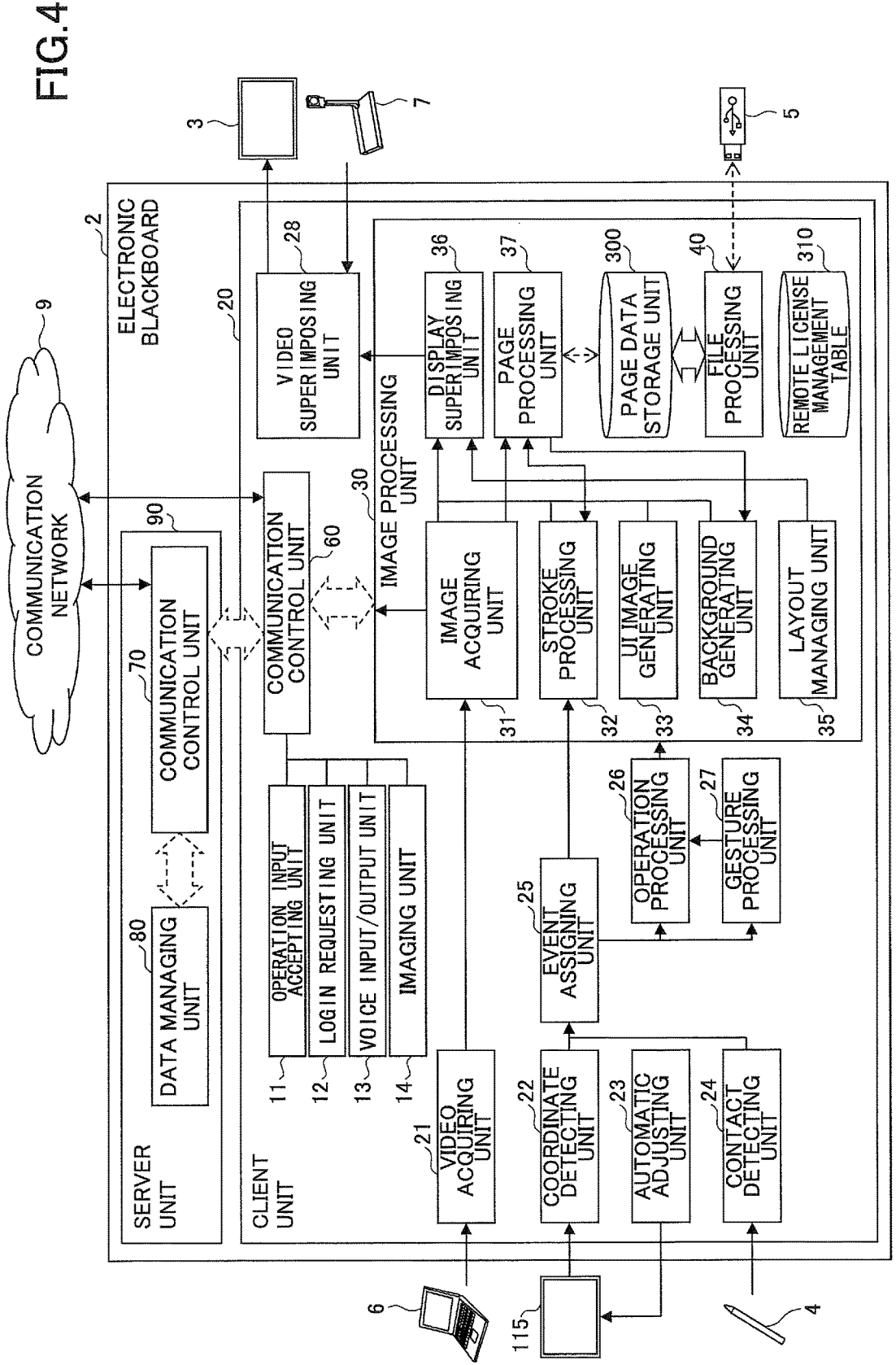
FIG. 4 is a functional block diagram of the electronic blackboard according to an embodiment of the present invention.

The overall functional configuration of the electronic blackboard 2 will be described with reference to FIG. 4. FIG. 4 is a functional block diagram of the electronic blackboard 2.

The electronic blackboard 2 has the functional configuration illustrated in FIG. 4 by the hardware configuration and programs illustrated in FIG. 2. The electronic blackboard 2 can be a "hosting device" for initially starting a remote sharing process, and the electronic blackboard 2 can also be a "participating device" to participate later in the remote sharing process already started. Furthermore, the electronic blackboard 2 is broadly formed of both a client unit 20 and a server unit 90. Among the client unit 20 and the server unit 90, the client unit 20 may be provided in the electronic blackboard 2, and the server unit 90 may be a device different from the electronic blackboard 2, such as a distribution control device. The client unit 20 and the server unit 90 are functions that may be implemented in one casing of the electronic blackboard 2. Furthermore, when the electronic blackboard 2 becomes a hosting device, the client unit 20 and the server unit 90 are implemented (executed) in this electronic blackboard 2. When the electronic blackboard 2 becomes a participating device, the client unit 20 is implemented (executed) in the electronic blackboard 2; however, the server unit 90 is not implemented (executed). That is, in FIG. 1, when the electronic blackboard 2a is the hosting device and the electronic blackboard 2b is the participating device, the client unit 20 of the electronic blackboard 2a communicates, via the server unit 90 implemented in the same electronic blackboard 2a, with the client unit 20 of the other electronic blackboard 2b. On the other side, the client unit 20 of the electronic blackboard 2b communicates with the client unit 20 of the other electronic blackboard 2a, via the server unit 90 implemented in the other electronic blackboard 2a.

[Functional Configuration of Client Unit 20]

Next, the functional configuration of the client unit 20 will be described. As illustrated in FIG. 4, the client unit 20 includes an operation input accepting unit 11, a login requesting unit 12, a voice input/output unit 13, an imaging unit 14, a video acquiring unit 21, a coordinate detecting unit 22, an automatic adjusting unit 23, a contact detecting unit 24, an event assigning unit 25, an operation processing unit 26, a gesture processing unit 27, a video superimposing unit 28, an image processing unit 30, and a communication control unit 60. Each of these functional units is a function or means implemented by any one of the constituent elements, illustrated in FIG. 2, operating according to an instruction from the CPU 101 according to a program stored in the ROM 102. There may be provided an electronic conference system program for implementing the operation input accepting unit 11, the login requesting unit 12, the voice input/output unit 13, and the imaging unit 14, among the above functional units. Furthermore, there may be provided an electronic blackboard program for implementing the video acquiring unit 21, the coordinate detecting unit 22, the automatic adjusting unit 23, the contact detecting unit 24, the event assigning unit 25, the operation processing unit 26, the gesture processing unit 27, the video superimposing unit 28, the image processing unit 30, and the communication control unit 60, among the above functional units. In this case, the electronic conference system program and the electronic blackboard program stored in the ROM 102 are interoperated with each other to operate the CPU 101. Furthermore, the electronic blackboard 2 has a storage unit constructed by the SSD 104 illustrated in FIG. 2.

The operation input accepting unit 11 is implemented by the operation button 125 and the power switch 126 illustrated in FIG. 2, and accepts various inputs from the user. For example, when the user turns on the power switch of the main body of the electronic blackboard 2, the operation input accepting unit 11 accepts the power ON and turns on the power.

The login requesting unit 12 is implemented by instructions from the CPU 101 illustrated in FIG. 2, and automatically transmits login request information indicating that login is requested, and the Internet Protocol (IP) address of the electronic blackboard 2 at the present time point, from the communication control unit 60 to the transmission management system 50 via the communication network 9, upon being triggered by the user's operation.

The voice input/output unit 13 is implemented by the microphone 122, the speaker 123, and the voice input/output I/F 124 illustrated in FIG. 2. The voice input/output unit 13 inputs the user's voice, converts the voice into voice signals to output voice data related to the voice signals, and converts the voice signals related to the voice data into a voice to output the voice. The imaging unit 14 is implemented by the camera 107 and the imaging element I/F 108 illustrated in FIG. 2, and generates image data representing an image of a subject.

The video acquiring unit 21 acquires an output video of a video output device connected to the cable 10. Upon receiving image signals from a video output device, the video acquiring unit 21 analyzes the image signals to derive the resolution of the image frame that is the display image of the video output device formed by the image signals, and image information such as the frequency of updating the image frame, and outputs this information to an image acquiring unit 31. The image data and the display data such as an output video is data in a format such as Joint Photographic Experts Group (JPEG), Bitmap, and Graphics Device Interface (GDI), etc.

The coordinate detecting unit 22 detects the coordinate position of an event (such as an action of the user's hand H touching the display 3) caused by the user on the display 3. The coordinate detecting unit 22 also detects the touched area.

The automatic adjusting unit 23 is activated when the electronic blackboard 2 is activated, and adjusts the parameters of the image processing of a sensor camera in an optical sensor system of the contact sensor 115, so that the contact sensor 115 can output an appropriate value to the coordinate detecting unit 22.

The contact detecting unit 24 detects an event caused by the user (an action in which the pen tip of the electronic pen 4 or the pen bottom of the electronic pen 4 is pressed on (touches) the display 3).

The event assigning unit 25 assigns the coordinate position of an event detected by the coordinate detecting unit 22 and the detection result detected by the contact detecting unit 24, to each of the events including stroke drawing, a UI operation, and a gesture operation.

Here, the "stroke drawing" is an event in which the user presses down the electronic pen 4 on the display 3 when a stroke image (B) to be described later is displayed on the display 3 (see FIG. 17), moves the electronic pen 4 in the pressed state, and finally releases the electronic pen 4 from the display 3. By this stroke drawing, for example, alphabetical letters "S" and "T", etc., are drawn on the display 3. Note that this "stroke drawing" does not only include drawing an image, but also includes the events of deleting an image already drawn or editing a drawn image.

Figure 17:
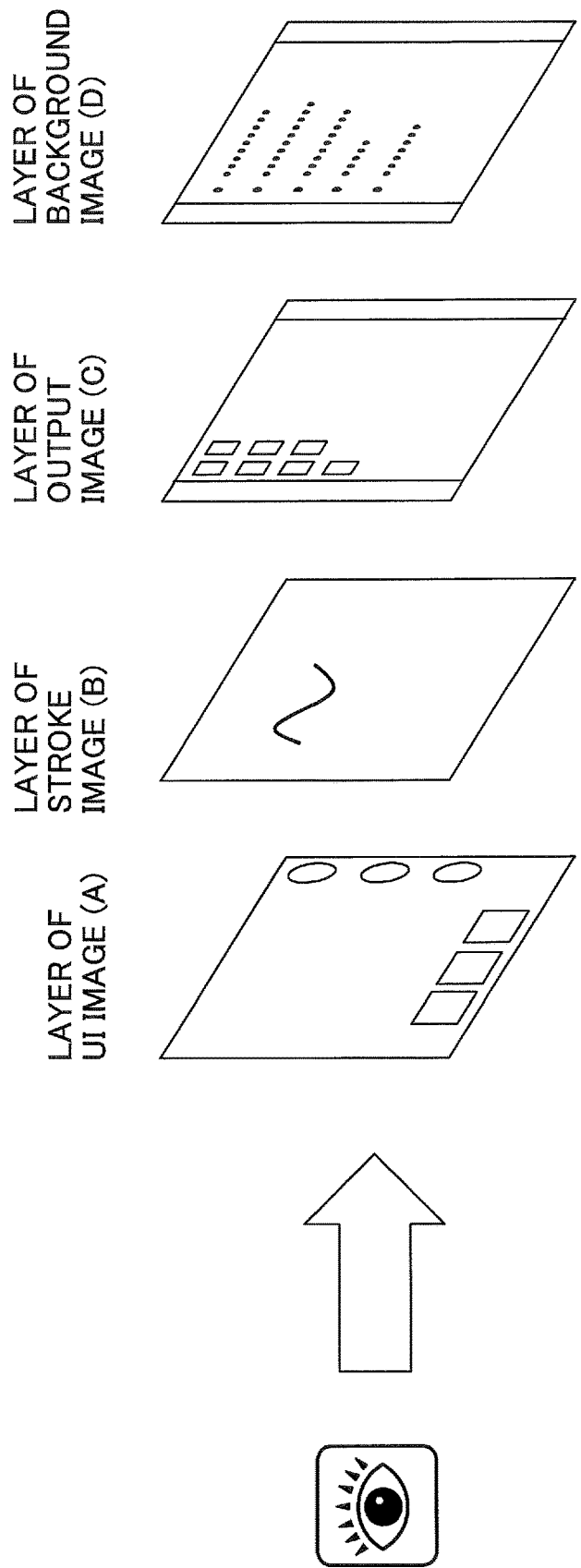
FIG. 17 is a configuration diagram of image layers according to an embodiment of the present invention.

The "UI operation" is an event in which the user presses a predetermined position with the electronic pen 4 or the hand H when a UI image (A) to be described later is displayed on the display 3 (see FIG. 17). By this UI operation, for example, the color and width of the lines drawn by the electronic pen 4 are set.

The "gesture operation" is an event in which the user touches the display 3 with the hand H or moves the hand H on the display 3, when a stroke image (B) to be described later is displayed on the display 3 (see FIG. 17). By this gesture operation, for example, it is possible to enlarge (or reduce) an image, change the display area, or switch pages, etc., by moving the hand H while the user is touching the display 3 with the hand H.

The operation processing unit 26 executes various operations according to elements of the UI for which an event has occurred, among events determined as UI operations by the event assigning unit 25. Examples of elements of the UI include buttons, lists, check boxes, and text boxes.

The gesture processing unit 27 executes an operation corresponding to an event determined to be a gesture operation by the event assigning unit 25.

The video superimposing unit 28 displays an image superimposed by a later-described display superimposing unit 36, as a video, on the video output device (the display 3, etc.). Furthermore, the video superimposing unit 28 performs a picture-in-picture operation to superimpose, on a video from a video output device (the notebook PC 6, etc.), a video sent from another video output device (such as the TV (video) conference terminal 7). Furthermore, the video superimposing unit 28 performs a switching operation such that a video obtained by the picture-in-picture operation, which is displayed on a part of the display 3, is displayed on the entire display 3.

The image processing unit 30 performs a process of superimposing the respective image layers, etc. The image processing unit 30 includes the image acquiring unit 31, a stroke processing unit 32, a UI image generating unit 33, a background generating unit 34, a layout managing unit 35, the display superimposing unit 36, a page processing unit 37, a file processing unit 40, a page data storage unit 300, and a remote license management table 310.

Among these elements, the image acquiring unit 31 acquires each frame as an image from the video acquired by the video acquiring unit 21. The image acquiring unit 31 outputs the data of the image to the page processing unit 37. This image corresponds to an output image (C) from the video output device (the notebook PC 6, etc.). Furthermore, the image acquiring unit 31 serializes the data of the image by converting the data into a text (see FIG. 8), and transmits the data to a remote image transmitting unit 63 of the communication control unit 60 to be described later, by using a communication application such as an instant message.

The stroke processing unit 32 renders an image, deletes the rendered image, and edits the rendered image, based on an event relating to the stroke drawing assigned by the event assigning unit 25. The stroke drawing image corresponds to the stroke image (B). The results of rendering, deleting, and editing of images based on the stroke drawing, are stored, as operation data to be described later, in an operation data storage unit 840 of a data managing unit 80 to be described later.

The UI image generating unit 33 generates a UI image set in advance in the electronic blackboard 2. This UI image corresponds to the UI image (A).

The background generating unit 34 receives the media data of the page data read from the page data storage unit 300 by the page processing unit 37, from the page processing unit 37. The background generating unit 34 outputs the received media data to the display superimposing unit 36. Furthermore, the image based on this media data corresponds to a background image (D). The pattern of the background image (D) is plain or a grid display, etc.

The layout managing unit 35 manages, with respect to the display superimposing unit 36, the layout information indicating the layout of each image output from the image acquiring unit 31, the stroke processing unit 32, and the UI image generating unit 33 (or the background generating unit 34). Accordingly, the layout managing unit 35 is able to send an instruction to the display superimposing unit 36, as to the positions of displaying the output image (C) and the stroke image (B), in the UI image (A) and the background image (D), or to not display the output image (C) or the stroke image (B).

Based on the layout information output from the layout managing unit 35, the display superimposing unit 36 lays out each image output from the image acquiring unit 31, the stroke processing unit 32, and the UI image generating unit 33 (the background generating unit 34).

The page processing unit 37 integrates the data of the stroke image (B) and the data of the output image (C) into a single piece of page data, and stores the page data in the page data storage unit 300. The data of the stroke image (B) forms part of the page data, as stroke arrangement data (pieces of stroke data) indicated by a stroke arrangement data ID. The data of the output image (C) forms part of the page data, as media data indicated by a media data ID. Then, when this media data is read from the page data storage unit 300, the media data is handled as data of the background image (D).

Furthermore, the page processing unit 37 transmits the media data of the temporarily stored page data, to the display superimposing unit 36 via the background generating unit 34. Accordingly, the video superimposing unit 28 can redisplay the background image (D) on the display 3. Further, the page processing unit 37 can return the stroke arrangement data (pieces of stroke data) of the page data, to the stroke processing unit 32, so that the stroke can be reedited. Furthermore, the page processing unit 37 can delete or duplicate the page data.

That is, the data of the output image (C) displayed on the display 3 at the time point when the page processing unit 37 stores the page data in the page data storage unit 300, is temporarily stored in the page data storage unit 300, and subsequently, when being read from the page data storage unit 300, the data is read as media data indicating the background image (D). Then, the page processing unit 37 outputs the stroke arrangement data indicating the stroke image (B), among the page data read from the page data storage unit 300, to the stroke processing unit 32. Furthermore, the page processing unit 37 outputs the media data indicating the background image (D), among the page data read from the page data storage unit 300, to the background generating unit 34.

The display superimposing unit 36 superimposes the output image (C) from the image acquiring unit 31, the stroke image (B) from the stroke processing unit 32, the UI image (A) from the UI image generating unit 33, and the background image (D) from the background generating unit 34, in accordance with a layout specified by the layout managing unit 35. Accordingly, the respective layers of the UI image (A), the stroke image (B), the output image (C), and the background image (D) are superimposed in an order in which the user can see the images even if the images overlap each other.

Furthermore, the display superimposing unit 36 can switch between the image (C) and the image (D) to be exclusively overlapping the image (A) and the image (B). For example, in the case where the cable 10 between the electronic blackboard 2 and the video output device (the notebook PC 6, etc.) is pulled out while the image (A), the image (B) and the image (C) are initially displayed, the image (C) can be excluded from the superimposition targets, and the image (D) may be displayed, according to specifications by the layout managing unit 35. In this case, the display superimposing unit 36 also performs processes of enlarging the display, reducing the display, and moving the display area.

The page data storage unit 300 stores page data. FIG. 7 is a conceptual diagram illustrating page data. The page data is data for one page (stroke arrangement data (pieces of stroke data) and media data) displayed on the display 3. Since there are many types of parameters included in the page data, here, the contents of the page data will be described separately in FIGS. 7 to 10.

As illustrated in FIG. 7, the page data includes a page data ID for identifying any one page of the pages; a start time indicating the time when the display of the page has started;

an end time indicating the time when rewriting of the content of the page by strokes and gestures, etc., is no longer performed; a stroke arrangement data ID for identifying the stroke arrangement data generated by strokes drawn by the electronic pen 4 or the user's hand H; and a media data ID for identifying the media data, that are stored in association with each other. The stroke arrangement data is data for displaying the stroke image (B) on the display 3. The media data is data for displaying the background image (D) on the display 3.

According to such page data, for example, when the user draws the alphabetical letter "S" with the electronic pen 4, the letter is written by one stroke, and therefore one letter alphabetical letter [S] is indicated by one stroke data ID. However, when the user draws the alphabetical letter "T" with the electronic pen 4, since the letter is written by two strokes, one character alphabetical letter "T" is indicated by two stroke data IDs.

Furthermore, the stroke arrangement data indicates detailed information as illustrated in FIG. 8. FIG. 8 is a conceptual diagram illustrating stroke arrangement data. As illustrated in FIG. 8, one piece of stroke arrangement data is expressed by a plurality of pieces of stroke data. Also, one piece of stroke data includes a stroke data ID for identifying the stroke data, a start time indicating the time of starting to write one stroke, an end time indicating the time of finishing writing one stroke, the color of the stroke, the width of the stroke, and a coordinate arrangement data ID for identifying the arrangement of the passing points of the stroke.

Furthermore, the coordinate array data indicates detailed information as illustrated in FIG. 9. FIG. 9 is a conceptual diagram illustrating coordinate arrangement data. As illustrated in FIG. 9, the coordinate arrangement data indicates information including one point (the X coordinate value and the Y coordinate value) on the display 3, the time (milliseconds (ms)) of the difference from the start time of the stroke to the time of passing the one point, and the pen pressure of the electronic pen 4 at this one point. That is, an assembly of points illustrated in FIG. 9, is indicated by one piece of coordinate arrangement data illustrated in FIG. 8. For example, when the user draws the alphabetical letter "S" with the electronic pen 4, the letter is written by a single stroke, but since the stroke passes through a plurality of passing points before finishing drawing the letter "S", the coordinate array data indicates information of the plurality of passing points.

Furthermore, the media data in the page data illustrated in FIG. 7 indicates detailed information as illustrated in FIG. 10. FIG. 10 is a conceptual diagram illustrating media data. As illustrated in FIG. 10, in the media data, the media data ID in the page data illustrated in FIG. 7, the data type of the media data, the recording time when the page data has been stored in the page data storage unit 300 from the page processing unit 37, the position of the image (the X coordinate value and the Y coordinate value) and the size of the image (width and height) displayed on the display 3 according to the page data, and data indicating the content of the media data, are associated with each other. Among this information, the position of the image displayed on the display 3 according to the page data, indicates the position at the upper left end of the image displayed according to the page data, assuming that the coordinates of the upper left end of the display 3 are (X coordinate value, Y coordinate value)=(0, 0).

Referring back to FIG. 4, the description will be continued. The remote license management table 310 manages license data necessary for executing the remote sharing process. In the remote license management table 310, as illustrated in FIG. 11, the product ID of the electronic blackboard 2, the license ID used for authentication, and the expiration date of the license, are managed in association with each other.

(Functional Configuration of File Processing Unit 40)

Figure 5:
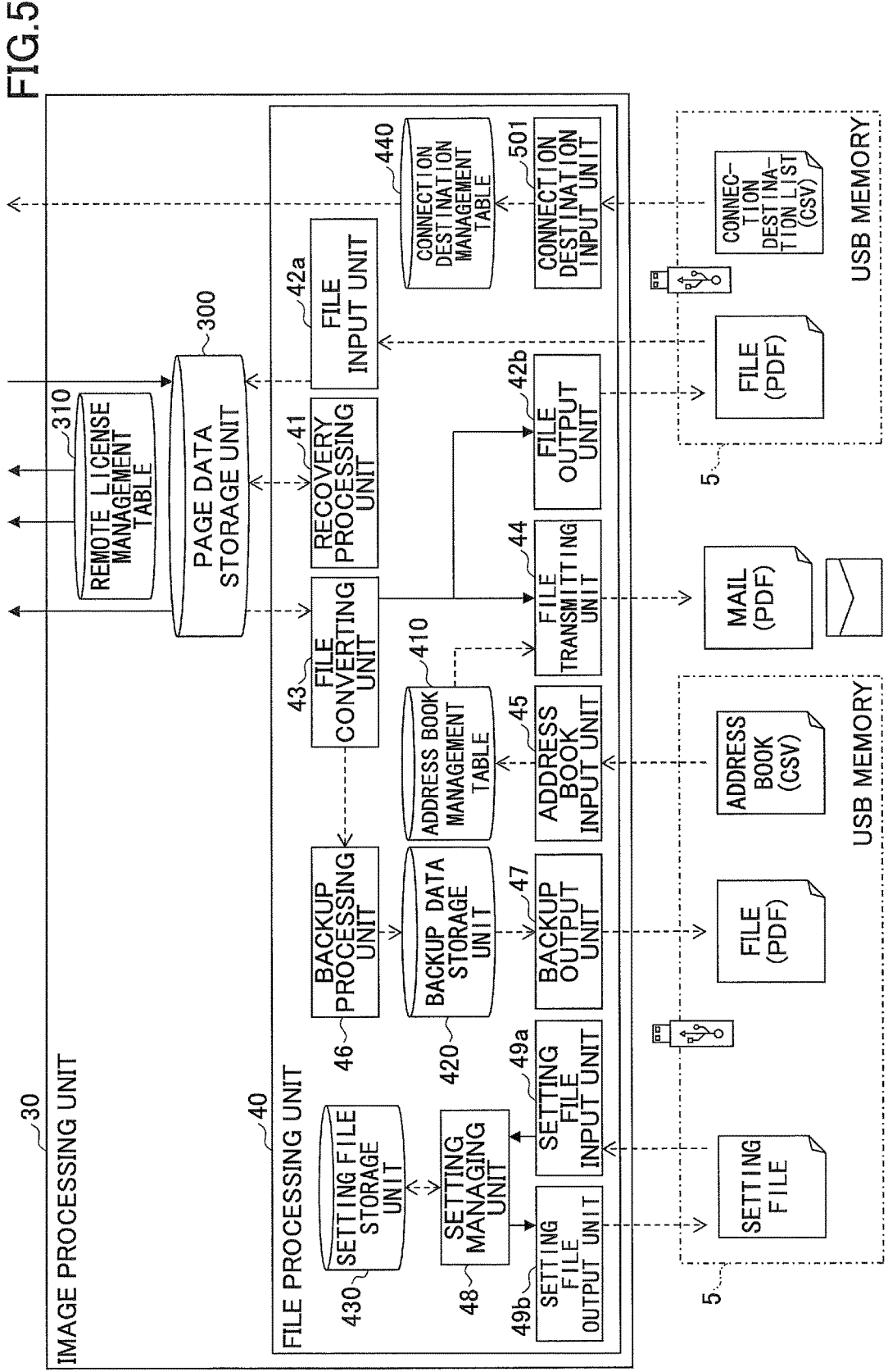
FIG. 5 is a functional block diagram of a file processing unit according to an embodiment of the present invention.

Next, with reference to FIG. 5, the functional configuration of the file processing unit 40 illustrated in FIG. 4 will be described. FIG. 5 is a functional block diagram of the file processing unit 40.

The file processing unit 40 includes a recovery processing unit 41, a file input unit 42a, a file output unit 42b, a file converting unit 43, a file transmitting unit 44, an address book input unit 45, a backup processing unit 46, a backup output unit 47, a setting managing unit 48, a setting file input unit 49a, a setting file output unit 49b, and a connection destination input unit 50. Furthermore, the file processing unit 40 includes an address book management table 410, a backup data storage unit 420, a setting file storage unit 430, and a connection destination management table 440.

Among these elements, the recovery processing unit 41 detects abnormal termination when the electronic blackboard 2 abnormally ends, and recovers unsaved page data. For example, in the case of normal termination, the page data is recorded as a PDF file in the USB memory 5 via the file processing unit 40. In the case of abnormal termination such as when the power supply goes down, the page data remains to be recorded in the page data storage unit 300. Therefore, when the power is turned on again, the recovery processing unit 41 restores the page data by reading the page data from the page data storage unit 300.

The file input unit 42a reads the PDF file from the USB memory 5, and stores each page as page data in the page data storage unit 300.

The file converting unit 43 converts the page data stored in the page data storage unit 300 into a PDF format file.

The file output unit 42b records, in the USB memory 5, the PDF file output by the file converting unit 43.

The file transmitting unit 44 attaches the PDF file generated by the file converting unit 43, to an e-mail, and transmits the e-mail. The transmission destination of the PDF file is determined by having the display superimposing unit 36 display the contents of the address book management table 410 on the display 3, and having the file transmitting unit 44 accept a selection of the destination that is made as the user operates an input device such as a touch panel. In the address book management table 410, as illustrated in FIG. 12, the name of the destination and the e-mail address of the destination are managed in association with each other. Furthermore, the file transmitting unit 44 can accept input of a mail address as the destination, as the user operates an input device such as a touch panel.

The address book input unit 45 reads the list file of e-mail addresses from the USB memory 5 and manages the list file in the address book management table 410.

The backup processing unit 46 backs up a file output by the file output unit 42b and a file transmitted by the file transmitting unit 44, by storing these files in the backup data storage unit 420. If the user does not set the backup, the backup process is not performed. The backup data is stored in a PDF format as illustrated in FIG. 13.

The backup output unit 47 stores the backed up files in the USB memory 5. When storing the files, a password is input for the purpose of security, by the user's operation of an input device such as a touch panel.

The setting managing unit 48 stores and reads various kinds of setting information of the electronic blackboard 2 in the setting file storage unit 430 to manage this information. Examples of various kinds of setting information include a network setting, a date and time setting, a regional and language setting, a mail server setting, an address book setting, a connection destination list setting, and a setting relating to backup. The network setting is, for example, the setting of the IP address of the electronic blackboard 2, the setting of the net mask, the setting of the default gateway, and the setting of the Domain Name System (DNS), etc.

The setting file output unit 49b records various kinds of setting information of the electronic blackboard 2 in the USB memory 5 as a setting file. Note that contents of the setting file cannot be viewed by the user due to security.

The setting file input unit 49a reads the setting file stored in the USB memory 5 and applies various kinds of setting information to various settings of the electronic blackboard 2.

The connection destination input unit 50 reads a list file of connection destination IP addresses of the remote sharing process from the USB memory 5, and manages the list file in the connection destination management table 440. As illustrated in FIG. 14, the connection destination management table 440 is managed in advance to reduce the trouble of having to input the IP address of the electronic blackboard playing the role of the hosting device, by the user of the participating device, when the electronic blackboard 2 is the participating device to participate in the remote sharing process. In the connection destination management table 440, the name of the site where the electronic blackboard 2, which is the hosting device that can participate, is installed; and the IP address of the electronic blackboard 2, which is the hosting device, are managed in association with each other.

Note that the connection destination management table 440 can be omitted. However, in this case, the user of the participating device needs to input the IP address of the hosting device, by using an input device such as a touch panel, in order to start the remote requesting processing with the hosting device. Therefore, the user of the participating device acquires the IP address of the hosting device from the user of the hosting device, by telephone or by e-mail, etc.

(Functional Configuration of Communication Control Unit 60)

Figure 6:
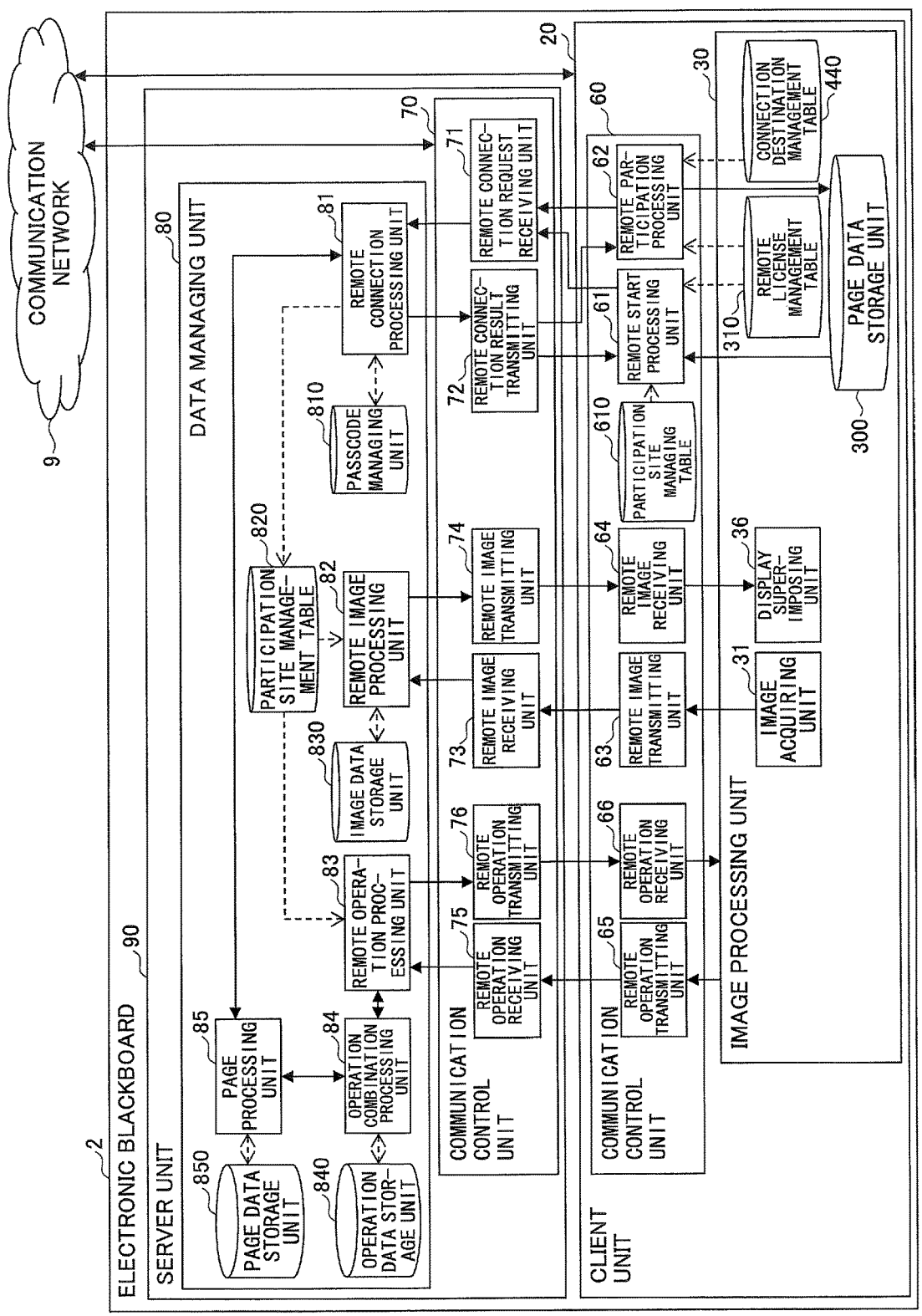
FIG. 6 is a functional block diagram of a server unit and a communication control unit according to an embodiment of the present invention.

Next, with reference to FIG. 6, a functional configuration of the communication control unit 60 will be described.

The communication control unit 60 implements control of communication for setting a communication path such as opening a message communication port with another one of the electronic blackboards 2 via the communication network 9, and communication with a communication control unit 70 described later in the server unit 90. Therefore, the communication control unit 60 includes a remote start processing unit 61, a remote participation processing unit 62, a remote image transmitting unit 63, a remote image receiving unit 64, a remote operation transmitting unit 65, a remote operation receiving unit 66, and a participation site managing table 610.

Among these elements, the remote start processing unit 61 sends, to the server unit 90 of the same electronic blackboard 2, a request to additionally open a message communication port and a request to newly start a remote sharing process, and receives the results of the requests from the server unit 90. In this case, the remote start processing unit 61 refers to the remote license management table 310, and if license information (product ID, license ID, and expiration date) is managed, the remote start processing unit 61 is able to make a request to start a remote sharing process. However, when the license information is not managed, the remote start processing unit 61 is unable to make a request to start a remote sharing process.

The participation site management table 610 is a table for managing electronic blackboards that are participating devices presently participating in the remote sharing process, when the electronic blackboard 2 is the hosting device. In the participation site management table 610, as illustrated in FIG. 15, the name of the site where the participating electronic blackboard 2 is installed and the IP address of the participating electronic blackboard 2 are managed in association with each other.

The remote participation processing unit 62 sends, via the communication network 9, a request to additionally open a message communication port and a participation request to participate in the remote sharing process, to a remote connection request receiving unit 71 in the server unit 90 of the electronic blackboard 2 that is the hosting device which has already started the remote sharing process. Also in this case, the remote participation processing unit 62 refers to the remote license management table 310. Furthermore, when the remote participation processing unit 62 participates in a remote sharing process that has already started, the remote participation processing unit 62 refers to the connection destination management table 440 and acquires the IP address of the electronic blackboard 2 of the participation destination. Note that the remote participation processing unit 62 need not refer to the connection destination management table 440, and the IP address of the electronic blackboard 2 of the participation destination may be input by the user's operation of an input device such as a touch panel.

The remote image transmitting unit 63 transmits the output image (C) sent from the video acquiring unit 21 via the image acquiring unit 31, to the server unit 90 through a message communication port that is additionally opened (hereinafter referred to as "additional message communication port").

The remote image receiving unit 64 receives, from the server unit 90, the image data, which is transmitted by the video output device connected to another electronic blackboard 2, through the additional message communication port, and outputs the image data to the display superimposing unit 36, to enable a remote sharing process.

The remote operation transmitting unit 65 transmits various kinds of operation data necessary for a remote sharing process, to the server unit 90 through the additional message communication port. Examples of various kinds of operation data include addition of a stroke, deletion of a stroke, editing (enlargement, reduction, and movement) of a stroke, storage of page data, creation of page data, duplication of page data, deletion of page data, and data relating to switching the displayed page, etc. Furthermore, the remote operation receiving unit 66 receives the operation data input at another electronic blackboard 2, from the server unit 90 through the additional message communication port, and outputs the operation data to the image processing unit 30, thereby performing a remote sharing process.

[Functional Configuration of Server Unit]

Next, the functional configuration of the server unit 90 will be described with reference to FIG. 6. The server unit 90 is provided in each electronic blackboard 2, and any of the electronic blackboards 2 can serve as a server unit. Therefore, the server unit 90 includes the communication control unit 70 and the data managing unit 80.

(Functional Configuration of Communication Control Unit 70)

Next, the functional configuration of the communication control unit 70 will be described with reference to FIG. 6.

The communication control unit 70 controls communication between the communication control unit 60 in the client unit 20 in the same electronic blackboard 2, and the communication control unit 60 in the client unit 20 in the other electronic blackboard 2 via the communication network 9. The data managing unit 80 manages operation data and image data, etc.

More specifically, the communication control unit 70 includes the remote connection request receiving unit 71, a remote connection result transmitting unit 72, a remote image receiving unit 73, a remote image transmitting unit 74, a remote operation receiving unit 75, and a remote operation transmitting unit 76.

Among these elements, the remote connection request receiving unit 71 receives a message communication port addition request for requesting addition of a message communication port and a start request for starting a remote sharing process from the remote start processing unit 61, and receives a message communication port addition request for requesting addition of a message communication port and a participation request for participating in the remote sharing process from the remote participation processing unit 62. As a result of the addition request of the message communication port to the remote start processing unit 61, the remote connection result transmitting unit 72 transmits the result of the start request of the remote sharing process, and transmits a request to add a message communication port or transmits the result of the participation request for the remote sharing process to the remote participation processing unit 62.

The remote image receiving unit 73 receives the image data (data of the output image (C)) from the remote image transmitting unit 63 through the additional message communication port, and transmits the image data to a remote image processing unit 82 to be described later. The remote image transmitting unit 74 receives the image data from the remote image processing unit 82 and transmits the image data to the remote image receiving unit 64 through the additional message communication port.

The remote operation receiving unit 75 receives operation data (data such as a stroke image (B)) from the remote operation transmitting unit 65 through the additional message communication port, and transmits the operation data to a remote operation processing unit 83 to be described later. The remote operation transmitting unit 76 receives the operation data from the remote operation processing unit 83 and transmits the operation data to the remote operation receiving unit 66 through the additional message communication port.

(Functional Configuration of Data Managing Unit)

Next, with reference to FIG. 6, the functional configuration of the data managing unit 80 will be described.

The data managing unit 80 includes a remote connection processing unit 81, the remote image processing unit 82, the remote operation processing unit 83, an operation combination processing unit 84, and a page processing unit 85. Furthermore, the data managing unit 80 includes a passcode managing unit 810, a participation site management table 820, an image data storage unit 830, an operation data storage unit 840, and a page data storage unit 850.

Among these elements, the remote connection processing unit 81 starts a remote sharing process and ends a remote sharing process. The remote connection processing unit 81 opens a message communication port according to a message communication port addition request received from the remote start processing unit 61 by the remote connection request receiving unit 71. Furthermore, based on license information received together with a remote sharing process start request from the remote start processing unit 61, or license information received together with a participation request for participating in a remote sharing process from the remote participation processing unit 62, the remote connection processing unit 81 confirms whether there is a license and whether the present time is within the license period. Furthermore, the remote connection processing unit 81 confirms whether the participation requests from the other electronic blackboards 2 that are the client units, exceed a predetermined number of participants that can participate. Furthermore, the remote connection processing unit 81 opens a message communication port according to a message communication port addition request from another electronic blackboard 2. Furthermore, the remote connection processing unit 81 determines whether a passcode, which is sent when a participation request for participating in a remote sharing process is made from another electronic blackboard 2, is the same as the passcode managed by the passcode managing unit 810, and if the passcodes are the same, the remote connection processing unit 81 allows the participation in the remote sharing process. Note that the passcode is issued by the remote connection processing unit 81 when a new remote sharing process is started, and the user of the electronic blackboard 2, which is a participating device attempting to participate in the remote sharing process, is notified of the passcode by telephone or electronic mail, etc., from the user of the electronic blackboard 2 serving as the hosting device. Accordingly, the user of the participating device who is attempting to participate in the remote sharing process, will be allowed to participate, by inputting the passcode to the participating device by an input device such as a touch panel to make a participation request. Note that when the usability of the user is to be prioritized over security, confirmation of the passcode may be omitted, and only the license status may be checked.

When the electronic blackboard 2 is the hosting device, the remote connection processing unit 81 stores, in the participation site management table 820 in the server unit 90, the participation site information included in the participation request sent from the remote participation processing unit 62 of the participating device via the communication network 9. Then, the remote connection processing unit 81 reads the remote site information stored in the participation site management table 820, and transmits the remote site information to the remote connection result transmitting unit 72. The remote connection result transmitting unit 72 transmits the remote site information to the remote start processing unit 61 in the client unit 20 of the same hosting device. The remote start processing unit 61 stores the remote site information in the participation site managing table 610. Accordingly, in the hosting device, both the client unit 20 and the server unit 90 manage the remote site information.

The remote image processing unit 82 receives image data (output image (C)) from a video output device (the notebook PC 6, etc.) connected to the client unit 20 of each electronic blackboard 2 participating in the remote sharing process (including the client unit 20 of the own electronic blackboard 2 which is the hosting device), via the additional message communication port, and stores the image data in the image data storage unit 830. Furthermore, the remote image processing unit 82 determines the order of displaying the image data to be subjected to the remote sharing process, according to the order of the time of arriving at the server unit 90 of the own electronic blackboard 2 that is the hosting device. Furthermore, the remote image processing unit 82 refers to the participation site management table 820 and transmits the image data in the determined order as described above, to the client units 20 of all the electronic blackboards 2 participating in the remote sharing process (including the client unit 20 of the own electronic blackboard 2 serving as the hosting device), via the communication control unit 70 (the remote image transmitting unit 74).

The remote operation processing unit 83 receives various kinds of operation data such as a stroke image (stroke image (B) etc.), etc., drawn at the client unit 20 of each electronic blackboard 2 participating in the remote sharing process (including the client unit 20 of the own electronic blackboard 2 that is the hosting device), via the additional message communication port, and determines the display order of the images to be subjected to the remote sharing process, to the order of the time of arriving at the server unit 90 of the own electronic blackboard 2 serving as the hosting device. Note that the various kinds of operation data are the same as the various kinds of operation data described above. Furthermore, the remote operation processing unit 83 refers to the participation site management table 820 and transmits the operation data to the client units 20 of all of the electronic blackboards 2 participating in the remote sharing process (including the client unit of the own electronic blackboard serving as the hosting device).

The operation combination processing unit 84 combines the pieces of operation data of the respective electronic blackboards 2 output from the remote operation processing unit 83, and stores operation data as the result of this combination in the operation data storage unit 840, and also returns the operation data to the remote operation processing unit 83. This operation data is transmitted from the remote operation transmitting unit 76 to the client unit 20 of the electronic blackboard 2 that is the hosting device and the client units 20 of the respective electronic blackboards 2 that are the participating devices via the additional message communication port, such that an image related to the same operation data is displayed on each of the electronic blackboards 2. For this purpose, as illustrated in FIG. 16, the operation data includes Sequence (SEQ), the operation name of the operation data, the IP address of the electronic blackboard 2 and the Port No. of the client unit (the server unit) that is the transmission source of the operation data, the IP address of the electronic blackboard 2 and the Port No. of the client unit 20 (the server unit 90) that is the transmission destination of the operation data, the operation type of the operation data, the operation target of the operation data, and data indicating the content of the operation data, in association with each other. For example, SEQ 1 indicates that when a stroke has been drawn at the client unit 20 (Port No.: 50001) of the electronic blackboard 2 (IP address: 192.0.0.1) serving as the hosting device, operation data has been transmitted to the server unit 90 (Port No.: 50000) of the electronic blackboard 2 (IP address: 192.0.0.1) that is the same hosting device. In this case, the operation type is "STROKE", the operation target is the page data ID "p005", and the data indicating the content of the operation data is data indicating a stroke. Furthermore, SEQ2 indicates that from the server unit 90 (Port No.: 50000) of the electronic blackboard 2 (IP address: 192.0.0.1) serving as the hosting device, operation data has been transmitted to the client unit 20 (Port No.: 50001) of another electronic blackboard 2 (IP address: 192.0.0.1) that is a participating device.

Note that since the operation combination processing unit 84 performs the combination in the order in which the operation data is input to the operation combination processing unit 84, if the communication network 9 is not congested, the stroke image (B) is displayed on the display 3 of all the electronic blackboards 2 participating in the remote sharing process, in the order of strokes drawn by the user of each electronic blackboard 2.

The page processing unit 85 has a function similar to that of the page processing unit 37 in the image processing unit 30 of the client unit 20, and also in the server unit 90, the page data illustrated in FIGS. 7 to 9 is stored in the page data storage unit 850. The page data storage unit 850 has the same contents as the page data storage unit 300 in the image processing unit 30.

<Functional Configuration of Transmission Management System>

Figure 18:
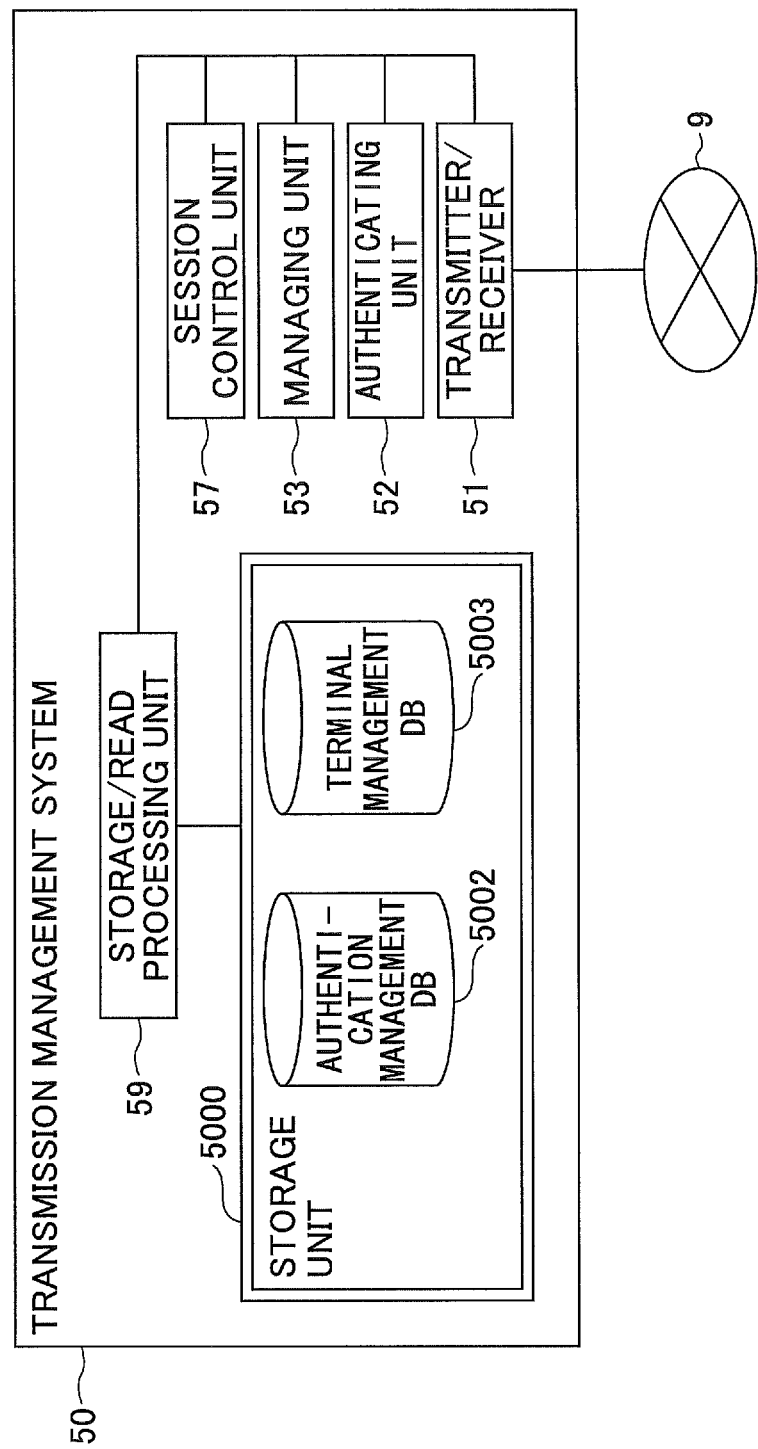
FIG. 18 is a functional block diagram of a transmission management system according to an embodiment of the present invention.

Next, functions (or means) of the transmission management system 50 will be described. As illustrated in FIG. 18, the transmission management system 50 includes a transmitter/receiver 51, an authenticating unit 52, a managing unit 53, a session control unit 57, and a storage/read processing unit 59. Each of these functional units is a function or means implemented by operating any one of the components illustrated in FIG. 3 according to an instruction from the CPU 201 according to a program stored in the ROM 202. Furthermore, the transmission management system 50 includes a storage unit 5000 constructed by the ROM 202, the RAM 203, or the HDD 205 illustrated in FIG. 3.

<Authentication Management Table>

In the storage unit 5000, an authentication management database (DB) 5002 configured with an authentication management table as illustrated in FIG. 19, is constructed. In this authentication management table, each of the communication IDs of all the electronic blackboards 2 managed by the transmission management system 50, is managed in association with a password. For example, in the terminal authentication management table illustrated in FIG. 19, it is indicated that the communication ID of the electronic blackboard 2a is "01aa" and the password of the electronic blackboard 2a is "aaaa".

<Terminal Management Table>

In the storage unit 5000, a terminal management DB 5003 configured with a terminal management table as illustrated in FIG. 20, is constructed. In this terminal management table, for each communication ID of each electronic blackboard 2, the operating state of each electronic blackboard 2, the reception date and time when the login request information described later has been received by the transmission management system 50, and the IP address of the electronic blackboard 2, are associated with each other. For example, in the terminal management table illustrated in FIG. 20, with respect to the electronic blackboard 2a having a communication ID "01aa", the operating state is "online", the date and time when the login request information has been received by the transmission management system 50 is "13:40 on Nov. 10, 2009", and the IP address of the electronic blackboard 2a is "1.2.1.3".

<Functional Units of Transmission Management System>

Next, each functional unit of the transmission management system 50 will be described in detail. In the following, in describing each functional unit of the transmission management system 50, a description is also given of the relationship with the main constituent elements for implementing each functional unit of the transmission management system 50, among the constituent elements illustrated in FIG. 3.

First, the transmitter/receiver 51 is executed by the network I/F 209 illustrated in FIG. 3, and the transmitter/ receiver 51 transmits and receives various kinds of data to and from the electronic blackboard 2 via the communication network 9. The authenticating unit 52 searches the authentication management DB 5002 of the storage unit 5000, by using the communication ID and password included in the login request information received via the transmitter/receiver 51 as a search key, and determines whether the same communication ID and password are managed in the authentication management DB 5002 to perform terminal authentication.

In order to manage the operating state of the electronic blackboard 2 that has requested to log in, the managing unit 53 stores and manages, in the terminal management table, the communication ID of the electronic blackboard 2, the operation state of the electronic blackboard 2, the reception date and time of when the login request information has been received at the transmission management system 50, and the IP address of the electronic blackboard 2, in association with each other.

The session control unit 57 is implemented by an instruction from the CPU 201, and the session control unit 57 controls the establishment of a communication session for transmitting image data and sound data, etc., via the communication network 9 between the electronic blackboards (2a and 2b). The method of establishing a communication session is not particularly limited. For example, when a relay device that relays image data and sound data, etc., is provided in the communication network 9, connection information for connecting to the relay device is transmitted from the transmitter/receiver 51 to the electronic blackboards (2a and 2b) based on control by the session control unit 57. Furthermore, the transmitter/receiver 51 may transmit a request to start relaying the image data and the sound data between the electronic blackboards (2a and 2b) to the relay device, based on the control by the session control unit 57. Based on the above control, when the communication session is established, the electronic blackboard (2a, 2b) can transmit and receive image data and sound data to and from the electronic blackboard (2b, 2a) that is the communication partner.

<Process or Operation of Embodiment>

Figure 21:
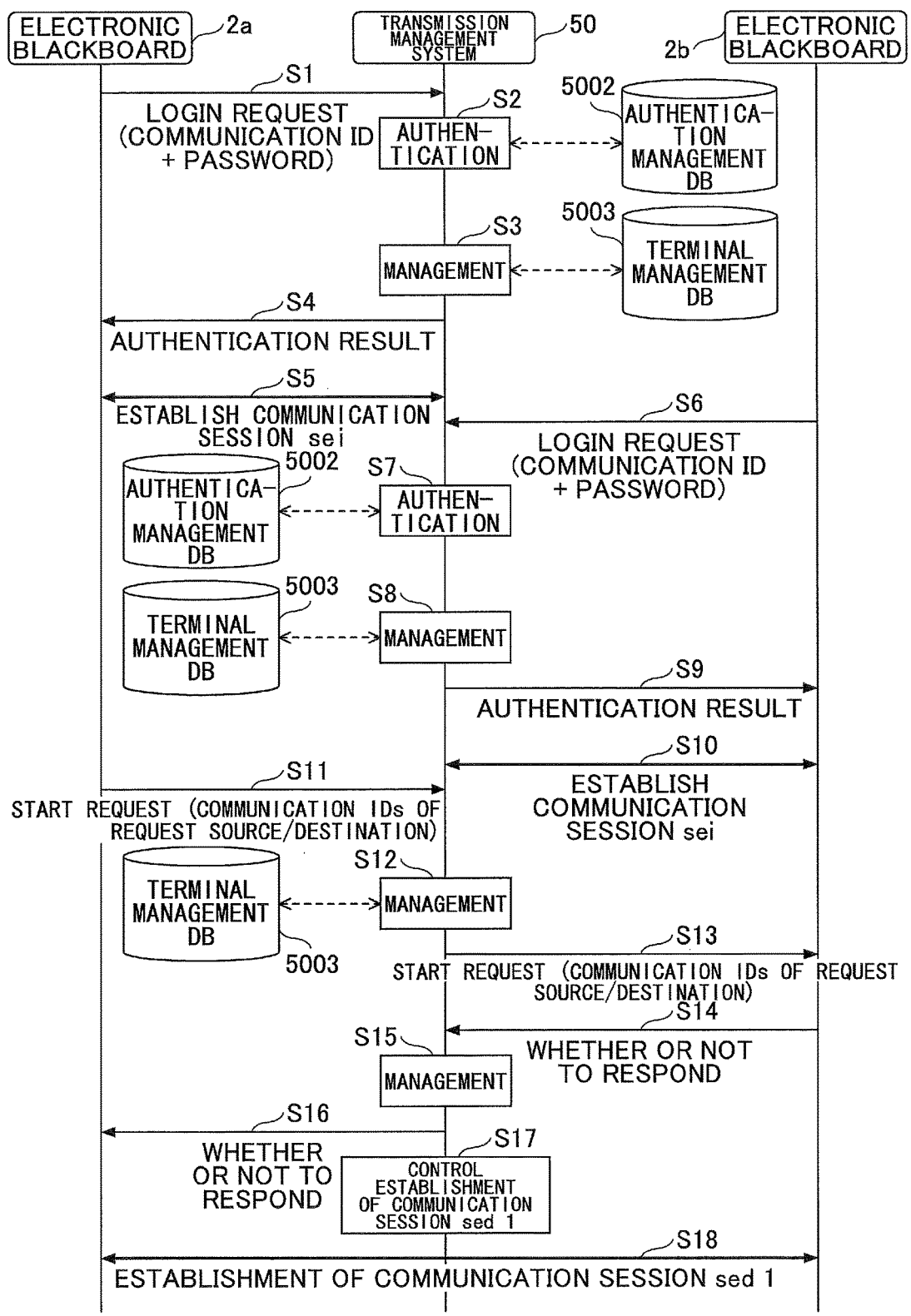
FIG. 21 is a sequence diagram illustrating a process of an image processing system according to an embodiment of the present invention.
Figure 22:
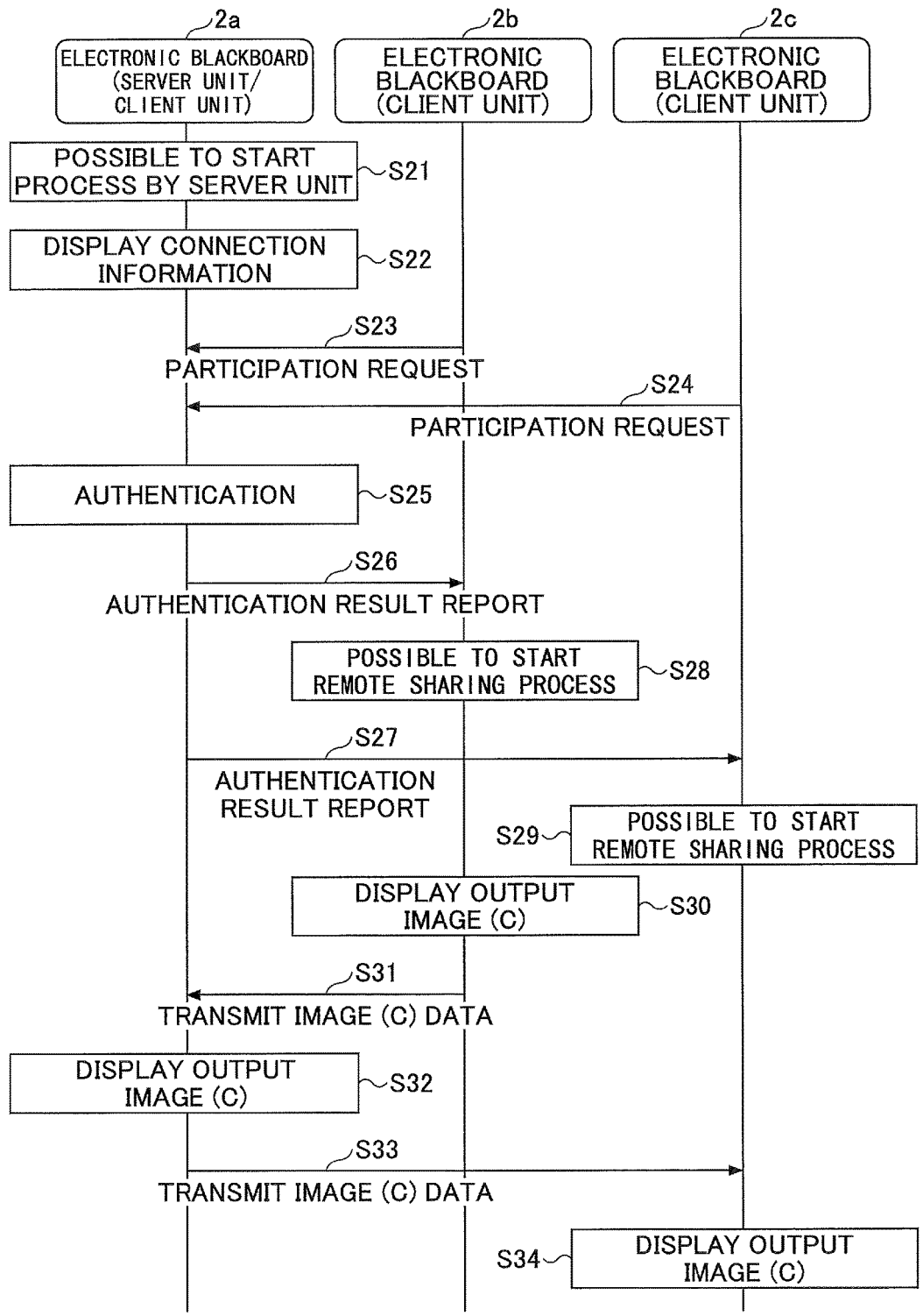
FIG. 22 is a sequence diagram illustrating a process of electronic blackboards according to an embodiment of the present invention.
Figure 23:
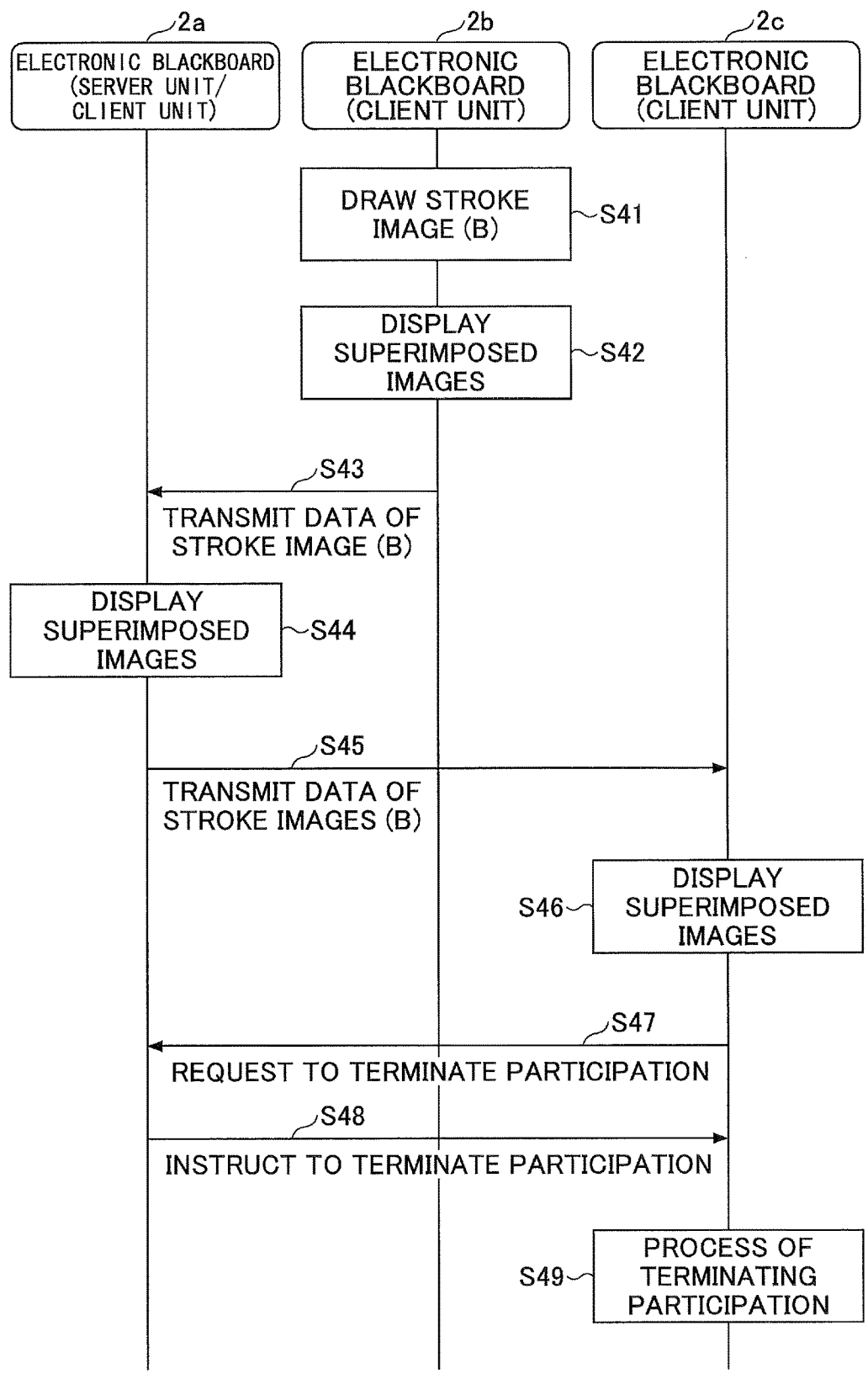
FIG. 23 is a sequence diagram illustrating a process of electronic blackboards according to an embodiment of the present invention.

Next, with reference to FIGS. 21 to 23, the process or operation of the present embodiment will be described. FIGS. 21 to 23 are sequence diagrams illustrating the processes of the electronic blackboards.

In the embodiment illustrated in FIG. 21, a case where the electronic blackboard 2a plays a role of a hosting device (the server unit 90 and the client unit 20) hosting a remote sharing process, and the electronic blackboard 2b plays a role of a participating device (the client unit 20) participating in the remote sharing process, will be described. In the embodiment illustrated in FIG. 22 and FIG. 23, a case where the electronic blackboard 2a plays a role of a hosting device (the server unit 90 and the client unit 20) hosting a remote sharing process, and the electronic blackboards 2b and 2c play a role of participating devices (the client unit 20) participating in the remote sharing process, will be described. Furthermore, here, to the electronic blackboards 2a, 2b, and 2c, the displays 3a, 3b, and 3c are respectively connected, and the notebook PCs 6a, 6b, and 6c are also respectively connected. The electronic pens 4a, 4b, and 4c are used at the electronic blackboards 2a, 2b, and 2c, respectively.

(Session Establishment Processing)

With reference to FIG. 21, a process in which the electronic blackboards 2a and 2b establish a session will be described.

The electronic blackboard 2a makes a login request to the transmission management system 50, by the login requesting unit 12 (step S1). The login request includes a communication ID and a password for identifying the electronic blackboard 2a that is the login request source. Accordingly, the transmitter/receiver 51 of the transmission management system 50 receives the login request, the communication ID, and the password.

Next, the authenticating unit 52 determines whether the same set of the communication ID and password as the set received by the transmitter/receiver 51, is managed by the authentication management table (see FIG. 19), to authenticate the electronic blackboard 2a that is the login request source (step S2). Then, when the authenticating unit 52 determines that the electronic blackboard is a legitimate electronic blackboard by this authentication process, the managing unit 53 manages the operating state to be "online", with respect to the corresponding communication ID in the terminal management table (see FIG. 20) (step S3).

Next, the transmitter/receiver 51 transmits the authentication result to the electronic blackboard 2a that is the login request source (step S4). Accordingly, the login requesting unit 12 of the electronic blackboard 2a receives the authentication result. When the authenticating unit 52 determines in step S2 that the electronic blackboard 2 is a legitimate electronic blackboard 2, a communication session sei is established between the electronic blackboard 2a that is the login request source and the transmission management system 50 (step S5). In order to distinguish the communication session sei from the communication session (sed1) between electronic blackboards, the communication session between each electronic blackboard 2 and the transmission management system 50 is referred to as the communication session sei.

Similarly, as illustrated in FIG. 21, the electronic blackboard 2b makes a login request to the transmission management system 50, by the login requesting unit 12 (step S6). This login request includes a communication ID and a password for identifying the electronic blackboard 2b that is the login request source. Accordingly, the transmitter/receiver 51 of the transmission management system 50 receives the login request, the communication ID, and the password.

Next, the authenticating unit 52 determines whether the same set of the communication ID and password as the set received by the transmitter/receiver 51, is managed by the authentication management table (see FIG. 19), to authenticate the electronic blackboard 2b that is the login request source (step S7). Then, when the authenticating unit 52 determines that the electronic blackboard is a legitimate electronic blackboard by this authentication process, the managing unit 53 manages the operating state to be "online (communication possible)", with respect to the corresponding communication ID in the terminal management table (see FIG. 20) (step S8).

Next, the transmitter/receiver 51 transmits the authentication result to the electronic blackboard 2b that is the login request source (step S9). Accordingly, the login requesting unit 12 of the electronic blackboard 2b receives the authentication result. When the authenticating unit 52 determines in step S7 that the electronic blackboard is a legitimate electronic blackboard, a communication session sei is established between the electronic blackboard 2b that is the login request source and the transmission management system 50 (step S10).

Next, a process for establishing a communication session for transmitting content data between electronic blackboards will be described. The communication session for transmitting content data between the electronic blackboards described above includes a communication session sed1 for transmitting sound data, image data, and operation data between the electronic blackboards 2.

In response to an operation of the operation button 125 by the user, the communication control unit 60 of the electronic blackboard 2a requests the transmission management system 50 to start communication (step S11). The communication start request includes the communication ID of the electronic blackboard 2a that is the communication start request source and the communication ID of the electronic blackboard 2b that is the destination. Hereinafter, a case where the communication start request source is the electronic blackboard 2a and the electronic blackboard 2b is the destination, will be described.

The transmitter/receiver 51 of the transmission management system 50 receives the communication start request. Subsequently, the managing unit 53 of the transmission management system 50 manages the operating state to be "online (during communication)" with respect to the communication ID of the electronic blackboard 2a that is the communication start request source, in the terminal management table (see FIG. 20) (step S12).

Next, the transmitter/receiver 51 of the transmission management system 50 sends a request to the electronic blackboard 2b that is the destination to start communication (step S13). This communication start request includes the communication ID of the electronic blackboard 2a that is the communication start request source and the communication ID of the electronic blackboard 2b that is the destination, transmitted in step S11. Accordingly, the destination electronic blackboard 2b that is the destination receives the communication start request.

In response to the communication start request, the electronic blackboard 2b transmits information indicating whether or not to respond to the transmission management system 50 by the communication control unit 60 according to the operation of the operation button 125 by the user (step S14). The information indicating whether or not to respond indicates that a response will be given when the user starts a call on the electronic blackboard 2b side that is the destination, and that a response will not be given when the user does not start a call on the electronic blackboard 2b side that is the destination. Hereinafter, a description of the case where the electronic blackboard 2b transmits information indicating that a response will be given, to the transmission management system 50, will be continued.

Accordingly, the transmitter/receiver 51 of the transmission management system 50 receives information indicating whether or not to respond. Subsequently, the managing unit 53 of the transmission management system 50 manages the operating state to be "online (during communication)" with respect to the communication ID of the destination electronic blackboard 2b in the terminal management table (see FIG. 20) (step S15).

Next, the transmitter/receiver 51 of the transmission management system 50 transmits, to the electronic blackboard 2a that is the start request source, the information indicating that a response will be given, that has been transmitted from the destination electronic blackboard 2b in step S14 (step S16). Accordingly, the electronic blackboard 2a receives the information indicating that a response will be given, by the communication control unit 60.

Subsequently, the session control unit 57 of the transmission management system 50 controls the establishment of a communication session sed1 for transmitting image data and sound data via the communication network 9 between the electronic blackboards (2a and 2b) (step S17). The method of establishing the communication session sed1 is not particularly limited. For example, when a relay device that relays image data and sound data is provided in the communication network 9, connection information for connecting to the relay device is transmitted to the electronic blackboards (2a and 2b) by the transmitter/receiver 51, based on control by the session control unit 57. Furthermore, according to the control by the session control unit 57, the transmitter/receiver 51 may transmit, to the relay device, a request to start relaying image data and sound data between the electronic blackboards (2a and 2b). Based on the above control, the communication session sed1 is established (step S18). Accordingly, the electronic blackboard (2a, 2b) can transmit and receive image data, sound data, and operation data to and from the electronic blackboard (2b, 2a) that is the communication partner.

(Participation Process)

A process for the electronic blackboards 2b and 2c to participate in the remote sharing process will be described with reference to FIG. 22.

When the user turns on the power switch 126 of the electronic blackboard 2a, the client unit 20 of the electronic blackboard 2a is activated. Then, when the user performs an operation to activate the server unit 90 with the operation button 125 such as a touch panel, the remote start processing unit 61 of the client unit 20 outputs an instruction to start a process by the server unit 90, to the remote connection request receiving unit 71 of the server unit 90 of the same electronic blackboard 2a. Accordingly, in the electronic blackboard 2a, not only the client unit 20 but also the server unit 90 can start various processes (step S21).

Next, the UI image generating unit 33 in the client unit 20 of the electronic blackboard 2a generates connection information, which is used for establishing a connection with the electronic blackboard 2a, and the video superimposing unit 28 displays the connection information, which has been obtained from the UI image generating unit 33 via the display superimposing unit 36, on the display 3a (step S22). This connection information includes the IP address of the hosting device and a passcode generated for the present remote sharing process. In this case, the passcode stored in the passcode managing unit 810 is read by the remote connection processing unit 81, and sequentially transmitted to the remote connection result transmitting unit 72 and the remote start processing unit 61. Furthermore, the passcode is transmitted from the communication control unit 60 including the remote start processing unit 61, to the image processing unit 30, and is finally input to the UI image generating unit 33. Thus, the connection information will include a passcode. Then, the connection information is transmitted to the users of the electronic blackboards 2b and 2c by the user of the electronic blackboard 2a by telephone or electronic mail. Note that when there is the connection destination management table 440, even if the connection information does not include the IP address of the hosting device, the participating device can make a participation request.

Next, in the electronic blackboards 2b and 2c, when the input of the connection information is accepted, according to each user's operation of the operation button 125 such as the touch panel, the remote participation processing unit 62 in the client unit 20 of each electronic blackboard 2b and 2c makes a request to add a message communication port, together with a participation request by transmitting the passcode, to the communication control unit 70 in the server unit 90 of the electronic blackboard 2a, based on the IP address in the connection information (steps S23 and S24). Accordingly, the remote connection request receiving unit 71 of the communication control unit 70 receives the message communication port addition request and the participation request (including the passcode), from each of the electronic blackboards 2b and 2c, opens the message communication port, and outputs the passcode to the remote connection processing unit 81. Here, a port number may be specified in the message communication port addition request, or a port number to be added by the message communication port addition request may be set in advance.

Next, the remote connection processing unit 81 authenticates the passcode received from each electronic blackboard 2b and 2c by using the passcode managed by the passcode managing unit 810 (step S25). Then, the remote connection result transmitting unit 72 sends a report indicating the authentication result to the client unit 20 of each electronic blackboard 2b and 2c (steps S26 and S27). When it is determined that each of the electronic blackboards 2b and 2c is a legitimate electronic blackboard by the authentication in step S25, communication of a remote sharing process is established between the electronic blackboard 2a serving as the hosting device and the electronic blackboards 2b and 2c that are the participating devices, and the remote participation processing unit 62 in the client unit 20 of each electronic blackboard 2b and 2c enables the start of the remote sharing process with the other electronic blackboards (steps S28 and S29).

(Display of Output Image)

Next, a process of displaying the output image (C) in the remote sharing process will be described.

First, the electronic blackboard 2b displays the output image (C) on the display 3b (step S30). Specifically, the image acquiring unit 31 of the electronic blackboard 2b receives data of the output image (C) displayed on the notebook PC 6b, from the notebook PC 6b via the video acquiring unit 21, and transmits the data of the output image (C) to the display 3b via the display superimposing unit 36 and the video superimposing unit 28, and then the display 3b displays the output image (C).

Next, the image processing unit 30 including the image acquiring unit 31 of the electronic blackboard 2b transmits the data of the output image (C) to the remote image transmitting unit 63, so that the communication control unit 60 including the remote image transmitting unit 63 transmits the data of the output image (C) to the communication control unit 70 of the electronic blackboard 2a serving as the hosting device, from the additional message communication port via the communication network 9 (step S31). For example, the image processing unit 30 including the image acquiring unit 31 of the electronic blackboard 2b serializes the data of the output image (C) to the remote image transmitting unit 63 by converting the data into text (see FIG. 8), and transmits the data by using a communication application such as an instant message, etc. When serializing the data of the output image (C), the image processing unit 30 may set the arrangement data to be in a data description language format such as JavaScript Object Notation (JSON). When the image processing unit 30 serializes the data of the output image (C), by setting the arrangement data to be in a data description language format such as JSON, readability can be improved and the processing efficiency can be improved.

The remote image receiving unit 73 of the electronic blackboard 2a receives the data of the output image (C) from the additional message communication port, and outputs the data to the remote image processing unit 82, so that the remote image processing unit 82 stores the data of the output image (C) in the image data storage unit 830. The remote image processing unit 82 deserializes (parallelizes) the data of the output image (C) received from the additional message communication port, and outputs the data to the image data storage unit 830.

Next, the electronic blackboard 2a serving as the hosting device displays the output image (C) on the display 3a (step S32). Specifically, the remote image processing unit 82 of the electronic blackboard 2a outputs the data of the output image (C) received from the remote image receiving unit 73, to the remote image transmitting unit 74. The remote image transmitting unit 74 outputs the data of the output image (C) to the remote image receiving unit 64 in the client unit 20 of the electronic blackboard 2a, which is the same hosting device. The remote image receiving unit 64 outputs the data of the output image (C) to the display superimposing unit 36. The display superimposing unit 36 outputs the data of the output image (C) to the video superimposing unit 28. The video superimposing unit 28 outputs the data of the output image (C) to the display 3a. Accordingly, the display 3a displays the output image (C).

Next, the communication control unit 70 including the remote image transmitting unit 74 in the server unit 90 of the electronic blackboard 2a serving as the hosting device, transmits the data of the output image (C) to the communication control unit 60 of the electronic blackboard 2c other than the electronic blackboard 2b that is the transmission source of the data of the output image (C), from the additional message communication port via the communication network 9 (step S33). For example, the image processing unit 30 including the image acquiring unit 31 of the electronic blackboard 2a, serializes the data of the output image (C) to the remote image transmitting unit 63 by converting the data into text (see FIG. 8), and uses a communication application such as an instant message to transmit the data. When serializing the data of the output image (C), the image processing unit 30 may set the arrangement data to be in a data description language format such as JSON. Accordingly, the remote image receiving unit 64 of the electronic blackboard 2c, which is the participating device, receives the data of the output image (C) from the additional message communication port.

Next, the electronic blackboard 2c displays the output image (C) on the display 3c (step S34). Specifically, the remote image receiving unit 64 of the electronic blackboard 2c outputs the data of the output image (C) received in the step S33, to the display superimposing unit 36 of the electronic blackboard 2c. The display superimposing unit 36 outputs the data of the output image (C) to the video superimposing unit 28. The video superimposing unit 28 outputs the data of the output image (C) to the display 3c. Accordingly, the display 3c displays the output image (C).

When the data of the UI image (A) and the data of the stroke image (B), as well as the data of the output image (C), are input to the image acquiring unit 31, the display superimposing unit 36 generates superimposed images (A, B, C), and the video superimposing unit 28 outputs data of the superposed images (A, B, C) to the display 3c. Also, when the data of a video (E) for the TV conference has been sent from the TV (video) conference terminal 7 to the video superimposing unit 28, the video superimposing unit 28 superimposes the data of the video (E) for the TV conference on the superimposed images (A, B, C) by a picture-in-picture operation, and outputs the superimposed images to the display 3c.

(Display of Superimposed Images)

Next, with reference to FIG. 23, a process of displaying superimposed images in the remote sharing process will be described.

First, at the electronic blackboard 2b, the user draws a stroke image (B) on the electronic blackboard 2b by using the electronic pen 4b (step S41).

Next, the display superimposing unit 36 of the electronic blackboard 2b superimposes the stroke image (B) on the UI image (A) and the output image (C), and the video superimposing unit 28 displays the superimposed images (A, B, C) on the display 3b of the electronic blackboard 2b (step S42). Specifically, the stroke processing unit 32 of the electronic blackboard 2b receives data of the stroke image (B) as operation data, from the coordinate detecting unit 22 and the contact detecting unit 24 via the event assigning unit 25, and transmits the data to the display superimposing unit 36. Accordingly, the display superimposing unit 36 can superimpose the stroke image (B) on the UI image (A) and the output image (C), and the video superimposing unit 28 can display the superimposed images (A, B, C) on the display 3b of the electronic blackboard 2b.

Next, the image processing unit 30 including the stroke processing unit 32 of the electronic blackboard 2b serializes the data of the stroke image (B) by converting the data into a text, and transmits the serialized data of the stroke image (B) to the remote operation transmitting unit 65. When serializing the data of the stroke image (B), the image processing unit 30 may set the arrangement data to be in a data description language format such as JSON. The remote operation transmitting unit 65 of the electronic blackboard 2b transmits the data of the stroke image (B) to the communication control unit 70 of the electronic blackboard 2a serving as the hosting device, from the additional message communication port via the communication network 9 (step S43). When transmitting the data of the stroke image (B) using a communication application such as an instant message, the image processing unit 30 including the stroke processing unit 32 of the electronic blackboard 2b transmits the data of the stroke image in units of strokes. The remote operation receiving unit 75 of the electronic blackboard 2a receives the data of the stroke image (B) from the additional message communication port and outputs the data to the remote operation processing unit 83, so that the remote operation processing unit 83 outputs the data of the stroke image (B) to the operation combination processing unit 84. In this manner, the data of the stroke image (B) drawn at the electronic blackboard 2b is sequentially transmitted to the remote operation processing unit 83 of the electronic blackboard 2a, which is the hosting device, each time drawing is performed. The data of this stroke image (B) is data indicated by each stroke data ID indicated in FIG. 8. Therefore, for example, as described above, when the user draws the alphabetical letter "T" with the electronic pen 4, the letter is written by two strokes, so that the pieces of data of the stroke image (B) indicated by two stroke data IDs are sequentially transmitted. The image processing unit 30 including the stroke processing unit 32 of the electronic blackboard 2b may collectively transmit the pieces of data of a plurality of stroke images, when transmitting the data of the stroke image (B).

Next, the electronic blackboard 2a serving as the hosting device displays the superimposed images (A, B, C) including the data of the stroke image (B) sent from the electronic blackboard 2b, on the display 3a (step S44). Specifically, the operation combination processing unit 84 of the electronic blackboard 2a combines the pieces of data of the plurality of stroke images (B) sequentially sent via the remote operation processing unit 83, and stores the combined data in the operation data storage unit 840 and returns the combined data to the remote operation processing unit 83. Accordingly, the remote operation processing unit 83 outputs, to the remote operation transmitting unit 76, the data of the stroke images (B) after the combination, which is received from the operation combination processing unit 84. The remote operation transmitting unit 76 outputs the data of the stroke images (B) after the combination to the remote operation receiving unit 66 of the client unit 20 of the electronic blackboard 2a that is the same hosting device. The remote operation receiving unit 66 outputs the data of the stroke images (B) after the combination to the display superimposing unit 36 in the image processing unit 30. Therefore, the display superimposing unit 36 superimposes the stroke images (B) after the combination on the UI image (A) and the output image (C). Finally, the video superimposing unit 28 displays the superimposed images (A, B, C) superimposed by the display superimposing unit 36, on the display 3a.

Next, the communication control unit 70 including the remote operation transmitting unit 76 in the server unit 90 of the electronic blackboard 2a serving as the hosting device, transmits the data of the stroke images (B) after the combination from the additional message communication port, via the communication network 9, to the communication control unit 60 of the electronic blackboard 2c other than the electronic blackboard 2b that is the transmission source of the data of the stroke images (B) (step S45). When transmitting the data of the stroke images (B), the image processing unit 30 including the stroke processing unit 32 of the electronic blackboard 2a transmits the data of the stroke images in units of strokes. Accordingly, the remote operation receiving unit 66 of the electronic blackboard 2c, which is the participating device, receives the data of the stroke images (B) after the combination. When transmitting the data of the stroke images (B), the image processing unit 30 including the stroke processing unit 32 of the electronic blackboard 2a may collectively transmit data of a plurality of stroke images.

Next, the electronic blackboard 2c displays the superimposed images (A, B, C) on the display 3c (step S46). Specifically, the remote operation receiving unit 66 of the electronic blackboard 2c outputs the data of the stroke images (B) after the combination received in the step S45, to the image processing unit 30 of the electronic blackboard 2c. The display superimposing unit 36 of the image processing unit 30 superimposes the data of the UI image (A) and the data of the output image (C), with the data of the stroke images (B) after the combination, and outputs the data of the superimposed images (A, B, C) to the video superimposing unit 28. The video superimposing unit 28 outputs the data of the superimposed images (A, B, C) to the display 3c. Accordingly, the display 3c displays the superposed images (A, B, C).

In the above process, the output image (C) is displayed on the display 3; however, the background image (D) may be displayed instead of this output image (C). Alternatively, the exclusive relationship between the output image (C) and the background image (D) may be canceled, and both the output image (C) and the background image (D) may be simultaneously displayed on the display 3.

(End of Participation)

Next, with reference to FIG. 23, a process in which the participating apparatus terminates the participation in the remote sharing process will be described. In the embodiment illustrated in FIG. 23, a process in which the electronic blackboard 2c terminates the participation, is illustrated.

First, in the electronic blackboard 2c, upon accepting a request to terminate the participation made by operating the operation button 125 such as the touch panel by the user, the remote participation processing unit 62 sends the request to terminate the participation to the communication control unit 70 in the server unit 90 of the electronic blackboard 2a serving as the hosting device, via the additional message communication port (step S47). Accordingly, the remote connection request receiving unit 71 of the communication control unit 70 of the electronic blackboard 2a receives the participation termination request from the electronic blackboard 2c, and outputs the participation termination request together with the IP address of the electronic blackboard 2c, to the remote connection processing unit 81. Then, based on the IP address sent from the remote connection request receiving unit 71, the remote connection processing unit 81 of the electronic blackboard 2a deletes, from the participation site management table 820, the IP address of the electronic blackboard 2c that has made the participation termination request and the name of the site where electronic blackboard 2c is installed, and outputs the IP address the electronic blackboard 2c and a report indicating the deletion, to the remote connection result transmitting unit 72.

Next, the communication control unit 70 including the remote connection result transmitting unit 72 of the electronic blackboard 2a instructs the communication control unit 60 in the client unit 20 of the electronic blackboard 2c, to terminate the participation via the communication network 9 (step S48). Accordingly, the remote participation processing unit 62 of the communication control unit 60 in the electronic blackboard 2c terminates the participation by performing a participation termination process of disconnecting the communication of the remote sharing process (step S49).

According to the image processing system according to the present embodiment, the communication path is set by setting a common message communication port in the electronic conference system and the communication system using electronic blackboards. Accordingly, when an electronic blackboard is introduced into the electronic conference system, since there is no increase in communication ports to be used, it is possible to prevent the network resources from being compressed. Therefore, network resources can be used effectively.

Second Embodiment

<Outline of Image Processing System>

Figure 24:
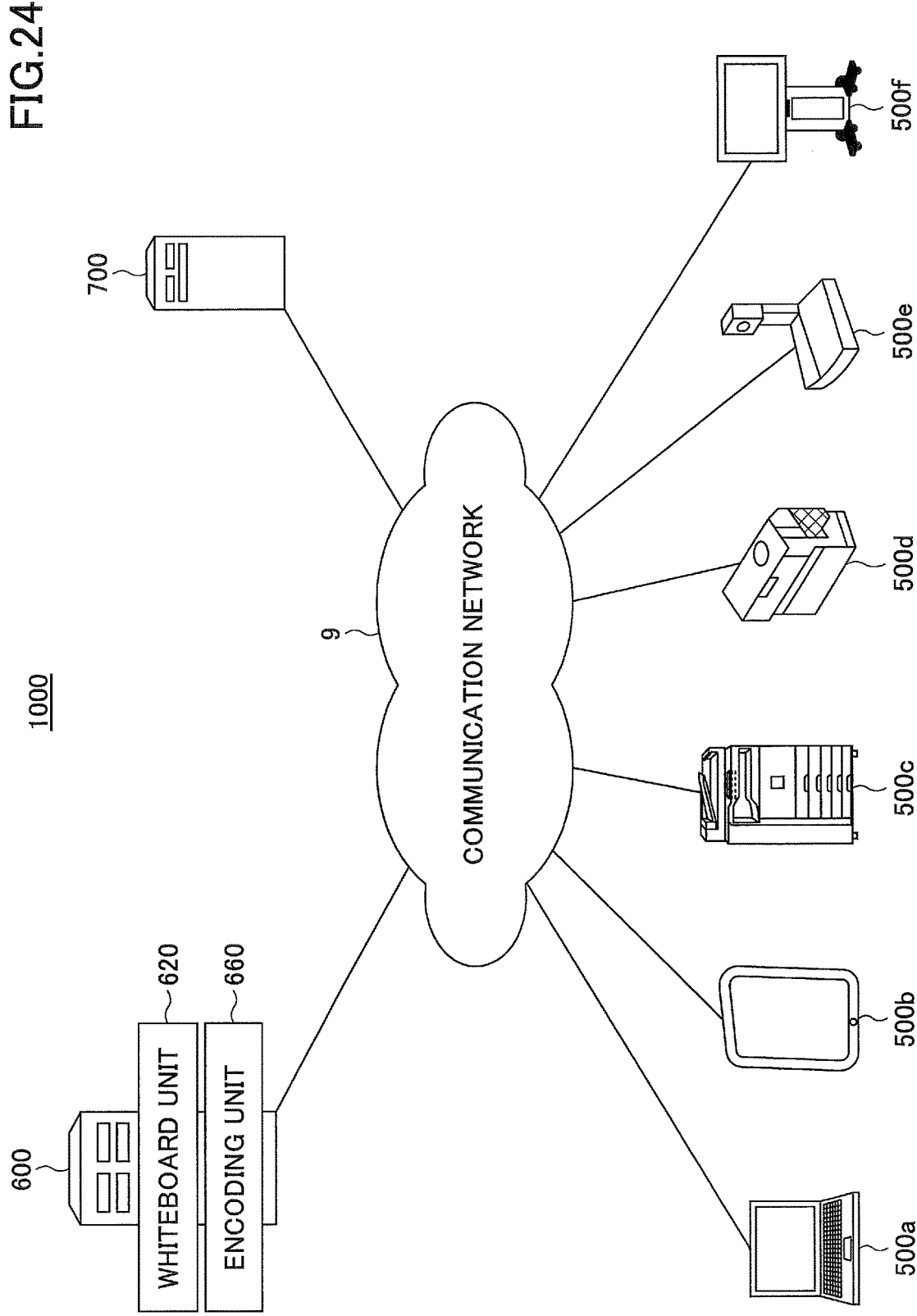
FIG. 24 is a schematic diagram of the image processing system according to an embodiment of the present invention.

The configuration of an image processing system 1000 will be described. FIG. 24 is a schematic diagram of the image processing system 1000 according to the embodiment. In the image processing system 1000 according to the present embodiment, the function of the server unit included in the electronic blackboard 2 according to the first embodiment, is implemented by a distribution control device.

As illustrated in FIG. 24, the image processing system 1000 according to the present embodiment includes a distribution control device 600, a plurality of communication terminals 500a to 500f, and a management device 700. In the following, any communication terminal among the communication terminals 500a to 500f can be referred to as a "communication terminal 500". The distribution control device 600 and the management device 700 are both implemented by server computers.

The communication terminal 500 is a terminal used by a user who receives services of the image processing system 1000. The communication terminal 500a is a notebook personal computer (PC). The communication terminal 500b is a mobile terminal such as a smartphone or a tablet terminal. The communication terminal 500c is a multifunction peripheral/printer/product (MFP) in which the functions of copying, scanning, printing, and faxing are combined. The communication terminal 500d is a projector. The communication terminal 500e is a TV (video) conference terminal having a camera, a microphone, and a speaker. The communication terminal 500f is an electronic blackboard (whiteboard) capable of electronically converting drawings drawn by a user, etc.

The communication terminal 500 is not only such terminals as illustrated in FIG. 24, but also may be devices communicable through a communication network such as the Internet, including a watch, a vending machine, a car navigation device, a game console, an air conditioner, a lighting fixture, a camera alone, a microphone alone, and a speaker alone.

The distribution control device 600, the communication terminal 500, and the management device 700 can communicate with each other through a communication network 9 including the Internet and a local area network (LAN). Examples of the communication network 9 may include wireless communication networks such as 3rd Generation (3G), Worldwide Interoperability for Microwave Access (WiMAX), and Long-Term Evolution (LTE).

The communication terminal 500d, for example, among the communication terminals 500 does not have a function of communicating with the other terminals or systems via the communication network 9. However, a user inserts a dongle into an interface such as Universal Serial Bus (USB) or High-Definition Multimedia Interface (HDMI) of the communication terminal 500d, thereby enabling the 500d to communicate with the other terminals and systems via the communication network 9.

Furthermore, the distribution control device 600 has a whiteboard unit 620. The function of a renderer in the whiteboard unit 620 acquires a single or a plurality of pieces of content data described in a certain description language and performs rendering on the content data. Accordingly, the whiteboard unit 620 can generate frame data including still image data such as bitmap data made up of red, green, and blue (RGB) and sound data such as pulse code modulation (PCM) data (i.e., still image (sound) data). Note that the content data is data acquired from any communication terminal, etc., and includes image (sound) data in Hypertext Markup Language (HTML) and Cascading Style Sheets (CSS), image (sound) data in MP4 (MPEG-4), and sound data in Advanced Audio Coding (AAC).

Furthermore, the distribution control device 600 includes an encoding unit 660, and the encoding unit 660 plays a role as an encoder, thereby converting frame data as still image (sound) data into video (sound) data in the compression coding format such as H.264 (MPEG-4 AVC), H.265, and Motion JPEG, etc.

The management device 700 may perform login authentication on the communication terminal 500 and manage contract information, etc., of the communication terminal 500. The management device 700 has a function of a Simple Mail Transfer Protocol (SMTP) server for transmitting e-mail. The management device 700 can be embodied as, for example, a virtual machine developed on a cloud service (IaaS: Infrastructure as a Service). It is desirable that the management device 700 be operated in a multiplexed manner to provide service continuity in case of unexpected incidents.

The whiteboard unit 620 enables real-time communication/collaboration (RTC). Furthermore, the distribution control device 600 includes the encoding unit 660 described below, and the encoding unit 660 can perform real-time encoding on frame data output by the whiteboard unit 620 and output video (sound) data generated through conversion compliant with the H.264 standard, etc. As a result, the processing of the encoding unit 660 is different from, for example, processing in a case in which non real-time video (sound) data recorded in a DVD is read and distributed by a DVD player.

Note that not only the distribution control device 600, but also the communication terminal 500 may have a whiteboard unit. In this case, updating the whiteboard unit 620 of the distribution control device 600 eliminates the need to start up the whiteboard units of the respective communication terminals 500.

<Various Kinds of Distribution Methods>

Described next are various distribution methods.

(Basic Distribution)

Figure 25:
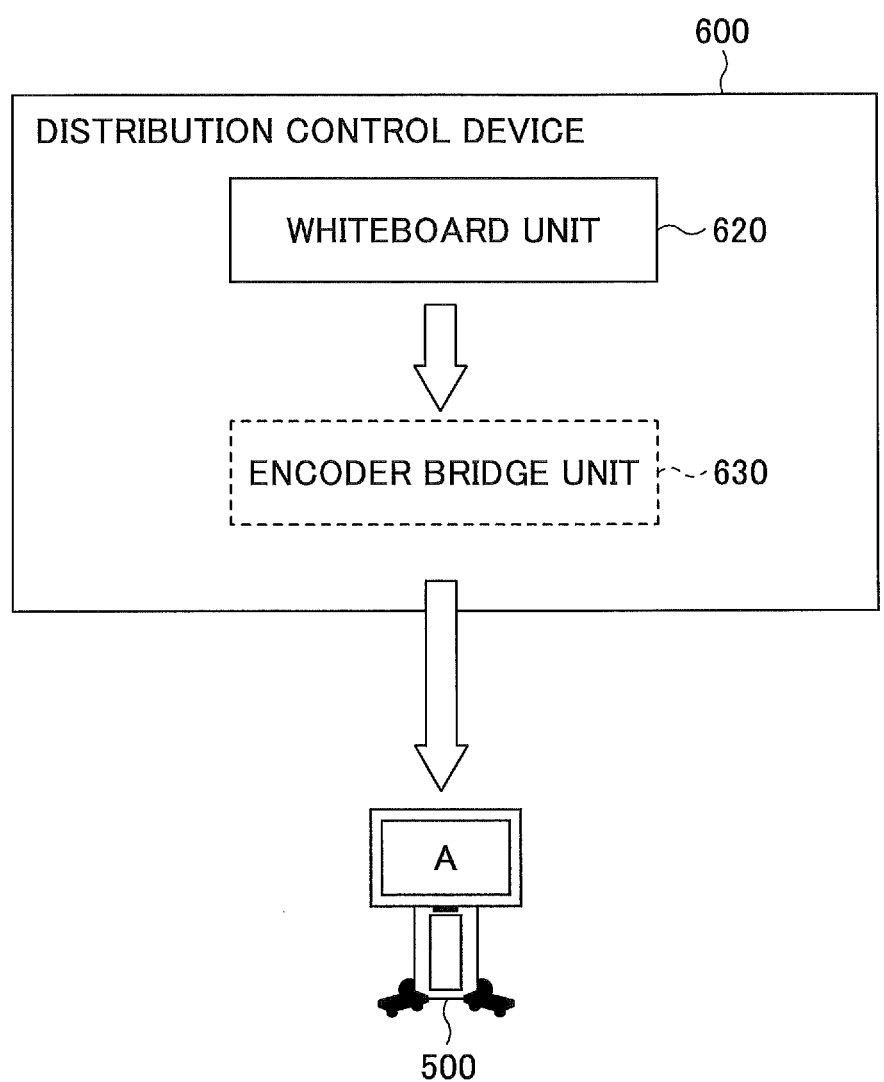
FIG. 25 is a conceptual diagram illustrating a basic distribution method according to an embodiment of the present invention.

FIG. 25 is a conceptual diagram illustrating a basic distribution method. In the image processing system 1000, as illustrated in FIG. 25, the whiteboard unit 620 of the distribution control device 600 acquires content data [A] as image (sound) data from any communication terminal, etc., and renders the data, thereby generating pieces of frame data [A] as still image (sound) data. An encoder bridge unit 630 including the encoding unit 660 performs encoding, etc., on the pieces of frame data [A], thereby converting the frame data [A] into video (sound) data [A] in the compression coding format such as H.264 (an example of transmission data). The distribution control device 600 distributes the converted video (sound) data [A] to the communication terminal 500.

By applying the above distribution method, the image processing system 1000 can also distribute content data to a plurality of sites as video (sound) data. Described below are distribution methods for distributing content data to a plurality of sites.

(Multicast)

Figure 26:
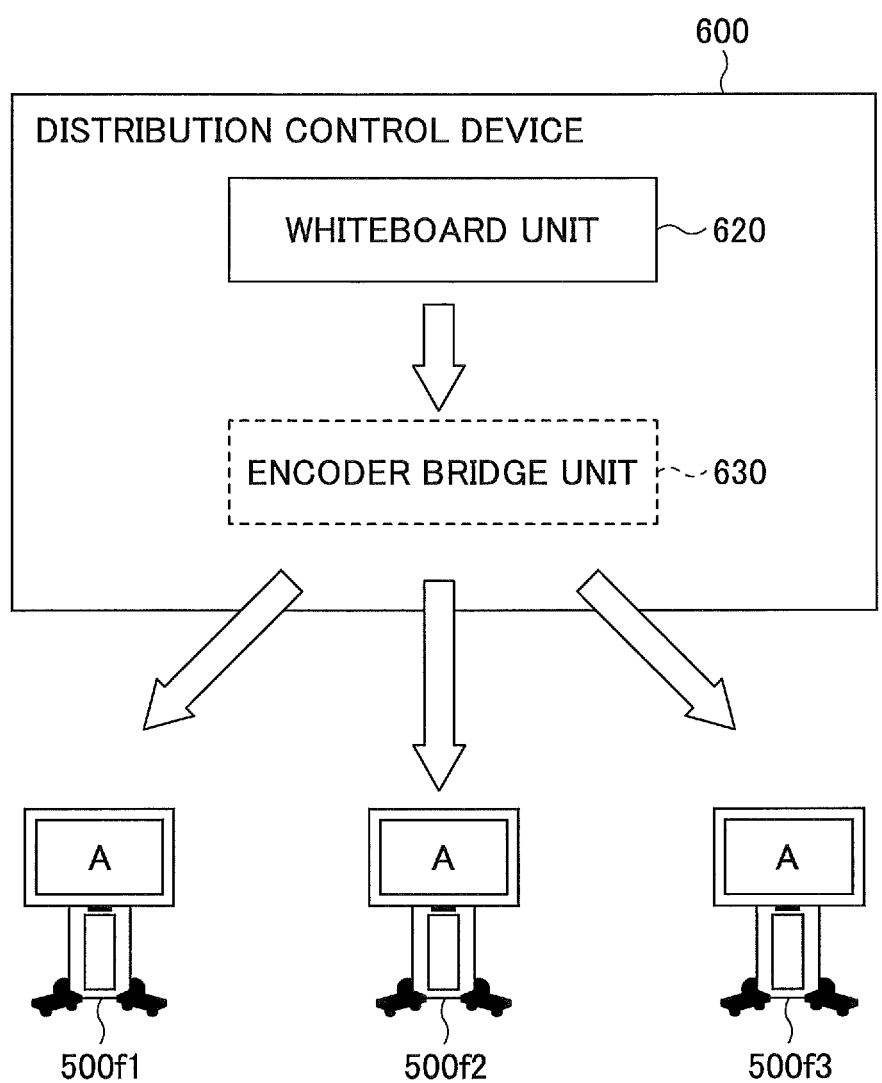
FIG. 26 is a conceptual diagram of multicast according to an embodiment of the present invention.

FIG. 26 is a conceptual diagram of multicast. As illustrated in FIG. 26, the whiteboard unit 620 of the distribution control device 600 acquires the content data [A] as image (sound) data from any communication terminal, etc., and renders the data, thereby generating pieces of frame data [A] as still image (sound) data. The encoder bridge unit 630 encodes the pieces of frame data [A], thereby converting them into video (sound) data. The distribution control device 600 then distributes the video (sound) data [A] (an example of transmission data) to a plurality of communication terminals (500/1, 500/2, 500/3).

Thus, the same video (sound) is reproduced at the plurality of sites. Note that in this case, the communication terminals (500/1, 500/2, 500/3) do not need to have the same level of display reproduction capability (e.g., the same resolution). This kind of distribution method is referred to as, for example, "multicast".

(Multidisplay)

Figure 27:
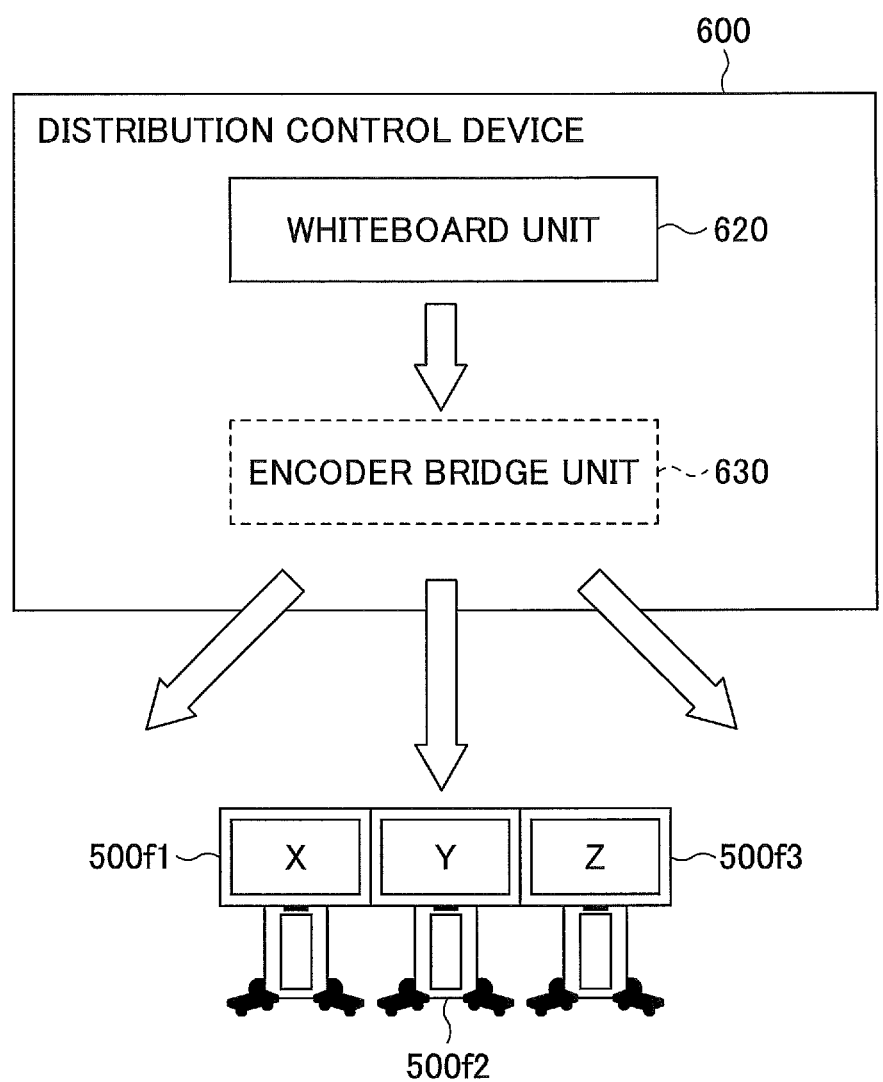
FIG. 27 is a conceptual diagram of multidisplay according to an embodiment of the present invention.

FIG. 27 is a conceptual diagram of multidisplay. As illustrated in FIG. 27, the whiteboard unit 620 of the distribution control device 600 acquires content data [XYZ] as image (sound) data from any communication terminal and renders the data, thereby generating pieces of frame data [XYZ] as still image (sound) data. The encoder bridge unit 630 divides each frame data [XYZ] into a plurality of pieces of frame data ([X], [Y], [Z]) and then encodes the plurality of pieces of frame data ([X], [Y], [Z]), thereby converting the plurality of pieces of frame data ([X], [Y], [Z]) into a plurality of pieces of video (sound) data ([X], [Y], [Z]). The distribution control device 600 then distributes the video (sound) data [X] (an example of transmission data) to the communication terminal 500/1. Similarly, the distribution control device 600 distributes the video (sound) data [Y] (an example of transmission data) to the communication terminal 500/2 and distributes the video (sound) data [Z] (an example of transmission data) to the communication terminal 500/3.

Thus, for example, even for landscape content [XYZ], video (sound) is reproduced by the plurality of communication terminals 500 in a divided manner. As a result, when the communication terminals (500/1, 500/2, 500/3) are installed in a row, the same effect can be obtained as the reproduction of one piece of large video. In this case, the communication terminals (500/1, 500/2, 500/3) need to have the same level of display reproduction capability (e.g., the same resolution). This kind of distribution method is referred to as, for example, "multidisplay".

(Composite Distribution)

Figure 28:
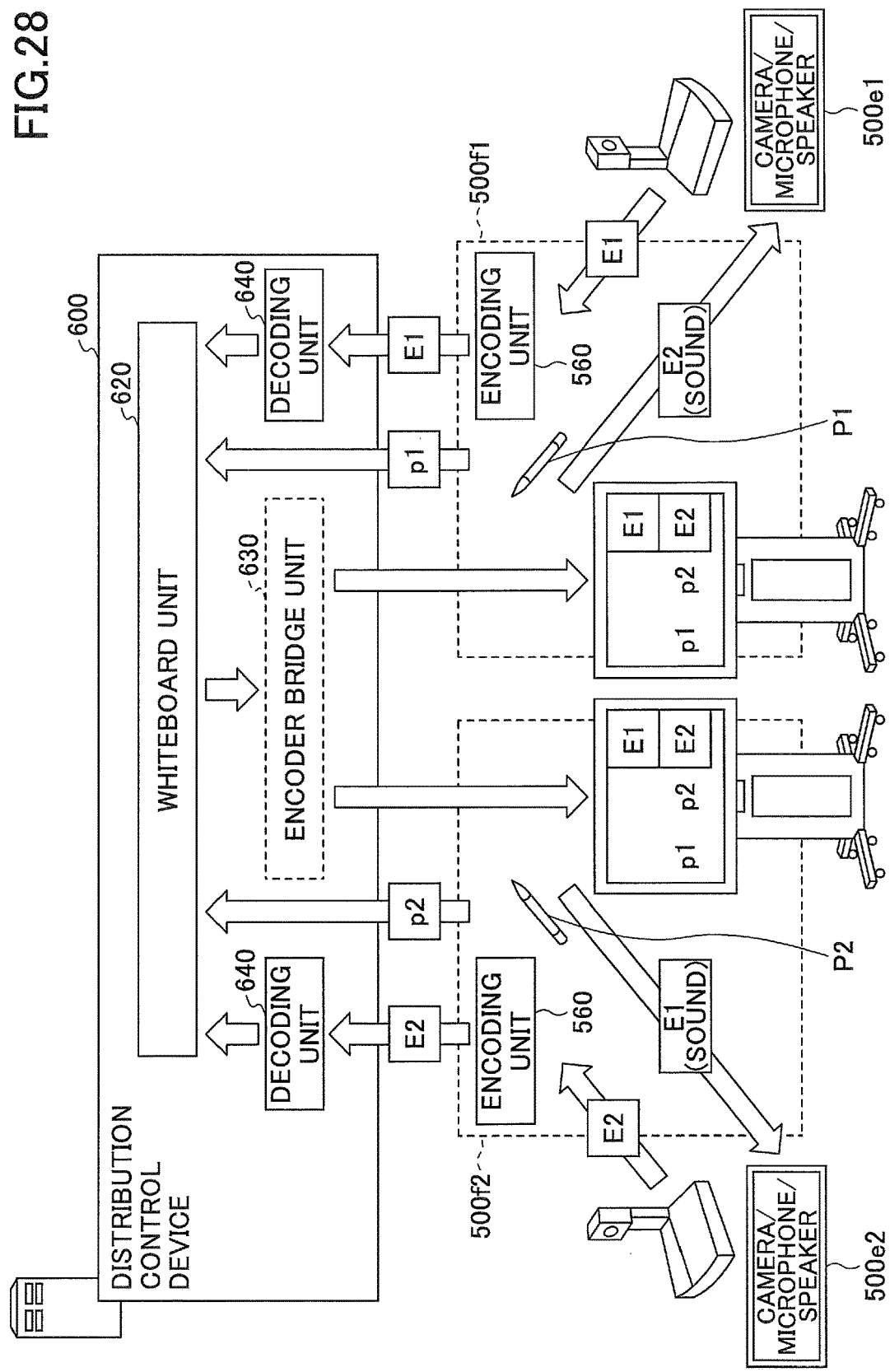
FIG. 28 is a conceptual diagram of composite distribution using a plurality of communication terminals through the distribution control device according to an embodiment of the present invention.

FIG. 28 is a conceptual diagram of composite distribution using a plurality of communication terminals through the distribution control device 600. As illustrated in FIG. 28, the communication terminal 500/1 as an electronic blackboard and a communication terminal 500e1 as a TV conference terminal are used at a first site (the right side in FIG. 28), whereas at a second site (the left side in FIG. 28), the communication terminal 500/2 as an electronic blackboard and a communication terminal 500e2 as a TV conference terminal are used similarly. At the first site, an electronic pen P1 is used for drawing characters, etc., with strokes on the communication terminal 500/1. At the second site, an electronic pen P2 is used for drawing characters, etc., with strokes on the communication terminal 500/2.

At the first site, video (sound) data acquired by the communication terminal 500e1 is encoded by the encoding unit 660 and is then serialized by being converted into text, and is transmitted to the distribution control device 600 via an additional message communication port by using a communication application such as an instant message. After that, the data is deserialized and decoded by a decoding unit 640 of the distribution control device 600 and is then input to the whiteboard unit 620. Operation data indicating the strokes drawn on the communication terminal 500/1 with the electronic pen P1 (in this case, coordinate data on the display of the communication terminal 500/1, etc.) is serialized by being converted into text, and is transmitted to the distribution control device 600 via an additional message communication port by using a communication application such as an instant message, and is then input to the whiteboard unit 620.

Also at the second site, video (sound) data acquired by the communication terminal 500e2 is encoded by the encoding unit 660 and is then serialized by being converted into text, and is transmitted to the distribution control device 600 via an additional message communication port by using a communication application such as an instant message. After that, the data is deserialized and decoded by the decoding unit 640 of the distribution control device 600 and is then input to the whiteboard unit 620. Operation data indicating the strokes drawn on the communication terminal 500/2 with the electronic pen P2 (in this case, coordinate data on the display of the communication terminal 500/2, etc.) is serialized by being converted into text, and is transmitted to the distribution control device 600 via an additional message communication port by using a communication application such as an instant message, and is then input to the whiteboard unit 620.

The whiteboard unit 620 acquires, for example, content data [A] as a background image displayed on the displays of the communication terminals (500/1, 500/2) from the any communication terminal, etc. The whiteboard unit 620 combines the content data [A], operation data ([p1], [p2]), and video (sound) content data ([E1], [E2]) and renders this data, thereby generating pieces of frame data as still image (sound) data in which the pieces of content data ([A], [p1], [p2], [E1], [E2]) are arranged in a desired layout. The encoder bridge unit 630 encodes the pieces of frame data, and serializes the data by converting the data into text, and the distribution control device 600 distributes video (sound) data (example of transmission data) indicating the same content ([A], [p1], [p2], [E1], [E2]) to both sites, via an additional message communication port, by using a communication application such as an instant message.

Accordingly, at the first site, video ([A], [p1], [p2], [E1 (video part)], and [E2 (video part)]) is displayed on the display of the communication terminal 500/1, and sound [E2 (sound part)] is output from the speaker of the communication terminal 500e1. Also at the second site, the video ([A], [p1], [p2], [E1 (video part)], and [E2 (video part)]) is displayed on the display of the communication terminal 500/2, and sound [E1 (sound part)] is output from the speaker of the communication terminal 500e2.

Note that at the first site, the sound of the site itself [E1 (sound part)] is not output owing to an echo cancelling function of the communication terminal 500/1. At the second site, the sound of the site itself [E2 (sound part)] is not output owing to an echo cancelling function of the communication terminal 500/2.

Thus, at the first site and the second site, remote sharing processing can be performed that shares the same information in real time at remote sites, thus making the image processing system 1000 according to the present embodiment effective in a TV conference, etc.

<Hardware Configuration>

Figure 29:
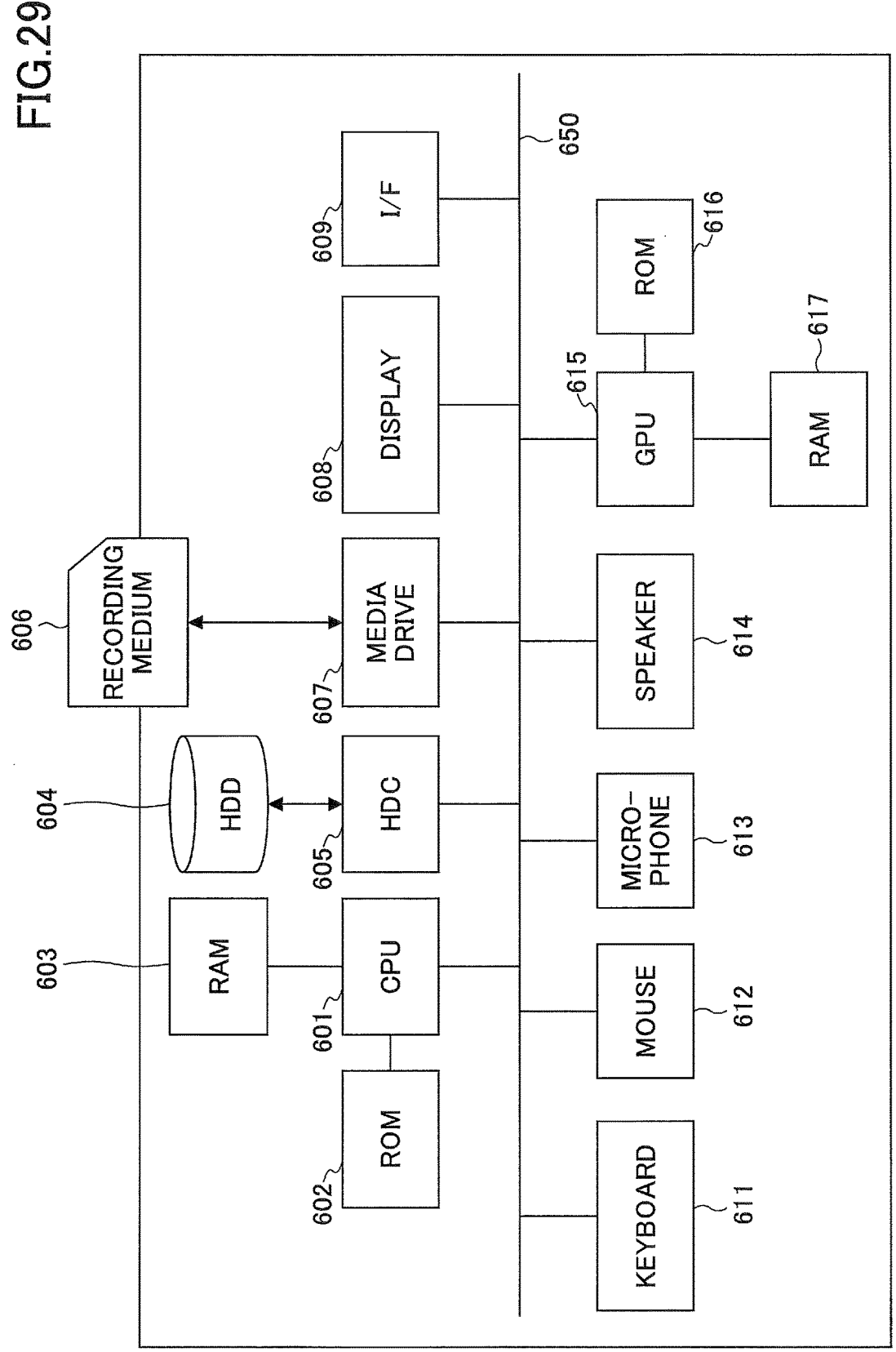
FIG. 29 is a hardware configuration diagram of the distribution control device and the management device according to an embodiment of the present invention.

With reference to FIG. 29, the hardware configuration of the device according to the present embodiment will be described. FIG. 29 is a hardware configuration diagram of the distribution control device 600 and the management device 700 according to the embodiment.

First, the distribution control device 600 will be described. As illustrated in FIG. 29, the distribution control device 600 includes a (host) CPU 601 that controls the entire operation of the distribution control device 600; a read-only memory (ROM) 602 that stores therein a program used for driving the CPU 601 such as IPL; a RAM 603 used as a work area of the ROM 602 and the CPU 601; an HDD 604 that stores therein various kinds of data such as programs; a hard disk controller (HDC) 605 that controls the reading and writing of the various kinds of data from and into the HDD 604 according to the control by the CPU 601; a media drive 607 that controls the reading and writing (storing) of data from and into a recording medium 606 such as a flash memory; a display 608 that displays various kinds of information; an interface (I/F) 609 that transmits data through the communication network 9 and to which the dongle is connected; a keyboard 611; a mouse 612; a microphone 613; a speaker 614; a graphics processing unit (GPU) 615; a ROM 616 that stores therein a program used for driving the GPU 615; a RAM 617 used as a work area of the GPU 615; and an extended bus line 650 such as an address bus or a data bus for electrically connecting the above components as illustrated in FIG. 29. Note that as in the communication terminal 500d that is a projector, the GPU may not be provided. Because the hardware configuration of the management device 700 is the same as the hardware configuration of the distribution control device 600, the description thereof will be omitted.

<Functional Configuration>

Next, the functional configuration of the device according to the present embodiment will be described with reference to FIGS. 30 to 33.

(Functional Configuration of the Distribution Control System)

Figure 30:
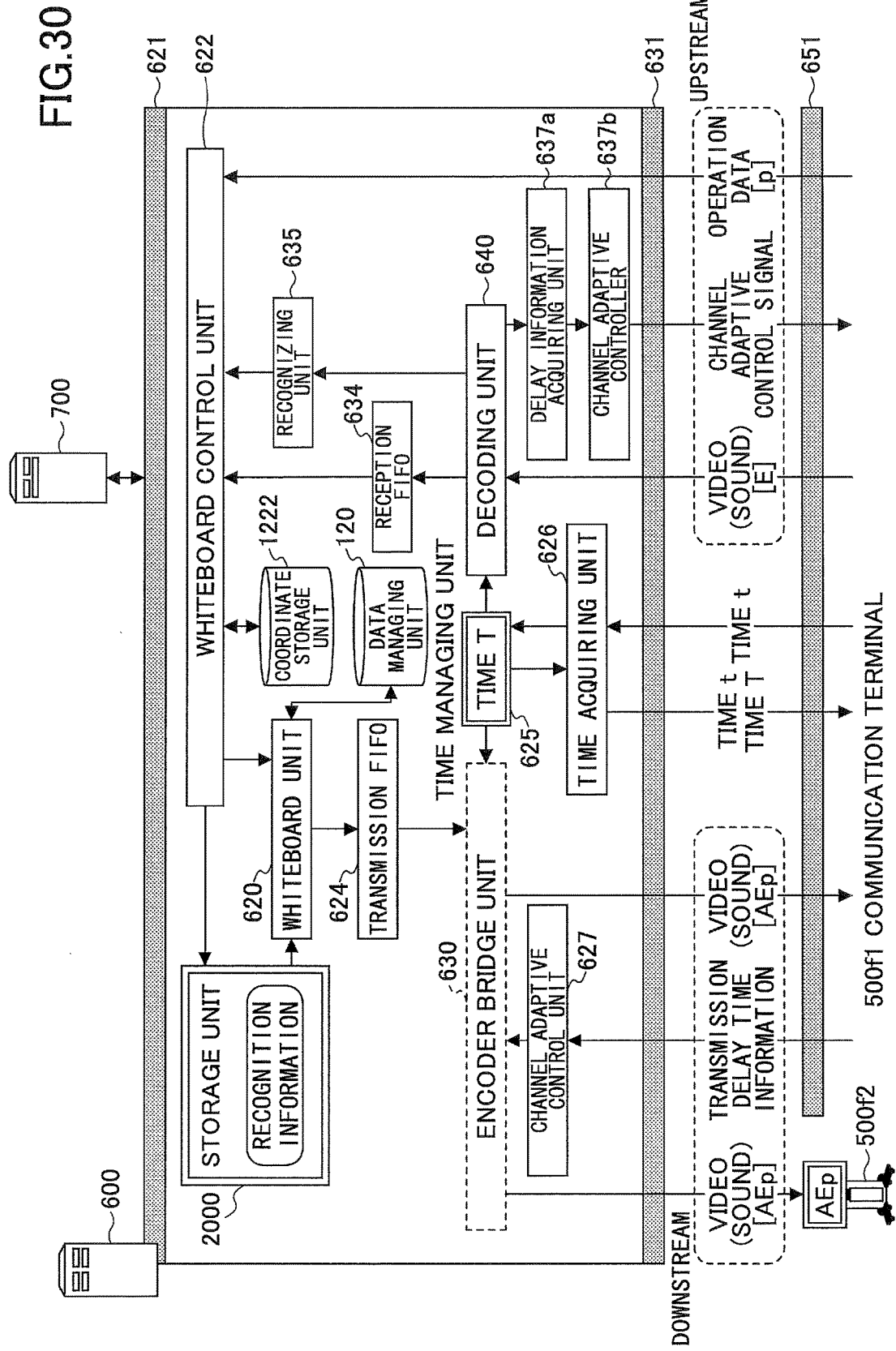
FIG. 30 is a functional block diagram illustrating functions of the distribution control device according to an embodiment of the present invention.

Described first with reference to FIG. 30 is the functional configuration of the distribution control device 600. FIG. 30 is a functional block diagram illustrating mainly the functions of the distribution control device 600 according to the present embodiment. FIG. 30 illustrates a functional configuration where the distribution control device 600 distributes video (sound) data to the communication terminal 500/1; however, the distribution control device 600 has the same functional configuration also where the distribution destination is other than the communication terminal 500/1. Although the distribution control device 600 includes a plurality of distribution engine servers, the following describes a case where a single distribution engine server is included, in order to simplify the description.

As illustrated in FIG. 30, the distribution control device 600 has functional components in FIG. 30 implemented by the hardware configuration including a processor that is the CPU 601 or the GPU 615, etc., and the programs illustrated in FIG. 29.

Specifically, the distribution control device 600 includes the whiteboard unit 620, a transmitter/receiver 621, a whiteboard control unit 622, a transmission first-in first-out (FIFO) 624, a time managing unit 625, a time acquiring unit 626, a channel adaptive controller 627, the encoder bridge unit 630, a transmitter/receiver 631, a reception FIFO 634, a recognizing unit 635, a delay information acquiring unit 637a, a channel adaptive controller 637b, and the decoding unit 640.

Furthermore, the distribution control device 600 further includes a storage unit 2000 implemented by the HDD 604 illustrated in FIG. 29, a coordinate storage unit 1222, and a data managing unit 120. This storage unit 2000 stores therein recognition information (described below) output from the recognizing unit 635 and sent through the whiteboard control unit 622. The content data acquired by the whiteboard unit 620 can be temporarily stored in the storage unit 2000 as a cache. The coordinate storage unit 1222 stores coordinates input to the communication terminal 500. Furthermore, the data managing unit 120 stores stroke data indicating a stroke generated from the coordinates.

The transmitter/receiver 621 transmits and receives various kinds of data, various kinds of requests, and various kinds of instructions, etc., to and from the management device 700 and any communication terminal. For example, the transmitter/receiver 621 acquires content data from any communication terminal via an additional message communication port. Furthermore, the transmitter/receiver 621 outputs the various kinds of data acquired from the management device 700 to the functional components within the distribution control device 600 and controls the functional components within the distribution control device 600 based on the various kinds of data, various kinds of requests, and various kinds of instructions, etc., acquired from the management device 700. For example, based on the request for switching distribution from the management device 700, the transmitter/receiver 621 performs the switching of combinations of the components within the encoder bridge unit 630 illustrated in FIG. 31.

The whiteboard control unit 622 controls the whiteboard unit 620. Specifically, the whiteboard control unit 622 acquires various kinds of operation data indicating an operation by the user, transmitted via the additional message communication port from the communication terminal 500 via the transmitter/receiver 631, and outputs the operation data to the whiteboard unit 620. The operation data is data generated by an operation event in the communication terminal 500 (an operation by the keyboard 611 and the mouse 612, etc., and a stroke drawn with the electronic pen P, etc.). When the operation by the user is a stroke command (instruction of a stroke), the whiteboard control unit 622 stores the coordinates input to the display of the communication terminal 500 in the operation data, in the coordinate storage unit 1222. Then, the whiteboard control unit 622 generates stroke data indicating a stroke by an operation by the user, from all the coordinates stored and accumulated in the coordinate storage unit 1222, and outputs the stroke data to the whiteboard unit 620.

Furthermore, when the operation by the user is a page command (an instruction to add a page), the whiteboard control unit 622 outputs the added page to the whiteboard unit 620. Furthermore, when the operation by the user is an image command (an instruction to add an image), the whiteboard control unit 622 outputs the added image to the whiteboard unit 620. When no operations are performed by the user, the whiteboard control unit 622 outputs a mouse event to the whiteboard unit 620.

Furthermore, when the communication terminal 500 is provided with various sensors such as a temperature sensor, a humidity sensor, and an acceleration sensor, the whiteboard control unit 622 acquires sensor information that contains output signals of the sensors, transmitted via the additional message communication port from the communication terminal 500, and outputs the sensor information to the whiteboard unit 620. Furthermore, the whiteboard control unit 622 acquires image (sound) data from the recognizing unit 635 and outputs the data to the whiteboard unit 620, and acquires recognition information described below from the recognizing unit 635 and stores the recognition information in the storage unit 2000. Furthermore, the whiteboard control unit 622 acquires video (sound) data from the reception FIFO 634 and outputs the video (sound) data to the whiteboard unit 620.

The whiteboard unit 620 generates each piece of frame data as still image (sound) data by rendering content data, etc., as image (sound) data, by the function of the renderer. Furthermore, as illustrated in FIG. 28, the renderer is also a layout engine that performs layout of a plurality of kinds of contents ([p1], [p2], [E1], [E2]).

Furthermore, when the whiteboard unit 620 acquires the stroke data generated by the whiteboard control unit 622, the whiteboard unit 620 stores the stroke data in the data managing unit 120. At this time, the whiteboard unit 620 stores the stroke data in, for example, a text format or a Portable Document Format (PDF) format. Then, the whiteboard unit 620 generates frame data as still image (sound) data by rendering the acquired stroke data. At this time, if there is already acquired content data, the whiteboard unit 620 outputs a layout in which the stroke data as the operation data is combined with the content data already acquired.

Furthermore, when the operation by the user is a page command (an instruction to add a page), the whiteboard unit 620 stores the acquired page in the data managing unit 120. Furthermore, when the operation by the user is an image command (an instruction to add an image), the whiteboard unit 620 stores the acquired image in the data managing unit 120.

The transmission FIFO 624 is a buffer that stores therein pieces of frame data as still image (sound) data generated by the whiteboard unit 620.

The time managing unit 625 manages time T unique to the distribution control device 600.

The time acquiring unit 626 performs time adjustment processing in conjunction with a time controller 656 in the communication terminal 500 described below. Specifically, the time acquiring unit 626 acquires time information (T) indicating time T in the distribution control device 600 from the time managing unit 625, receives time information (t) indicating time t in the communication terminal 500 from a time controller 556 described below through the transmitter/receiver 631 and a transmitter/receiver 651, and transmits the time information (t) and the time information (T) to the time controller 556.

The channel adaptive controller 627 calculates reproduction delay time U based on transmission delay time information (D) and calculates operation conditions such as the frame rate and the data resolution of a converter 661 in the encoder bridge unit 630. This reproduction delay time U is time for delaying reproduction through the buffering of data until being reproduced. In other words, the channel adaptive controller 627 changes the operation of the encoder bridge unit 630 based on the transmission delay time information (D) and the size of the data (e.g., the number of bits or the number of bytes). The transmission delay time information (D) indicates frequency distribution information formed of a plurality of pieces of transmission delay time D1 acquired from a reproduction controller 553 of a delay information acquiring unit 557 of the communication terminal 500. Each transmission delay time D1 indicates the time from the point when the video (sound) data is transmitted by the distribution control device 600 to the point when the video (sound) data is received by the communication terminal 500.

Figure 31:
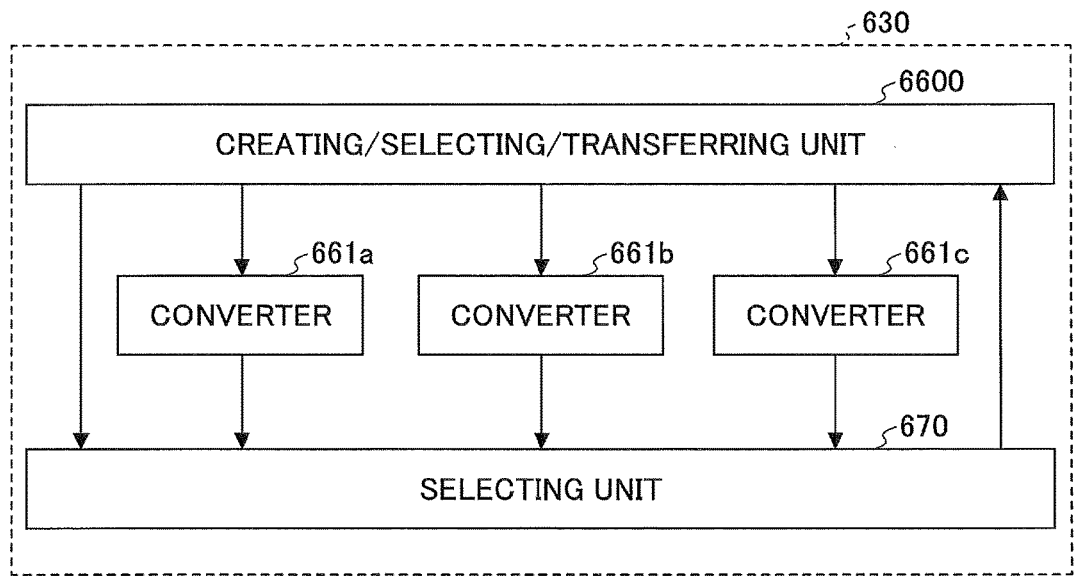
FIG. 31 is a detailed diagram illustrating an encoder bridge unit according to an embodiment of the present invention.
Figure 32:
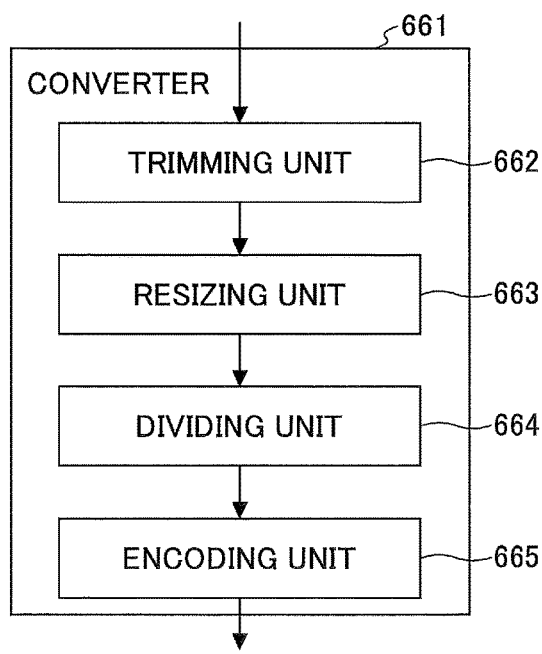
FIG. 32 is a functional block diagram illustrating the functions of a converter according to an embodiment of the present invention.

The encoder bridge unit 630 outputs pieces of frame data as still image (sound) data generated by the whiteboard unit 620 to the converter 661 (see FIG. 31) in the encoder bridge unit 630. In this case, the converter 661 performs processes based on the operation conditions calculated by the channel adaptive controller 627. The encoder bridge unit 630 will be described in more detail with reference to FIG. 31 and FIG. 32. FIG. 31 is a detailed diagram of the encoder bridge unit. Furthermore, FIG. 32 is a functional block diagram illustrating the functions of the converter.

As illustrated in FIG. 31, the encoder bridge unit 630 includes a creating/selecting/transferring unit 6600, a selecting unit 670, and a plurality of converters (661*a*, 661*b*, 661*c*) provided therebetween. Although three converters are illustrated here, the number of converters may be one or two, or four or more. In the following, any converter is referred to as a "converter 661".

Furthermore, the converter 661 converts the data format of the pieces of frame data as still image (sound) data generated by the whiteboard unit 620 into a data format of H.264, etc., allowing distribution of the data to the communication terminal 500 through the communication network 9. For that purpose, as illustrated in FIG. 32, the converter 661 includes a trimming unit 662, a resizing unit 663, a dividing unit 664, and an encoding unit 665, to perform various processes on the frame data. The trimming unit 662, the resizing unit 663, and the dividing unit 664 do not perform any processing on sound data.

The trimming unit 662 performs processing to cut out part of a still image. The resizing unit 663 changes the scale of a still image. The dividing unit 664 divides a still image as illustrated in FIG. 27.

The encoding unit 665 encodes the pieces of frame data as still image (sound) data generated by the whiteboard unit 620, thereby converting the data to distribute video (sound) data to the communication terminal 500 through the communication network 9. When the video is not in motion (when there are no inter-frame updates (changes)), the encoding unit 665 inserts a skip frame (also referred to as "frame skip") thereafter until the video moves, to save the band.

When sound data is generated together with still image data by rendering, both pieces of data are encoded, and when only sound data is generated, only encoding is performed to compress the data, without performing trimming, resizing, or dividing.

The creating/selecting/transferring unit 6600 creates a new converter 661, or selects pieces of frame data as still image (sound) data to be input to a converter 661 that is already generated, or transfers the frame data to the converter 661. In the creation, the creating/selecting/transferring unit 6600 creates a converter 661 capable of conversion according to the capability of the communication terminal 500 to reproduce video (sound) data. Furthermore, in the selection, the creating/selecting/transferring unit 6600 selects a converter 661 that is already generated. For example, in starting distribution to the communication terminal 500b in addition to distribution to the communication terminal 500a, the same video (sound) data as video (sound) data being distributed to the communication terminal 500a may be distributed to the communication terminal 500b. In such a case, furthermore, when the communication terminal 500b has the same level of capability as the capability of the communication terminal 500a to reproduce video (sound) data, the creating/selecting/transferring unit 6600 uses the converter 661a that is already created for the communication terminal 500a, without creating a new converter 661b for the communication terminal 500b. Furthermore, in the transferring, the creating/selecting/transferring unit 6600 transfers the frame data stored in the transmission FIFO 624, to the converter 661.

Additionally, the selecting unit 670 may select a desired one from the converters 661 that are already generated. The selection by the creating/selecting/transferring unit 6600 and the selecting unit 670 allows distribution in various patterns as illustrated in FIG. 28.

Referring back to FIG. 30, the description will be continued. The transmitter/receiver 631 exchanges various data and requests, etc., with the communication terminal 500 via the additional message communication port. As the transmitter/receiver 631 transmits various data and requests, etc., from the cloud over the communication network 9 to the communication terminal 500, the distribution control device 600 is able to distribute various kinds of data and requests, etc., to the communication terminal 500.

For example, in the login processing of the communication terminal 500, the transmitter/receiver 631 transmits, to a transmitter/receiver 551 of the communication terminal 500, authentication screen data for prompting a user for a login request. Furthermore, the transmitter/receiver 631 receives operation data indicating an operation by the user, via the additional message communication port from the communication terminal 500. Furthermore, the transmitter/receiver 631 transmits the frame data (converted video data) to the communication terminal 500 via the additional message communication port. This frame data (converted video data) is obtained by converting, by the converter 661, each piece of frame data, as still image (sound) data, into a data format that can be distributed to the communication terminal 500 via the communication network 9. The transmitter/receiver 631 corresponds to a receiving unit and a transmitting unit.

The transmitter/receiver 631 also performs data transmission and data reception to and from user applications of the communication terminal 500 and device applications of the communication terminal 500 by a protocol unique to the image processing system 1000 through a Hypertext Transfer Protocol over Secure Socket Layer (HTTPS) server. This unique protocol is an HTTPS-based application layer protocol for transmitting and receiving data in real time without being interrupted between the distribution control device 600 and the communication terminal. The transmitter/receiver 631 also performs transmission response control, real-time data creation, command transmission, reception response control, reception data analysis, and gesture conversion.

Among these, the transmission response control is processing to manage an HTTPS session for downloading which is requested from the communication terminal 5 in order to transmit data from the distribution control device 600 to the communication terminal 500. The response of the HTTPS session for downloading does not end immediately and holds for a certain period of time (one to several minutes). The transmitter/receiver 631 dynamically writes data to be sent to the communication terminal 500 in the body part of the response. In order to eliminate costs for reconnection, another request is allowed to reach from the communication terminal before the previous session ends. By putting the transmitter/receiver 631 on standby until the previous request is completed, overhead can be eliminated even when reconnection is performed.

The real-time data creation is processing to apply a unique header to the data of compressed video (and a compressed sound) generated by the encoding unit 665 in FIG. 32 and write the header in the body part of HTTPS.

The command transmission is processing to generate command data to be transmitted to the communication terminal 500 and write the command data in the body part of HTTPS directed to the communication terminal 500.

The reception response control is processing to manage an HTTPS session requested from the communication terminal 500 in order for the distribution control device 600 to receive data from the communication terminal 500. The response of this HTTPS session does not end immediately and is held for a certain period of time (one to several minutes). The communication terminal 500 dynamically writes data to be sent to the transmitter/receiver 631 of the distribution control device 600 in the body part of the request.

The reception data analysis is processing to analyze the data transmitted from the communication terminal 500 by type and distribute the data to a necessary process.

The gesture conversion is processing to convert a gesture event input to the communication terminal 500f that is the electronic blackboard by a user with an electronic pen or in handwriting into data in a format receivable by the whiteboard unit 620.

The reception FIFO 634 is a buffer that stores therein video (sound) data decoded by the decoding unit 640.

The recognizing unit 635 performs processing on image (sound) data received from the communication terminal 500. Specifically, for example, the recognizing unit 635 recognizes the face, age, and sex, etc., of a human or animal based on images taken by a camera 62 for signage. In a workplace, the recognizing unit 635 performs name tagging by face recognition and processing of replacing a background image based on images taken by a camera 562. The recognizing unit 635 stores recognition information indicating the recognized details in the storage unit 2000. The recognizing unit 635 achieves speeding up by performing processing with a recognition expansion board.

The delay information acquiring unit 637a is used for the processing of upstream channel adaptive control and corresponds to the delay information acquiring unit 557 of the communication terminal 500 for use in the processing of downstream channel adaptive control. Specifically, the delay information acquiring unit 637a acquires transmission delay time information (d1) indicating transmission delay time d1 from the decoding unit 640 and holds it for a certain period of time, and when a plurality of pieces of transmission delay time information (d1) are acquired, outputs to the channel adaptive controller 637b transmission delay time information (d) indicating frequency distribution information based on a plurality of pieces of transmission delay time d1. The transmission delay time information (d1) indicates the time from the point when the video (sound) data is transmitted from the communication terminal 500 to the point when the video (sound) data is received by the distribution control device 600.

The channel adaptive controller 637b is used for the processing of the upstream channel adaptive control and corresponds to the channel adaptive controller 627 for use in the processing of the downstream channel adaptive control. Specifically, the channel adaptive controller 637b calculates the operation conditions of an encoding unit 560 of the communication terminal 500 based on the transmission delay time information (d). Furthermore, the channel adaptive controller 637b transmits a channel adaptive control signal indicating operation conditions such as a frame rate and data resolution to the encoding unit 560 of the communication terminal 500 through the transmitter/receiver 631 and the transmitter/receiver 651.

The decoding unit 640 decodes the video (sound) data transmitted from the communication terminal 500.

The decoding unit 640 also outputs the transmission delay time information (d1) indicating transmission delay time d1 to the delay information acquiring unit 637a.

(Functional Configuration of Communication Terminal)

Figure 33:
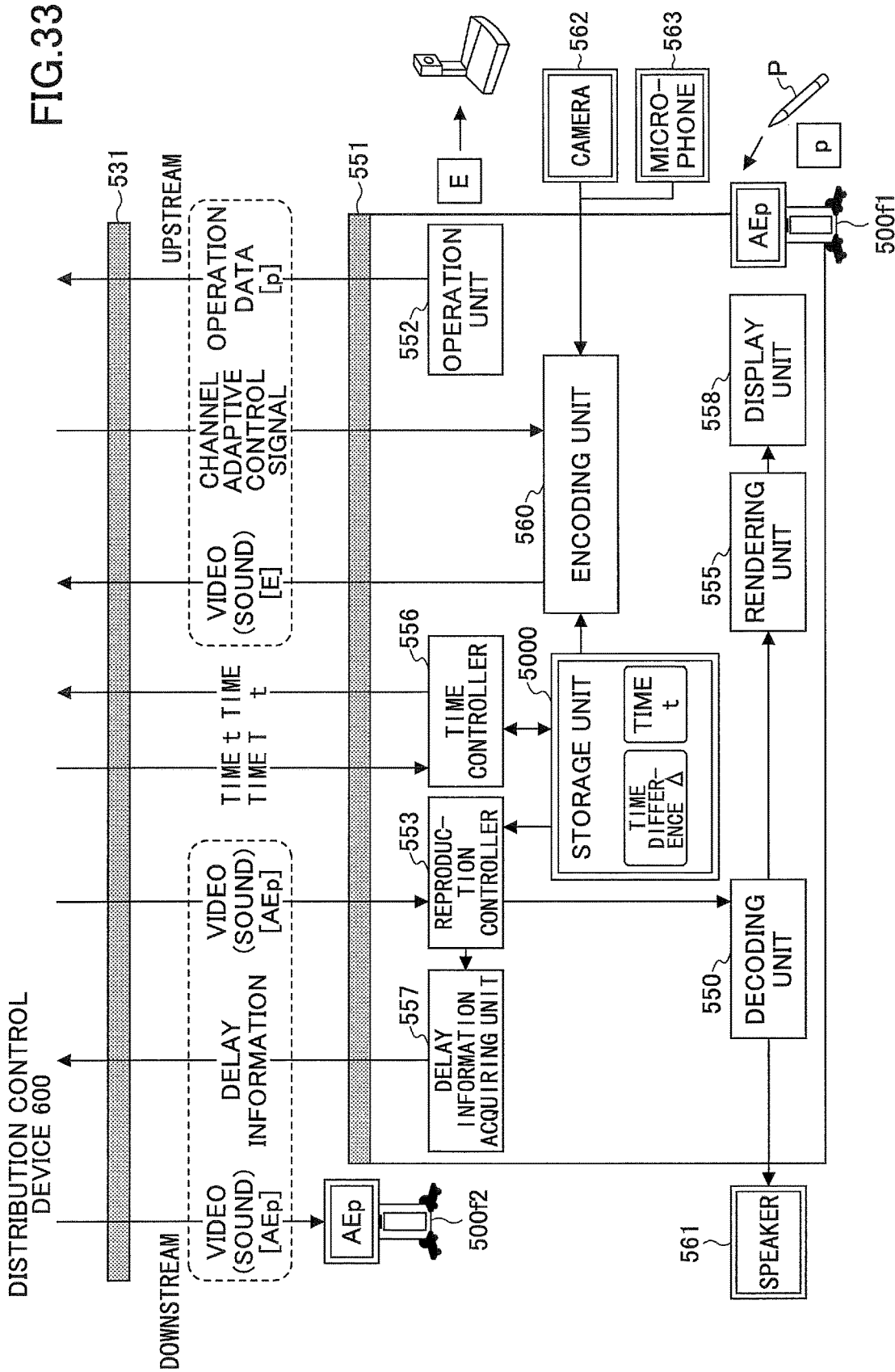
FIG. 33 is a functional block diagram illustrating the functions of the communication terminal according to an embodiment of the present invention.

Next, the functional configuration of the communication terminal 500 is described with reference to FIG. 33. FIG. 33 is a functional block diagram illustrating the functions of the communication terminal 500 according to the present embodiment. The communication terminal 500 is a terminal serving as an interface for a user to log into the image processing system 1000, and to start and stop the distribution of video (sound) data, etc.

As illustrated in FIG. 33, the communication terminal 500 has functional components in FIG. 33 implemented by the hardware configuration including the CPU 601 and the programs illustrated in FIG. 29. Here, as the programs, a program for the electronic conference system and a program for the electronic blackboard may be included. In this case, the program for the electronic conference system and the program for the electronic blackboard are interoperated with each other to operate the CPU 601. Furthermore, when the communication terminal 500 becomes communicable with the other terminals and systems through the communication network 9 by the insertion of the dongle, the communication terminal 500 has the functional components in FIG. 33 implemented by the hardware configuration and the programs illustrated in FIG. 29.

Specifically, the communication terminal 500 includes a decoding unit 550, a transmitter/receiver 551, an operation unit 552, the reproduction controller 553, a rendering unit 555, the time controller 556, the delay information acquiring unit 557, a display unit 558, and the encoding unit 560. The communication terminal 500 further includes a storage unit 5000 implemented by the RAM 603 illustrated in FIG. 29. This storage unit 5000 stores therein time difference information ($\Delta$) indicating a time difference $\Delta$ described below and time information (t) indicating time t in the communication terminal 500.

Among these elements, the decoding unit 550 deserializes and decodes video (sound) data distributed from the distribution control device 600 and output from the reproduction controller 553. When the decoded video (sound) data includes voice, the voice is output from a speaker 561.

The transmitter/receiver 551 transmits and receives various kinds of data and requests, etc., to and from a transmitter/receiver 631 of the distribution control device 600 and the management device 700. For example, in the login processing of the communication terminal 500, the transmitter/receiver 551 performs a login request to the management device 700 in response to the startup of the communication terminal 500 by the operation unit 552.

The operation unit 552 performs processing to receive operations input by a user, such as input and selection with a power switch, a keyboard, a mouse, and the electronic pen P, etc., and transmits the input and the selection as operation data to the whiteboard control unit 622 of the distribution control device 600.

The reproduction controller 553 buffers the video (sound) data (a packet of real-time data) received from the transmitter/receiver 551 and outputs the video (sound) data to the decoding unit 550 with the reproduction delay time U taken into account. Furthermore, the reproduction controller 553 also calculates the transmission delay time information (D1) indicating transmission delay time D1, and outputs the transmission delay time information (D1) to the delay information acquiring unit 557.

The rendering unit 555 renders the data decoded by the decoding unit 550.

The time controller 556 performs time adjustment processing in conjunction with the time acquiring unit 626 of the distribution control device 600. Specifically, the time controller 556 acquires time information (t) indicating time t in the communication terminal 500 from the storage unit 5000. The time controller 556 issues a request for time information (T) indicating time T in the distribution control device 600 to the time acquiring unit 626 of the distribution control device 600 through the transmitter/receiver 551 and a transmitter/receiver 531. In this case, the time information (t) is transmitted concurrently with the request for the time information (T).

The delay information acquiring unit 557 acquires, from the reproduction controller 553, the transmission delay time information (D1) indicating transmission delay time D1, and holds the transmission delay time information (D1) for a certain period of time, and when a plurality of pieces of transmission delay time information (D1) are acquired, transmits transmission delay time information (D) indicating frequency distribution information based on a plurality of pieces of transmission delay time D1 to the channel adaptive controller 627 through the transmitter/receiver 551 and the transmitter/receiver 531. The transmission delay time information (D) is transmitted, for example, once in a hundred frames.

The display unit 558 reproduces the data rendered by the rendering unit 555.

The encoding unit 560 transmits video (sound) data [E] that is acquired from the built-in microphone 613 or the camera 562 and a microphone 563 that are externally attached, and that is encoded and serialized by being converted into text; time information (t0) that indicates the current time t0 in the communication terminal 500 and is acquired from the storage unit 5000; and the time difference information (Δ) that indicates the time difference Δ acquired from the storage unit 5000, to the decoding unit 640 of the distribution control device 600 through the transmitter/receiver 551 and the transmitter/receiver 531. The time difference Δ is the difference between the time uniquely managed by the distribution control device 600 and the time uniquely managed by the communication terminal 500.

Furthermore, the encoding unit 560 changes the operation conditions of the encoding unit 560 based on the operation conditions indicated by the channel adaptive control signal received from the channel adaptive controller 637b. Furthermore, the encoding unit 560, in accordance with the new operation conditions, transmits the video (sound) data [E] that is acquired from the camera 562 and the microphone 563 and that is encoded and serialized by being converted into text; the time information (t0) that indicates the current time t0 in the communication terminal 500 and is acquired from the storage unit 5000; and the time difference information (Δ) that indicates the time difference Δ and is acquired from the storage unit 5000, to the decoding unit 640 of the distribution control device 600 from the additional message communication port through the transmitter/receiver 551 and the transmitter/receiver 531 by using a communication application.

The built-in microphone 613 and the externally attached camera 562 and microphone 563, etc., are examples of an inputting unit and are devices that need encoding and decoding. The inputting unit may output touch data and smell data in addition to video (sound) data. The inputting unit includes various sensors such as a temperature sensor, a direction sensor, and an acceleration sensor, etc.

<Operation or Process>

Next, the operation or process according to the present embodiment will be described with reference to FIGS. 34 to 37. These processes are executed by the CPUs of the distribution control device 600, the communication terminal 500, and the management device 700 operating according to the stored programs, respectively.

(Basic Distribution Process)

Figure 34:
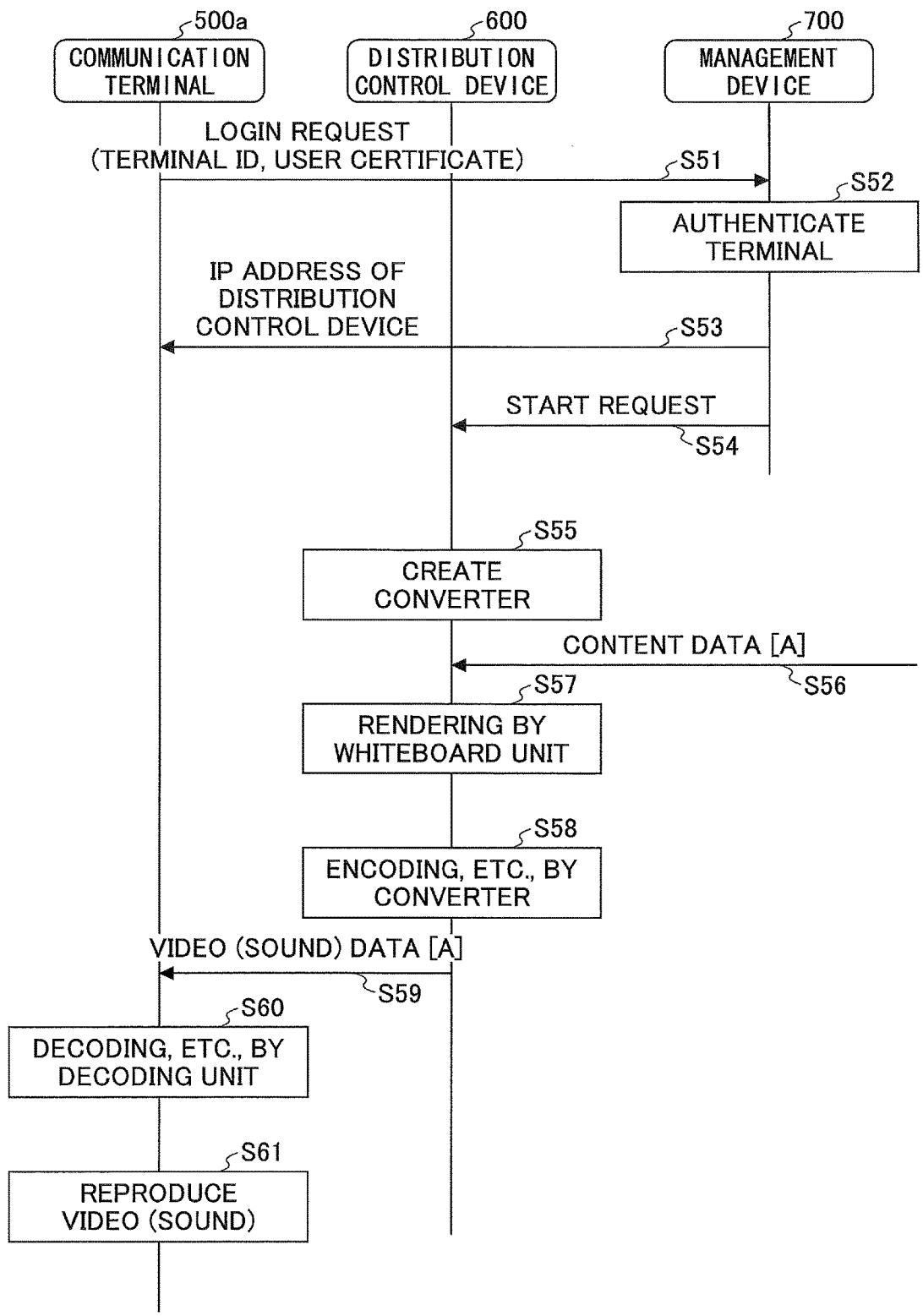
FIG. 34 is a sequence diagram illustrating a basic distribution process of the distribution control device according to an embodiment of the present invention.

First, with reference to FIG. 34, a specific distribution process in the basic distribution method illustrated in FIG. 25 will be described. FIG. 34 is a sequence diagram illustrating a basic distribution process of the distribution control device according to the present embodiment. Here, a case where a login request is made by using the communication terminal 500a, will be described; however, login may be made by using the communication terminal 500 other than the communication terminal 500a.

As illustrated in FIG. 34, when the user turns on the power of the communication terminal 500a, the transmitter/receiver 551 of the communication terminal 500a transmits a login request to the management device 700 (step S51). Accordingly, the management device 700 receives the login request and authenticates the communication terminal 500a (step S52). Here, the case where the communication terminal 500a is authenticated as a legitimate terminal in the image processing system 1000 will be described below.

The management device 700 transmits the IP address of the distribution control device 600 to the transmitter/receiver 551 of the communication terminal 500a (step S53). The IP address of the distribution control device 600 is acquired from the distribution control device 600 and stored by the management device 700 in advance.

Next, the management device 700 requests the transmitter/receiver 621 of the distribution control device 600 to start a distribution process (step S54). Thus, the transmitter/receiver 621 receives a request to start the distribution control device process. Then, the whiteboard control unit 622 controls the whiteboard unit 620 based on the start request received by the transmitter/receiver 621.

Next, the creating/selecting/transferring unit 6600 of the encoder bridge unit 630 creates the converter 661 according to the reproduction capability (resolution of the display, etc.) of the communication terminal 500a and the type of contents (step S55). Here, the transmitter/receiver 551 of the communication terminal 500a may transmit a message communication port addition request to the distribution control device 600. Here, a port number may be specified by a message communication port addition request, or a port number to be added by a message communication port addition request may be set in advance. In response to the message communication port addition request transmitted by the communication terminal 500a, the distribution control device 600 opens the message communication port and sends a report to the communication terminal 500a that the message communication port is opened.

Next, the transmitter/receiver 621 acquires the content data [A] from any communication terminal 500 via the additional message communication port according to an instruction by the whiteboard unit 620 (step S56).

Next, the whiteboard unit 620 generates each frame data as still image (sound) data by rendering the content data [A] acquired by the transmitter/receiver 621, and outputs each frame data to the transmission FIFO 624 (step S57). Then, the converter 661 encodes each piece of frame data stored in the transmission FIFO 624, serializes the frame data by converting the frame data into text, and converts the frame data into video (sound) data [A] to be distributed to the communication terminal 500a (step S58).

Next, the transmitter/receiver 631 transmits video (sound) data [A] from the additional message communication port to the transmitter/receiver 551 of the communication terminal 500a (step S59). Accordingly, the transmitter/receiver 551 of the communication terminal 500a receives the video (sound) data [A] and outputs the video (sound) data [A] to the reproduction controller 553.

Next, in the communication terminal 500a, the decoding unit 550 acquires the video (sound) data [A] from the reproduction controller 553, and decodes and deserializes the video (sound) data [A] (step S60). Subsequently, the speaker 561 reproduces the sound based on the decoded sound data [A], and the display unit 558 reproduces a video based on the video data [A] acquired by the rendering unit 555 from the decoding unit 550 and rendered by the rendering unit 555 (step S61).

(Process of Composite Distribution Using a Plurality of Communication Terminals)

Figure 35:
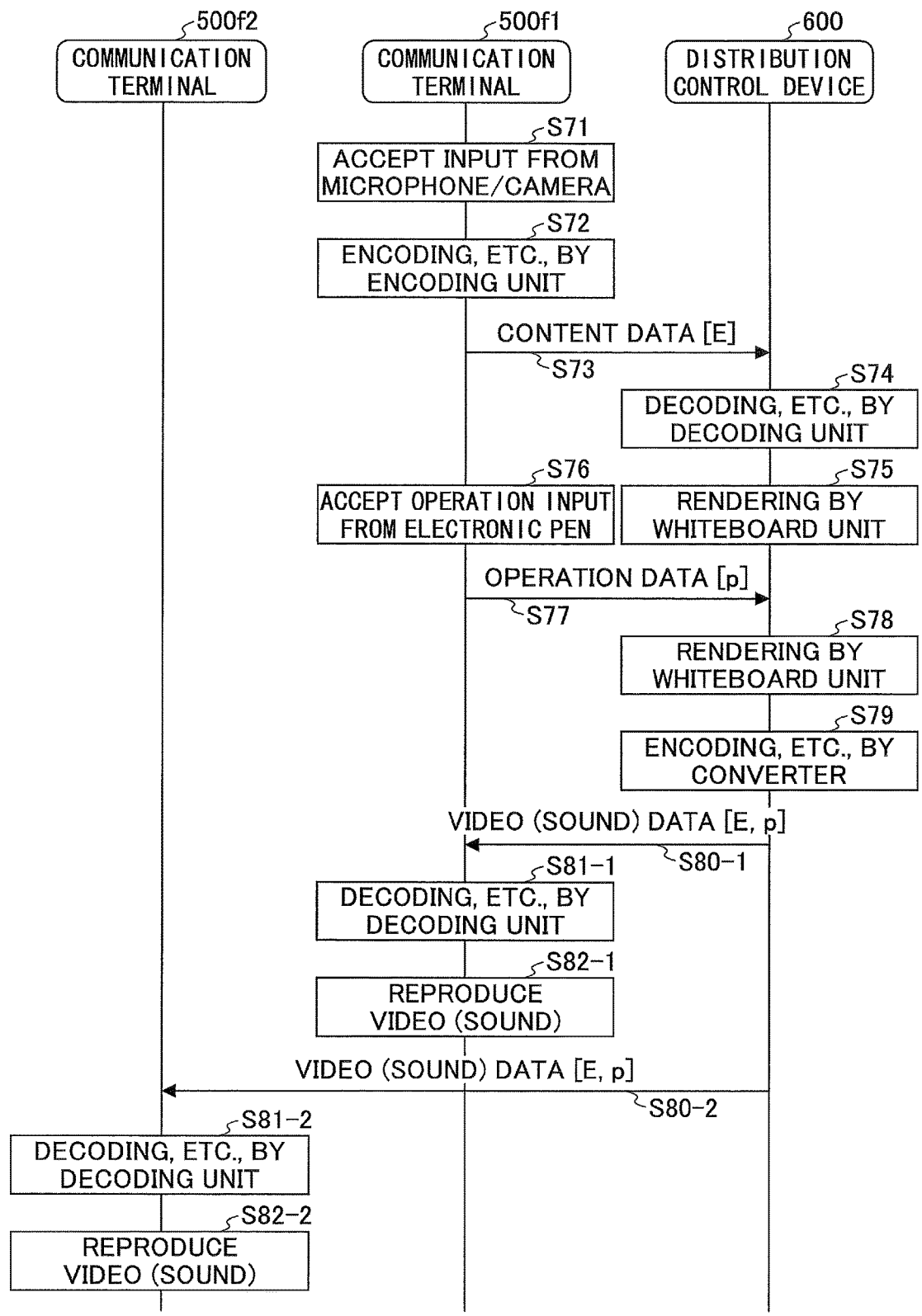
FIG. 35 is a sequence diagram illustrating a distribution process using a plurality of communication terminals via the distribution control device according to an embodiment of the present invention.

Next, with reference to FIG. 35, a communication process using a plurality of communication terminals via the distribution control device will be described. FIG. 35 is a sequence diagram illustrating a distribution process using a plurality of communication terminals 500 via the distribution control device 600 according to the present embodiment. Here, a specific process for the pattern of a plurality of communication terminals 500 illustrated in FIG. 28, will be described. FIG. 35 illustrates the processes performed after processes similar to steps S51 to S55 in FIG. 34 including the login process, giving the start request, and creating a converter.

When the encoding unit 560 of the communication terminal 500 ƒ1 receives input of content data as video (sound) data [E] from the camera 562 and the microphone 563 (step S71), the encoding unit 560 encodes the content data [E] (step S72). The transmitter/receiver 551 transmits the content data [E] encoded by the encoding unit 560 to the transmitter/receiver 631 of the distribution control device 600 (step S73). Accordingly, the transmitter/receiver 631 of the distribution control device 600 receives the content data [E].

Next, the decoding unit 640 of the distribution control device 600 decodes the content data [E] received by the transmitter/receiver 631 and outputs the content data [E] to the reception FIFO 634 (step S74). Then, the whiteboard unit 620 generates frame data [E] as still image (sound) data by rendering the content data [E] stored in the reception FIFO 634, and outputs the frame data [E] to the transmission FIFO 624 (step S75). In this case, when content data already acquired is present, the whiteboard unit 620 outputs a layout in which the content data [E] is combined with the content data already acquired.

Furthermore, when the operation unit 552 of the communication terminal 500 ƒ1 receives input of a stroke operation by the electronic pen P1 (step S76), the transmitter/receiver 551 transmits the operation data [p] indicating the content of the stroke operation accepted by the operation unit 552, to the transmitter/receiver 631 of the distribution control device 600 (step S77). Accordingly, the transmitter/receiver 631 of the distribution control device 600 receives the operation data [p]. Then, the whiteboard control unit 622 outputs the operation data [p] received by the transmitter/receiver 631, to the whiteboard unit 620.

Next, the whiteboard unit 620 generates frame data [p] as still image (sound) data by rendering the operation data [p], and outputs the still image (sound) data to the transmission FIFO 624 (step S78). In this case, the whiteboard unit 620 outputs a layout in which the operation data [p] is combined with the content data [E] already acquired.

Next, the converter 661 encodes each piece of frame data ([E] and [p]) as still image (sound) data stored in the transmission FIFO 624, and serializes the pieces of frame data by converting the pieces of frame data into text, to convert the pieces of frame data ([E] and [p]) into video (sound) data ([E] and [p]) to be distributed to the communication terminal 500a (step S79).

Next, the transmitter/receiver 631 acquires the encoded video (sound) data ([E] and [p]) from the encoder bridge unit 630 including the converter 661, and transmits the video (sound) data ([E] and [p]) to the transmitter/receiver 551 of the communication terminal 500ƒ1 via the additional message communication port (step S80-1). Accordingly, the transmitter/receiver 551 of the communication terminal 500 ƒ1 receives the video (sound) data ([E] and [p]) via the additional message communication port, and the reproduction controller 553 of the communication terminal 500 ƒ1 acquires the video (sound) data ([E] and [p]) from the transmitter/receiver 551.

Then, in the communication terminal 500 ƒ1, the decoding unit 550 acquires the video (sound) data ([E] and [p]) from the reproduction controller 553 and decodes the video (sound) data ([E] and [p]) (step S81-1). Subsequently, the speaker 561 reproduces the sound based on the decoded sound data [E], and the display unit 558 reproduces a video based on the video data ([E] and [p]) that has been acquired from the decoding unit 550 and rendered by the rendering unit 555 (step S82-1).

Also for the communication terminal 500 ƒ2, similar to step S80-1, the transmitter/receiver 531 acquires the encoded video (sound) data ([E] and [p]) from the encoder bridge unit 630, and transmits the video (sound) data ([E] and [p]) to the transmitter/receiver 551 of the communication terminal 500ƒ2 (step S80-2). Accordingly, the reproduction controller 553 of the communication terminal 500 ƒ2 acquires the video (sound) data ([E] and [p]).

In the communication terminal 500ƒ2, the decoding unit 550 acquires the video (sound) data ([E] and [p]) from the reproduction controller 553 and decodes the video (sound) data ([E] and [p]) (step S81-2). Subsequently, the speaker 561 reproduces the sound based on the decoded sound data [E], and the display unit 558 reproduces a video based on the video data ([E] and [p]) that has been acquired from the decoding unit 550 and rendered by the rendering unit 555 (step S82-2).

Accordingly, the same image (sound) as the image (sound) output from the communication terminal 500ƒ1, is also output from the communication terminal 500ƒ2.

Figure 36:
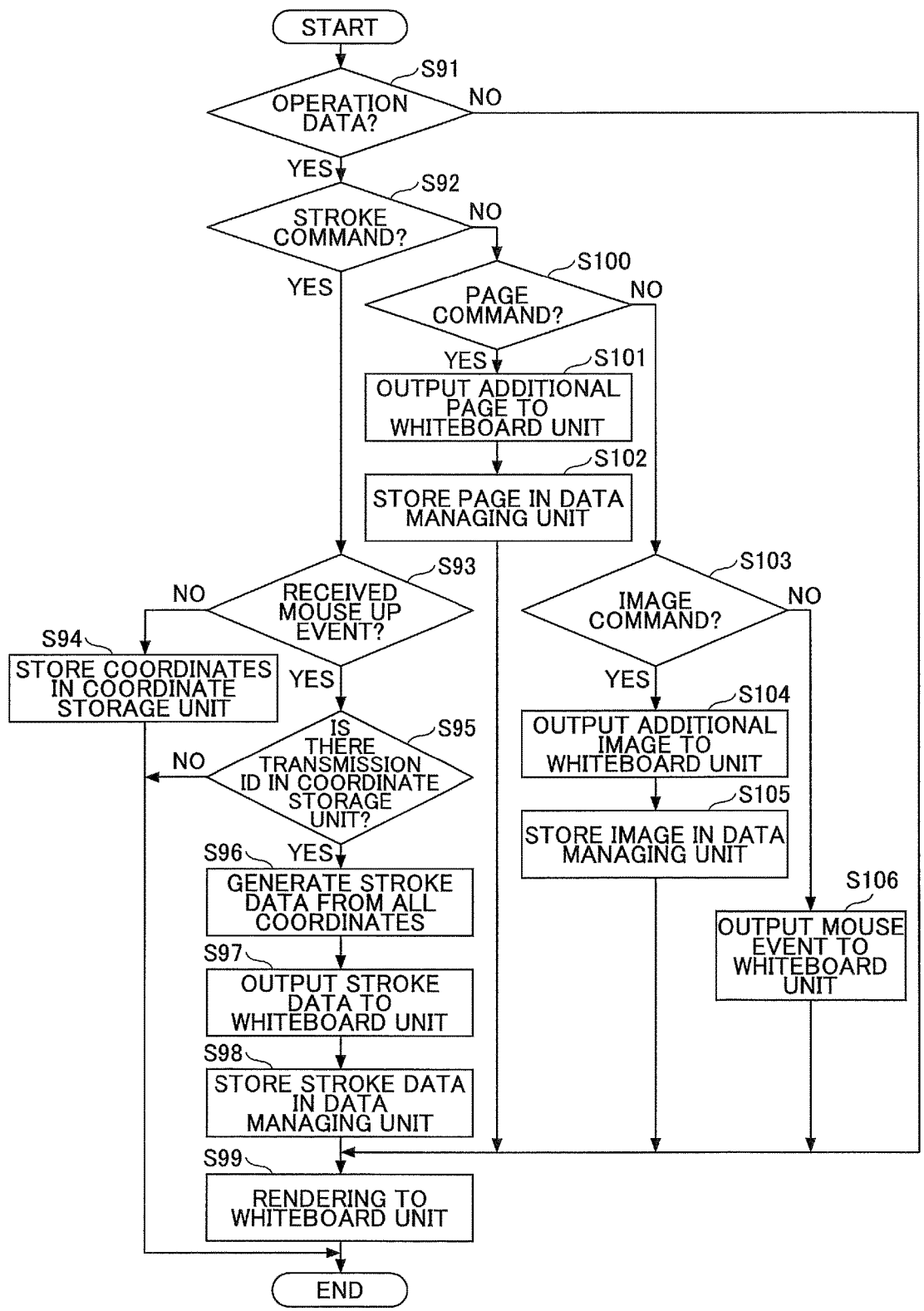
FIG. 36 is a flowchart illustrating the rendering process by the whiteboard unit of the distribution control device according to an embodiment of the present invention.

Next, details of the rendering process by the whiteboard unit 620 in step S78 of FIG. 35 will be described. FIG. 36 is a flowchart illustrating the rendering process by the whiteboard unit of the distribution control device according to the present embodiment.

First, the whiteboard control unit 622 determines whether the data received by the transmitter/receiver 631 is operation data [p] (step S91). When the received data is not operation data (step S91: NO), that is, when the received data is content data [E], the whiteboard unit 620 renders the content data [E] (step S99). This process is the rendering process of step S75 in FIG. 35.

Conversely, when the received data is operation data (step S91: YES), the whiteboard control unit 622 determines whether the command included in the operation data is a stroke command (step S92). When the command included in the operation data is a stroke command (step S92: YES), the whiteboard control unit 622 determines whether a mouse up event has been received (step S93).

When a mouse up event has not been received (step S93: NO), the whiteboard control unit 622 stores the transmission ID and the coordinates included in the operation data, in the coordinate storage unit 1222 (step S94). The transmission ID is an identification number assigned when operation data including a scroll command is received.

Here, as illustrated in FIG. 37, meta stroke information such as the color and the thickness included in the operation data, may be stored in the coordinate storage unit 1222. Furthermore, in addition to the X and Y coordinates, information of the time and pressure may be included. In the following description, it is assumed that the stroke data is generated from meta stroke information and a coordinate string.

Conversely, when the mouse up event is received (step S93: YES), the whiteboard control unit 622 determines whether coordinates related to a transmission ID are stored in the coordinate storage unit 1222 (step S95). When coordinates related to a transmission ID are not stored in the coordinate storage unit 1222 (step S95: NO), the process is terminated without performing anything.

Conversely, when coordinates relating to a transmission ID are stored in the coordinate storage unit 1222 (step S95: YES), the whiteboard control unit 622 extracts all of the coordinates stored in the coordinate storage unit 1222, and generates stroke data indicating a stroke from all of the extracted coordinates (step S96). Note that the whiteboard control unit 622 deletes the extracted coordinates from the coordinate storage unit 1222.

Next, the whiteboard control unit 622 outputs the generated stroke data to the whiteboard unit 620 (step S97). The whiteboard unit 620 stores the acquired stroke data in the data managing unit 120 (step S98). Then, the whiteboard unit 620 renders the acquired stroke data (step S99).

When the command included in the operation data is not a stroke command in step S92 (step S92: NO), the whiteboard control unit 622 determines whether the command included in the operation data is a page command (step S100).

When the command included in the operation data is a page command (step S100: YES), the whiteboard control unit 622 outputs the additional page to the whiteboard unit 620 (step S101). The whiteboard unit 620 stores the acquired page in the data managing unit 120 (step S102), and renders the page (step S99).

Conversely, when the command included in the operation data is not a page command (step S100: NO), the whiteboard control unit 622 determines whether the command included in the operation data is an image command (step S103).

When the command included in the operation data is an image command (step S103: YES), the whiteboard control unit 622 outputs the additional image to the whiteboard unit 620 (step S104). The whiteboard unit 620 stores the acquired image in the data managing unit 120 (step S105) and renders the image (step S99).

Conversely, when the command included in the operation data is not an image command (step S103: NO), the whiteboard control unit 622 outputs a mouse event to the whiteboard unit 620 (step S106), and the whiteboard unit 620 renders the mouse event (step S99). When registering data in the data managing unit 120, the whiteboard unit 620 generates PDF data from all of the pages and stores the PDF data in the data managing unit 120 as backup data.

In the distribution control device 600 according to the present embodiment, the coordinates input to the display of the communication terminal 500 are stored, and stroke data indicating the stroke drawn according to an operation by the user is generated from all of the stored coordinates. Then, after storing the generated stroke data, the distribution control device 600 renders the acquired stroke data, to generate frame data as still image (sound) data. At this time, when content data that has already been acquired is present, a layout, in which the stroke data that is operation data is combined with the content data, is output. Then, when each piece of frame data that is a still image (sound) data is converted into a data format that can be distributed to the communication terminal 500, the converted frame data is transmitted to the communication terminal 500, and the frame data is reproduced on the display of the communication terminal 500. By storing the operation input by the user at the time of distributing the frame data (video data) in this way, even after the distribution of the frame data, it is possible to display the input operation such as a stroke on the display, thereby improving the convenience.

The program executed by the distribution control device 600 according to the present embodiment is a file in an installable format or an executable format, and is provided by being recorded in a computer readable recording medium such as a CD-ROM, a flexible disk (FD), a CD recordable (CD-R), and a DVD (Digital Versatile Disk), etc.

Furthermore, a program executed by the distribution control device 600 according to the present embodiment may be provided by being stored in a computer connected to a network such as the Internet and by being downloaded via the network. Furthermore, a program executed by the distribution control device 600 according to the present embodiment may be provided or distributed via a network such as the Internet. Furthermore, a program executed by the distribution control device 600 according to the present embodiment may be incorporated in advance in a ROM, etc., to be provided.

A program executed by the distribution control device 600 according to the present embodiment has a module configuration including the above-described units (the transmitter/receiver 621, the whiteboard control unit 622, the transmission FIFO 624, the time managing unit 625, the time acquiring unit 626, the channel adaptive controller 627, the encoder bridge unit 630, the transmitter/receiver 631, the reception FIFO 634, the recognizing unit 635, the delay information acquiring unit 637a, the channel adaptive controller 637b, and the decoding unit 640). Furthermore, in the distribution control device 600 according to the present embodiment, as the actual hardware, the CPU (processor) reads a program from the storage medium and executes the program, so that the respective units described above are loaded in the main memory, and the respective units described above are generated in the main memory. Furthermore, for example, some or all of the functions of the respective units described above may be implemented by exclusive-use hardware circuits.

According to the image processing system according to the present embodiment, the communication path is set by setting a common message communication port in the electronic conference system and the communication system using the electronic blackboard. Accordingly, when the electronic blackboard is introduced into the electronic conference system, since there is no increase in communication ports to be used, it is possible to prevent the network resources from being compressed. Therefore, network resources can be used effectively. Furthermore, by providing the distribution control device, the processing load of the communication terminal, such as the electronic blackboard, can be reduced.

It is also possible to appropriately combine the above-described embodiments.

In the above-described embodiments, the image forming system is an example of an information processing system, the communication terminal 500 and the electronic blackboard 2 are examples of an information processing apparatus, the first information processing system is an example of a conference system, and the second information processing system is an example of a communication system using the electronic blackboard 2. Furthermore, the remote start processing unit 61 and the remote participation processing unit 62 are examples of a setting unit, the video superimposing unit 28 and the display superimposing unit 36 are examples of a content processing unit, and the coordinate detecting unit 22 and the contact detecting unit 24 are examples of an operation accepting unit, and the program for the electronic blackboard 2 is an example of an information processing program.

Although the present invention has been described with reference to specific embodiments and modifications, it is to be understood that the embodiments and modifications are merely illustrative examples, and that various modifications, corrections, alternatives, and permutations, etc., will be understood by those skilled in the art. As a matter of convenience of explanation, the apparatuses according to the embodiments of the present invention have been described using functional block diagrams; however, such apparatuses may be implemented by hardware, software, or a combination of hardware and software. The present invention is not limited to the above embodiments, and various modifications, corrections, substitutions, and permutations, etc., may be made without departing from the spirit of the present invention.

According to a disclosed embodiment, network resources can be effectively utilized when introducing a function of a second information processing system in a first information processing system.

The information processing apparatus, the information processing method, and the recording medium are not limited to the specific embodiments described in the detailed description, and variations and modifications may be made without departing from the spirit and scope of the present invention.

What is claimed is:

1. An information processing apparatus connected via a communication network, the information processing apparatus comprising:
    processing circuitry configured to execute an electronic blackboard application program to implement an electronic blackboard system, execute a separate electronic conference application program to implement an electronic conference system, and set a communication path by adding a communication port between the information processing apparatus and another information processing apparatus to transmit first content data of a first content created by the electronic conference application program; and
    a transmitter configured to transmit, to the other information processing apparatus, second content data of a second content created with respect to the first content by the electronic blackboard application program, from the communication port added to set the communication path between the information processing apparatus and the other information processing apparatus to transmit the first content data of the first content created by the electronic conference application program.

2. The information processing apparatus according to claim 1, wherein the processing circuitry is further configured to
    cause the first content input to the information processing apparatus to be displayed,
    accept an operation with respect to the first content, and
    create the second content data of the second content, based on the accepted operation.

3. The information processing apparatus according to claim 2, wherein the processing circuitry is further configured to serialize the second content data, and
    the transmitter is further configured to transmit the serialized second content data to the other information processing apparatus on the communication path.

4. The information processing apparatus according to claim 2, wherein the processing circuitry is further configured to generate stroke data indicating a stroke, from coordinates input based on the operation with respect to the first content.

5. The information processing apparatus of claim 1, wherein the processing circuitry is further configured to cause the transmitter to transmit video content data using the communication port, under control of the electronic conference application program, and cause the transmitter to transmit stroke data using the communication port, under control of the electronic blackboard application program.

6. An information processing method executed by an information processing apparatus connected via a communication network, the information processing method comprising:
    executing an electronic blackboard application program to implement an electronic blackboard system;
    executing a separate electronic conference application program to implement an electronic conference system;
    setting a communication path by adding a communication port between the information processing apparatus and another information processing apparatus to transmit first content data of a first content created by the electronic conference application program; and
    transmitting, to the other information processing apparatus, second content data of a second content created with respect to the first content by the electronic blackboard application program, from the communication port added to set the communication path between the information processing apparatus and the other information processing apparatus between which a session has been established to transmit the first content data of the first content created by the electronic conference application program.

7. A non-transitory computer-readable recording medium storing an information processing program that causes a processing circuitry of an information processing apparatus to execute the information processing method according to claim 6.

* * * * *